US012649580B2

(12) United States Patent
Knight

(10) Patent No.: US 12,649,580 B2
(45) Date of Patent: Jun. 9, 2026

(54) SEAT TRACK STRIKER FITTING ASSEMBLIES

(71) Applicant: Aereos Interior Solutions, LLC, Euless, TX (US)

(72) Inventor: Roy Cameron Knight, Lewisville, TX (US)

(73) Assignee: Aereos Interior Solutions, LLC, Euless, TX (US)

( * ) Notice: Subject to any disclaimer, the term of this patent is extended or adjusted under 35 U.S.C. 154(b) by 215 days.

(21) Appl. No.: 18/378,920

(22) Filed: Oct. 11, 2023

(65) Prior Publication Data

US 2025/0121941 A1     Apr. 17, 2025

(51) Int. Cl.
B64D 11/06          (2006.01)

(52) U.S. Cl.
CPC ................................ B64D 11/0696 (2013.01)

(58) Field of Classification Search
CPC .................................................. B64D 11/0696
See application file for complete search history.

(56) References Cited

U.S. PATENT DOCUMENTS

| | | | |
|---|---|---|---|
| 4,771,969 A | 9/1988 | Dowd | |
| 4,796,837 A | 1/1989 | Dowd | |
| 5,762,296 A | 6/1998 | Gilbert | |
| 7,695,225 B2 | 4/2010 | Pozzi | |
| 7,857,561 B2 * | 12/2010 | Mejuhas ............ | B64D 11/0696 |
| | | | 410/105 |
| 8,292,224 B1 | 10/2012 | Ahad et al. | |

| | | | |
|---|---|---|---|
| 8,602,702 B2 | 12/2013 | Roy et al. | |
| 9,546,000 B2 * | 1/2017 | Shih .................... | B64D 11/0696 |
| 9,789,966 B2 * | 10/2017 | De Morais ................ | B64C 1/20 |
| 10,464,445 B2 * | 11/2019 | Trimble ............. | B64D 11/0696 |
| 11,091,269 B2 * | 8/2021 | Guillet .............. | B60N 2/01558 |
| 11,180,258 B2 * | 11/2021 | Chadwell ........... | B60N 2/01558 |
| 11,584,259 B2 * | 2/2023 | Cantos ................... | B60N 2/005 |
| 11,938,846 B2 * | 3/2024 | Parker ................. | B60N 2/0806 |
| 2008/0277528 A1 | 11/2008 | Frantz et al. | |
| 2010/0314495 A1 | 12/2010 | Dazet et al. | |

(Continued)

FOREIGN PATENT DOCUMENTS

| | | | |
|---|---|---|---|
| CN | 111137458 A | 5/2020 | |
| EP | 4606706 A1 * | 8/2025 | ............ B60P 7/0807 |
| WO | WO-2023025532 A1 * | 3/2023 | ......... B60N 2/01566 |

OTHER PUBLICATIONS

Fast-Fitt Tracks & Fittings Belts & Nets, www.fast-fitt.com, 56 pgs., date unknown.

(Continued)

*Primary Examiner* — Timothy J Brindley
(74) *Attorney, Agent, or Firm* — Crowe & Dunlevy LLC

(57)          ABSTRACT

A seat track striker fitting assembly having a base fitting body and a striker assembly removably attached to the base fitting body. The inventive seat track striker fitting assembly does not require tools to engage/disengage with the seat track, and a biasing mechanism of the striker fitting assembly provides positive engagement or force with the seat track to restrict the movement of the fitting assembly during use. The seat track striker fitting assembly accepts or attaches various fasteners, such as bolts, screws, studs, push-button pins, connection rods, or the like, to connect parts, assemblies, or other objects to the seat track striker fitting assembly.

67 Claims, 44 Drawing Sheets

(56)         References Cited

U.S. PATENT DOCUMENTS

| 2020/0086966 | A1* | 3/2020 | Chadwell | B64D 11/0696 |
|---|---|---|---|---|
| 2021/0155127 | A1 | 5/2021 | Last | |
| 2021/0221520 | A1 | 7/2021 | Oleson | |
| 2021/0394907 | A1 | 12/2021 | Grewal et al. | |

OTHER PUBLICATIONS

ANCRA International: "Aircraft Interiors Specialty Hardware, Catalog 403," 28 pgs., date unknown.

* cited by examiner

10

102

102

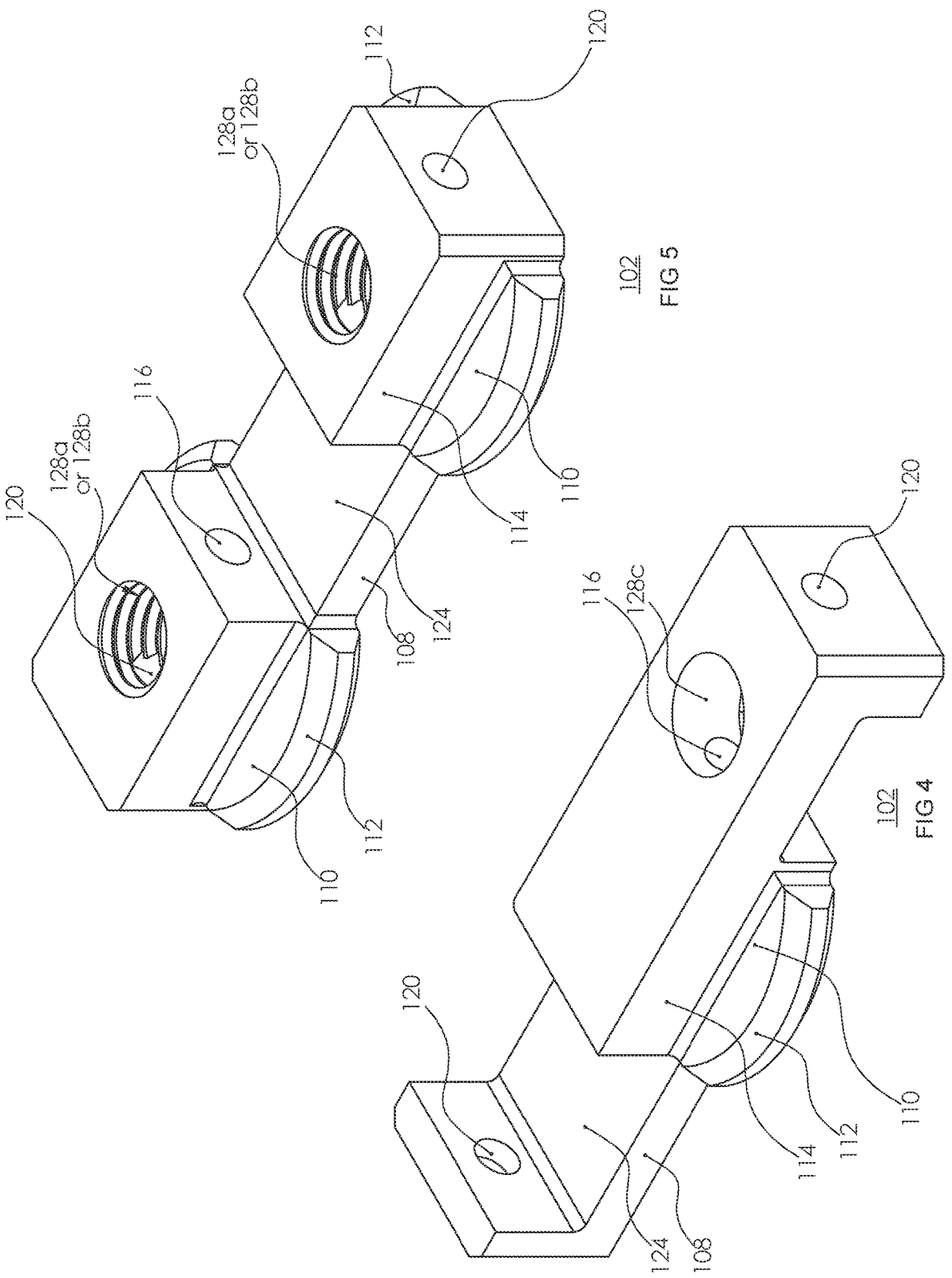

102

102

102

102

102

102

138

138

138

158

144

154

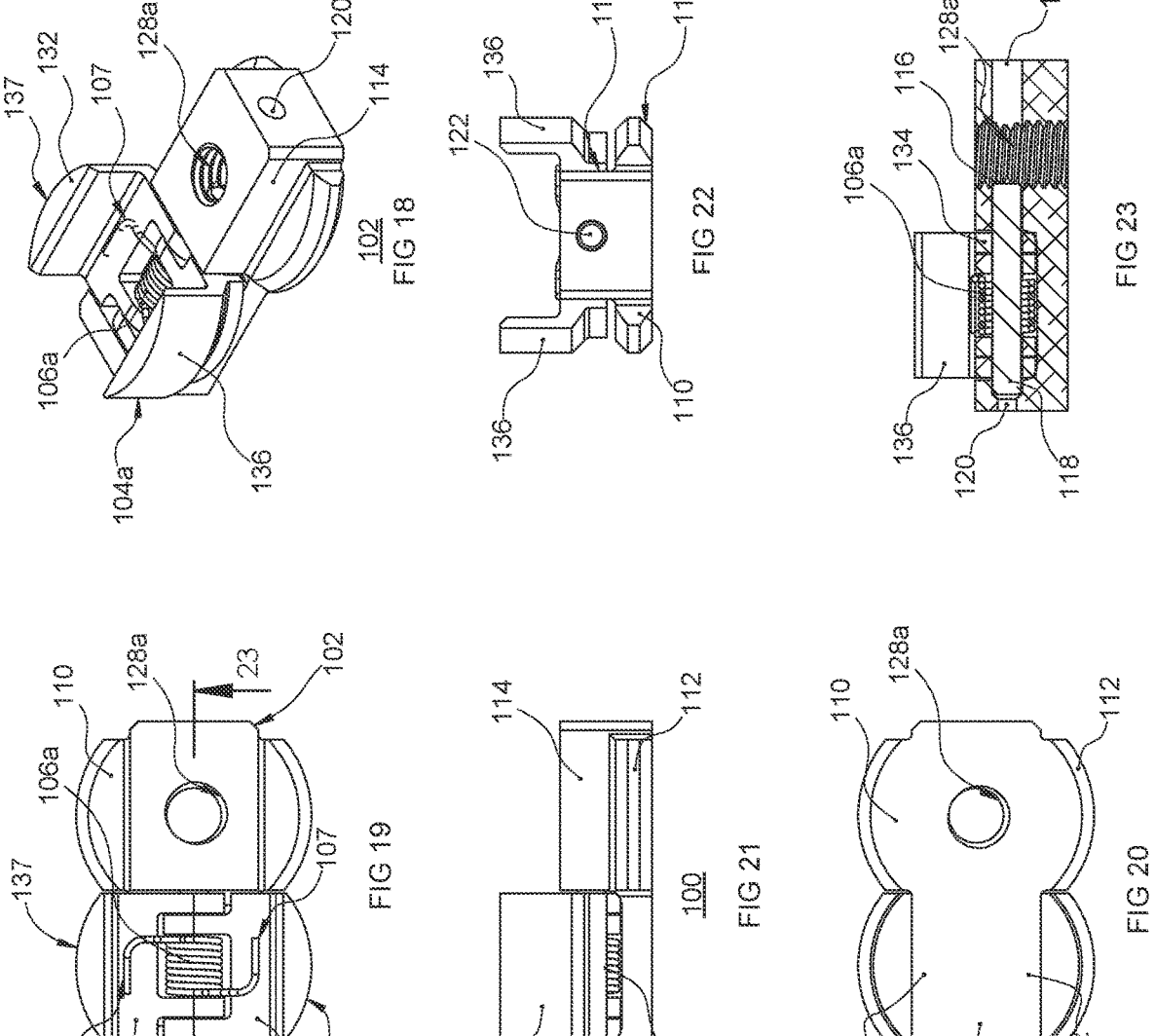

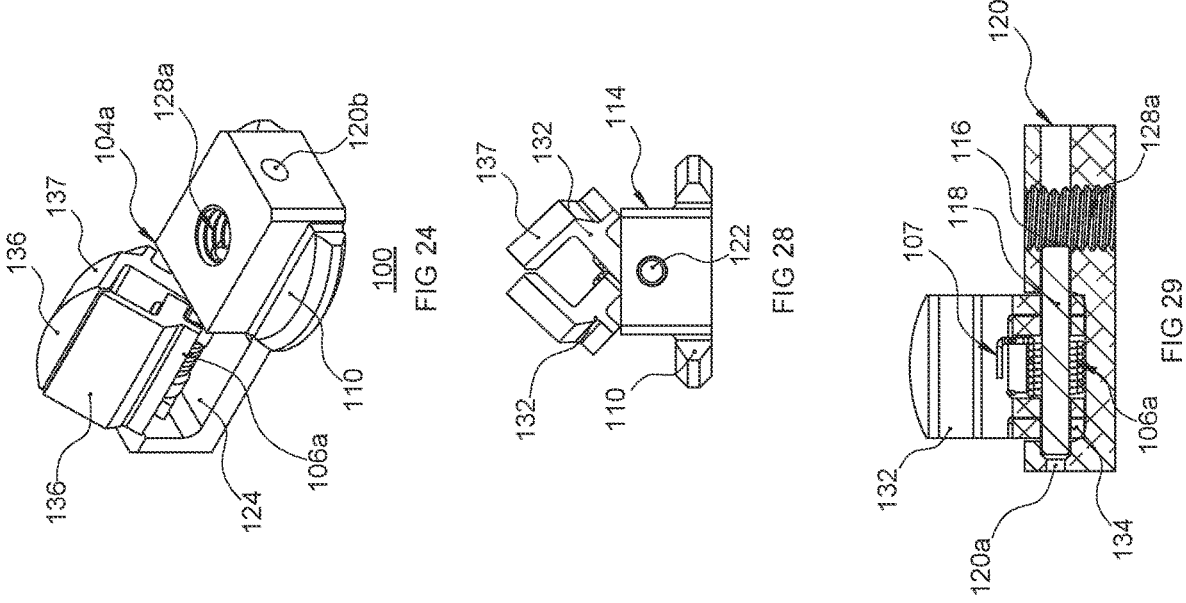
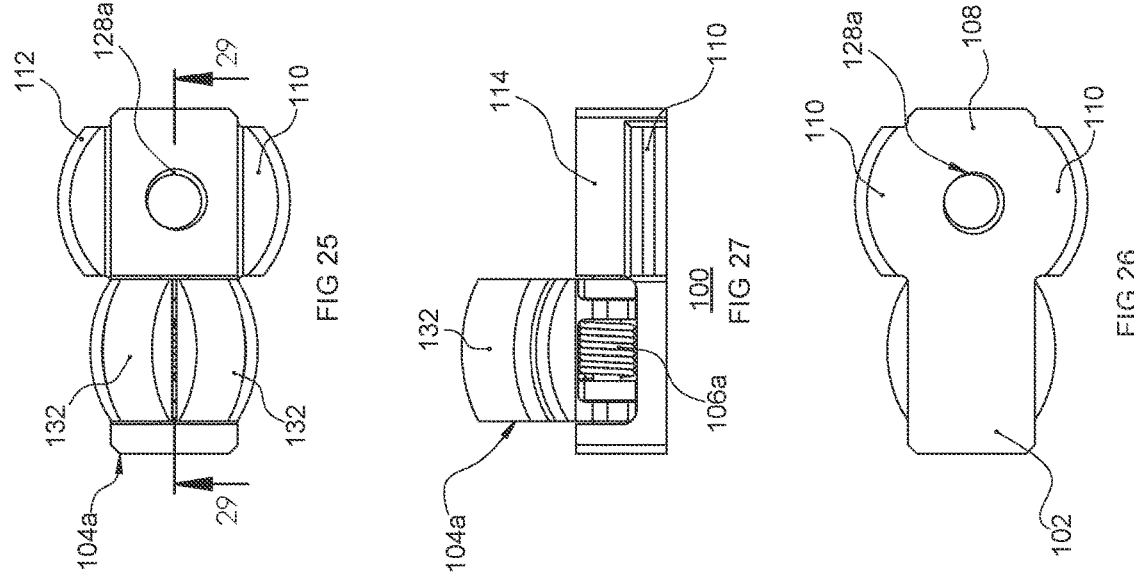

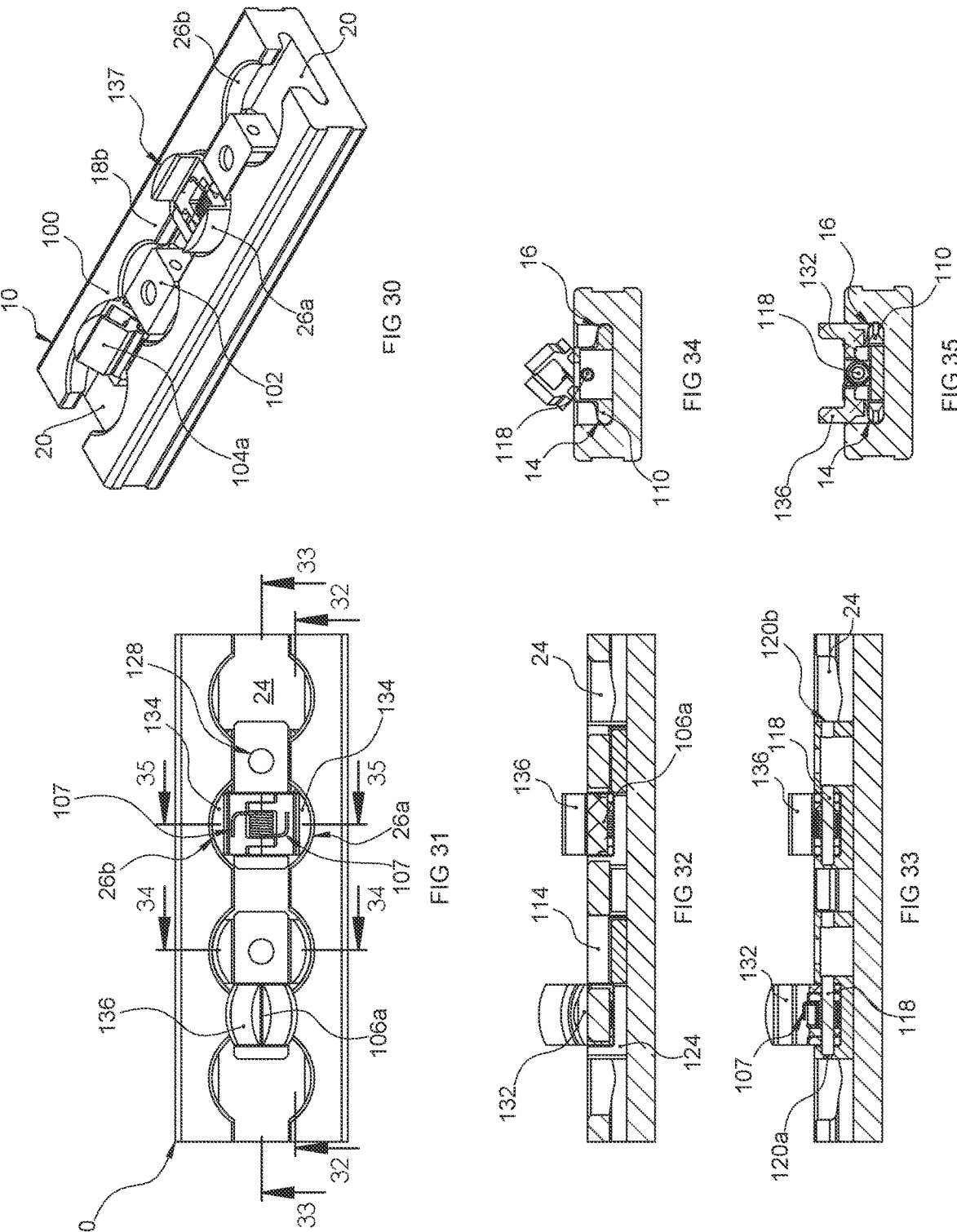

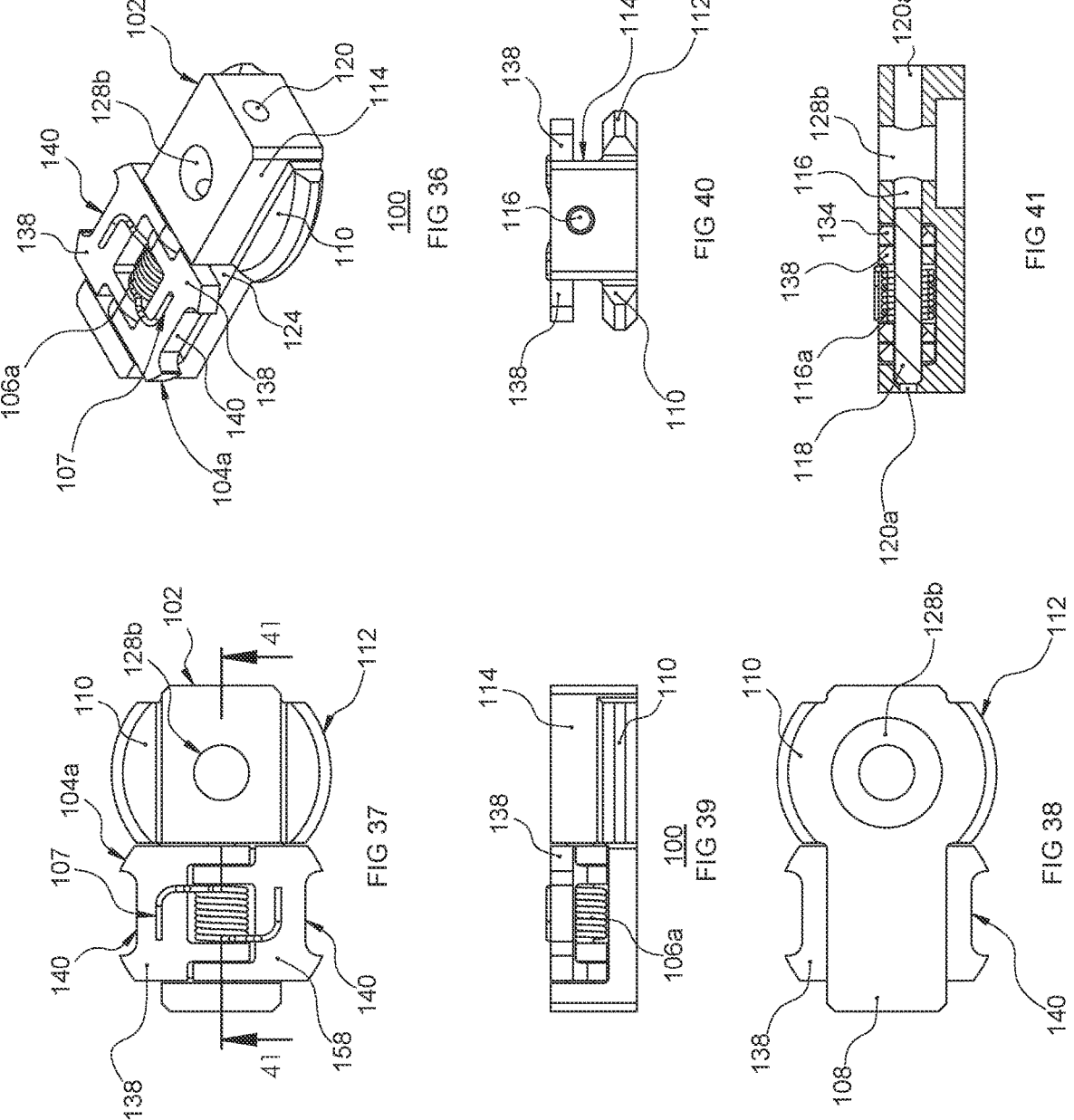

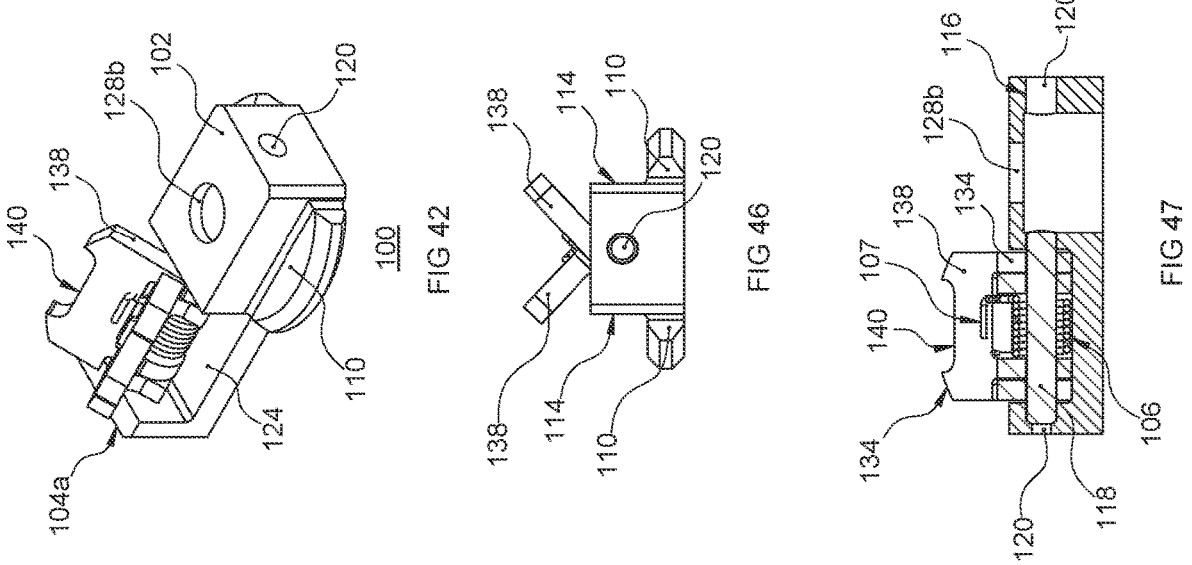
FIG 42
FIG 46
FIG 47
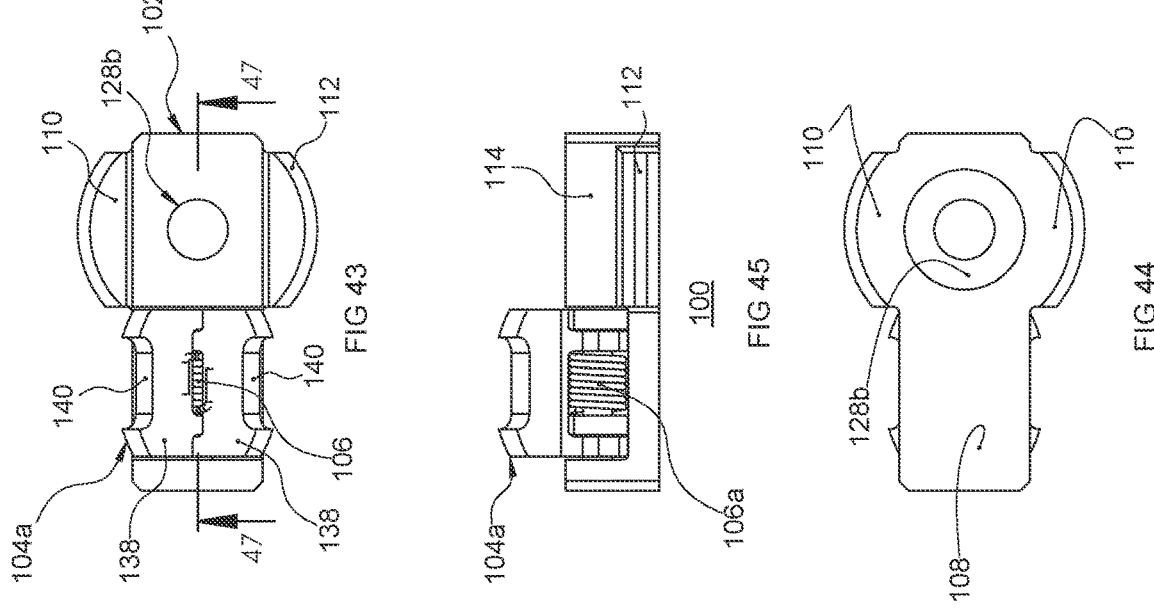
FIG 43
FIG 45
FIG 44

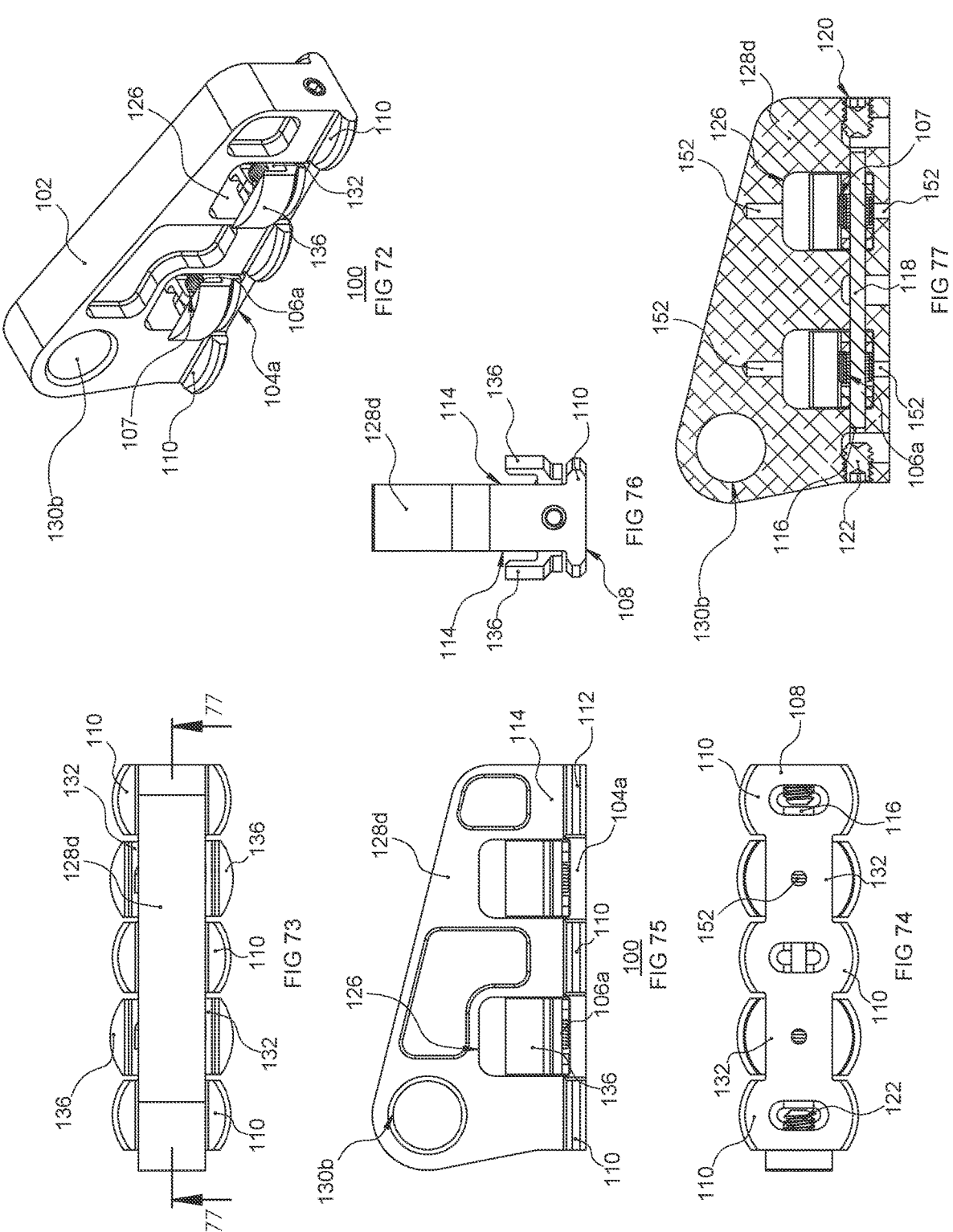

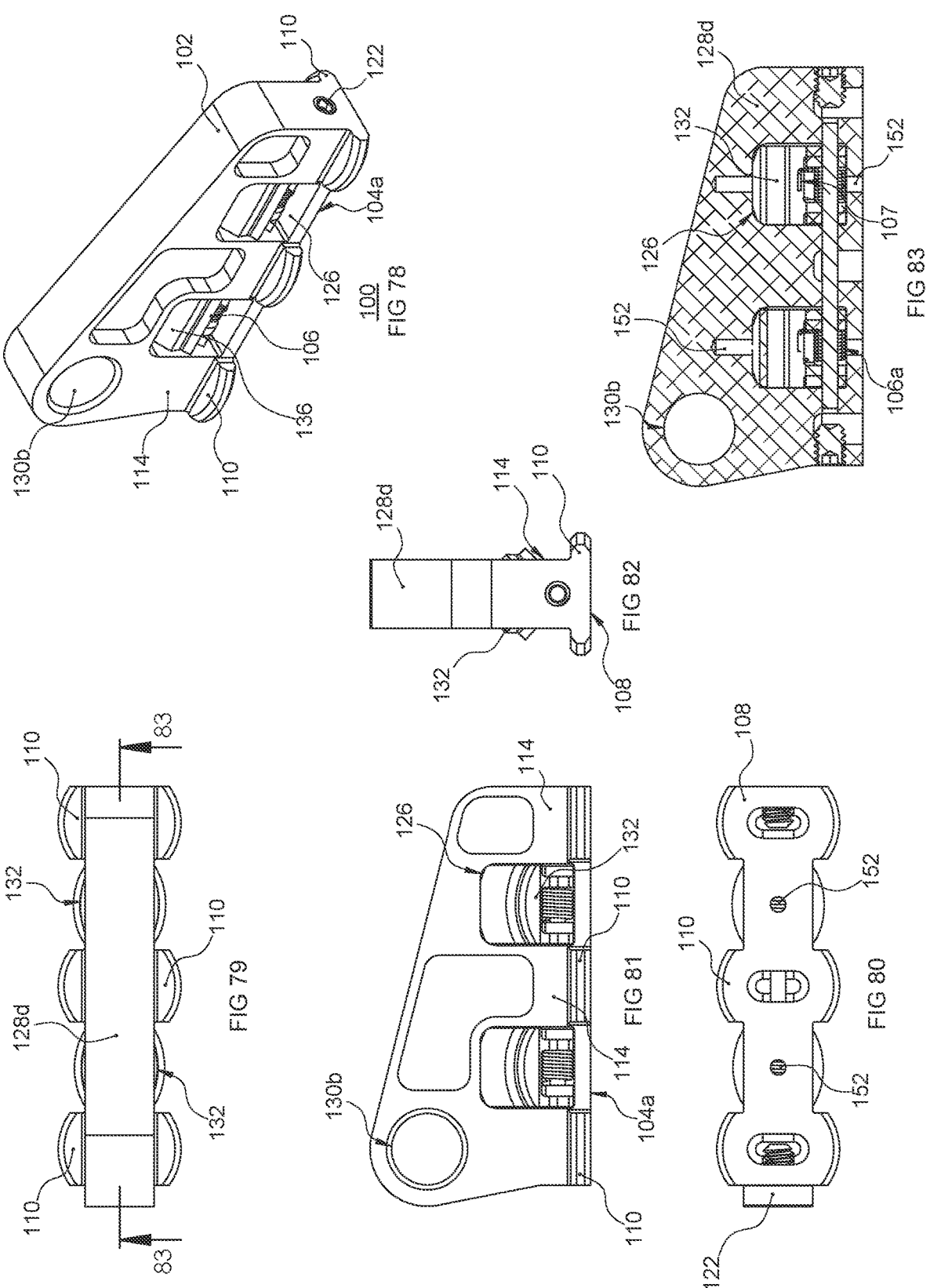

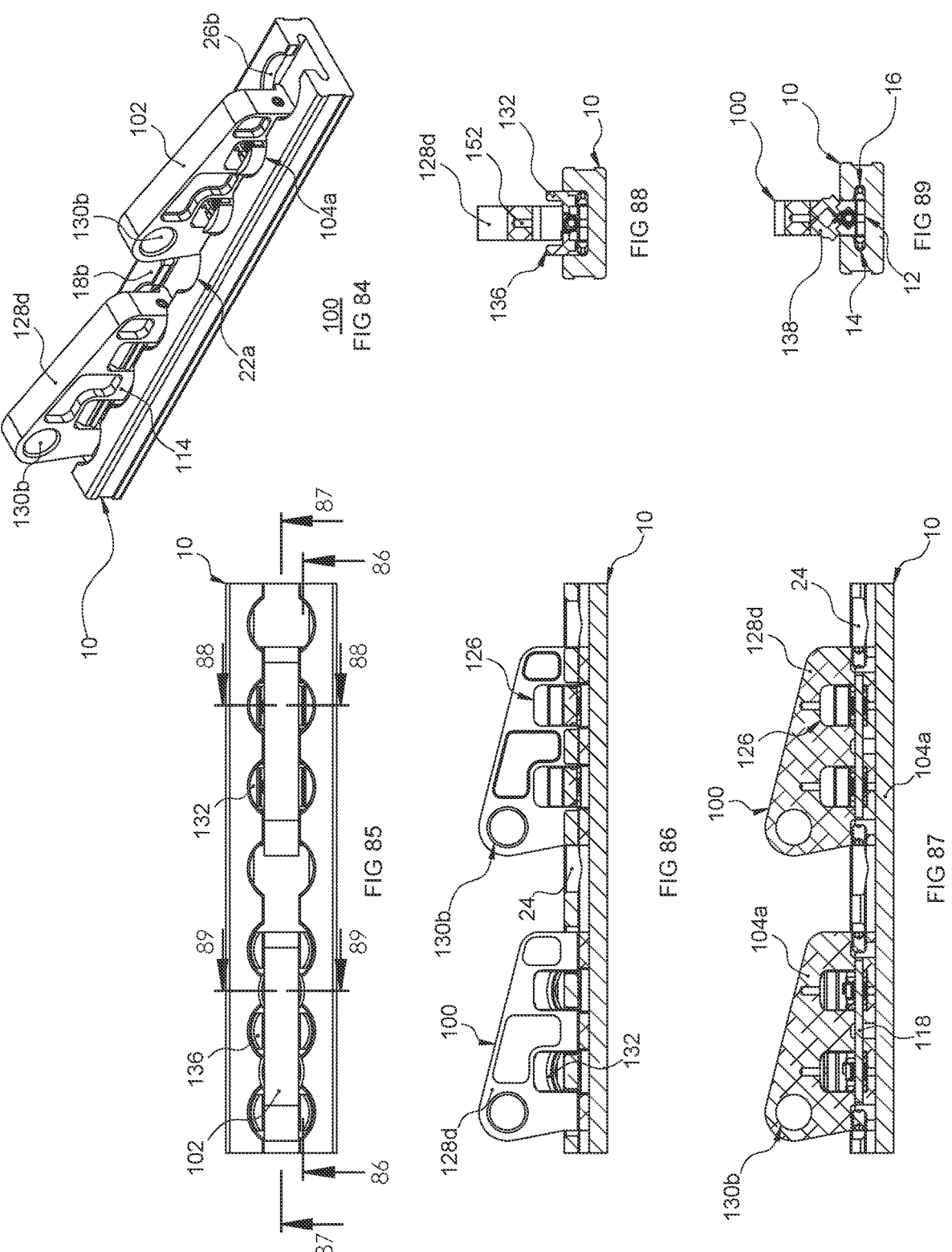

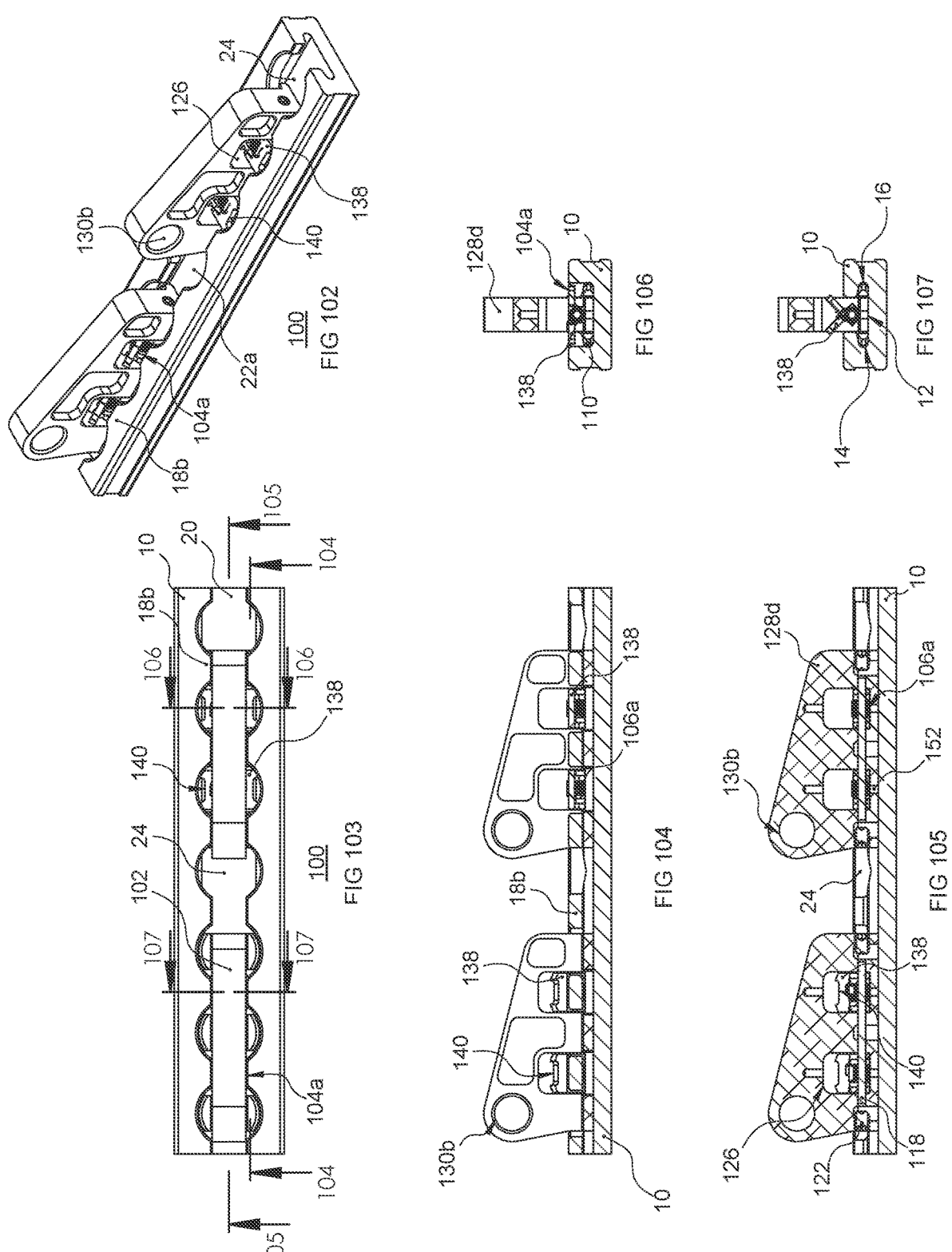

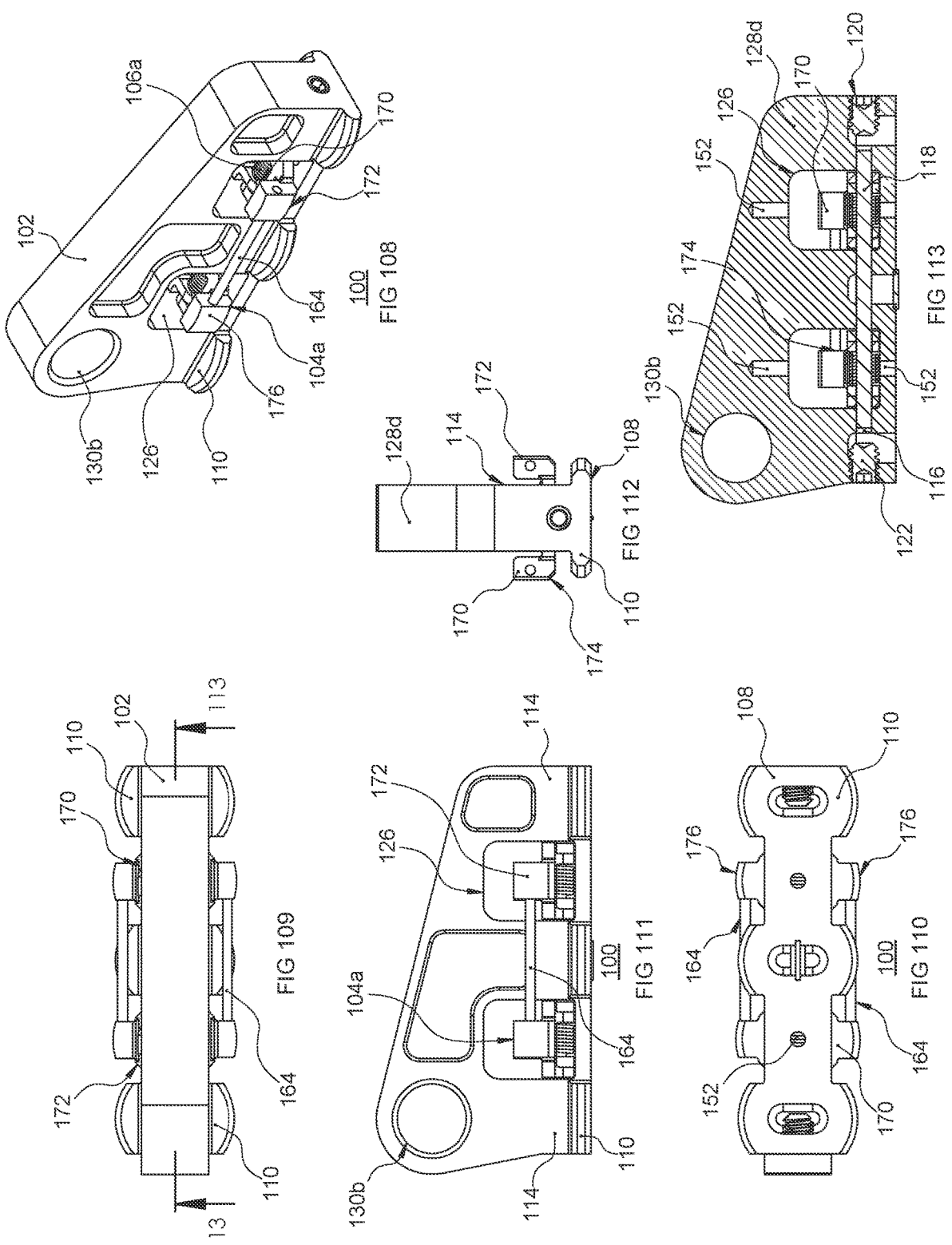

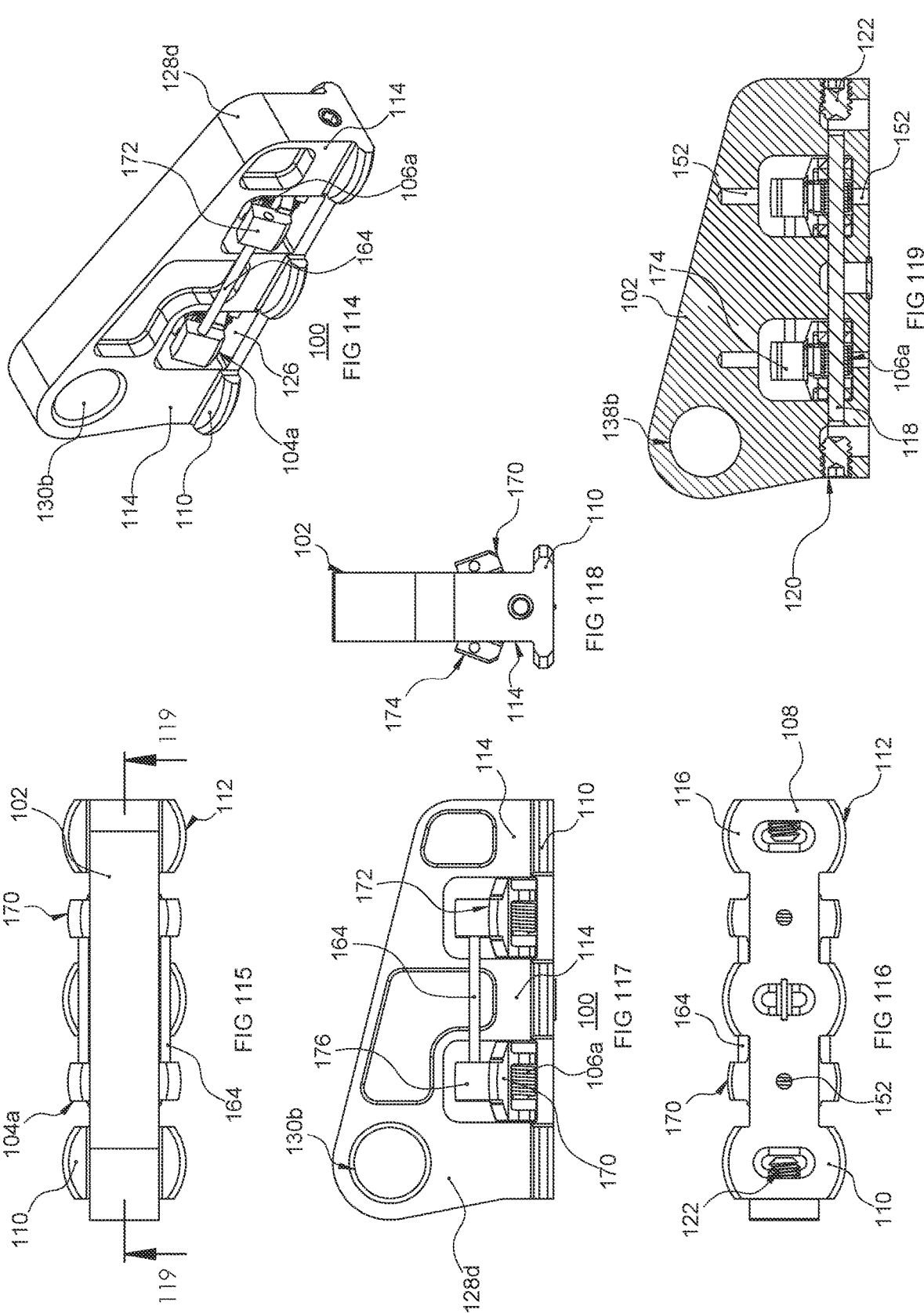

100

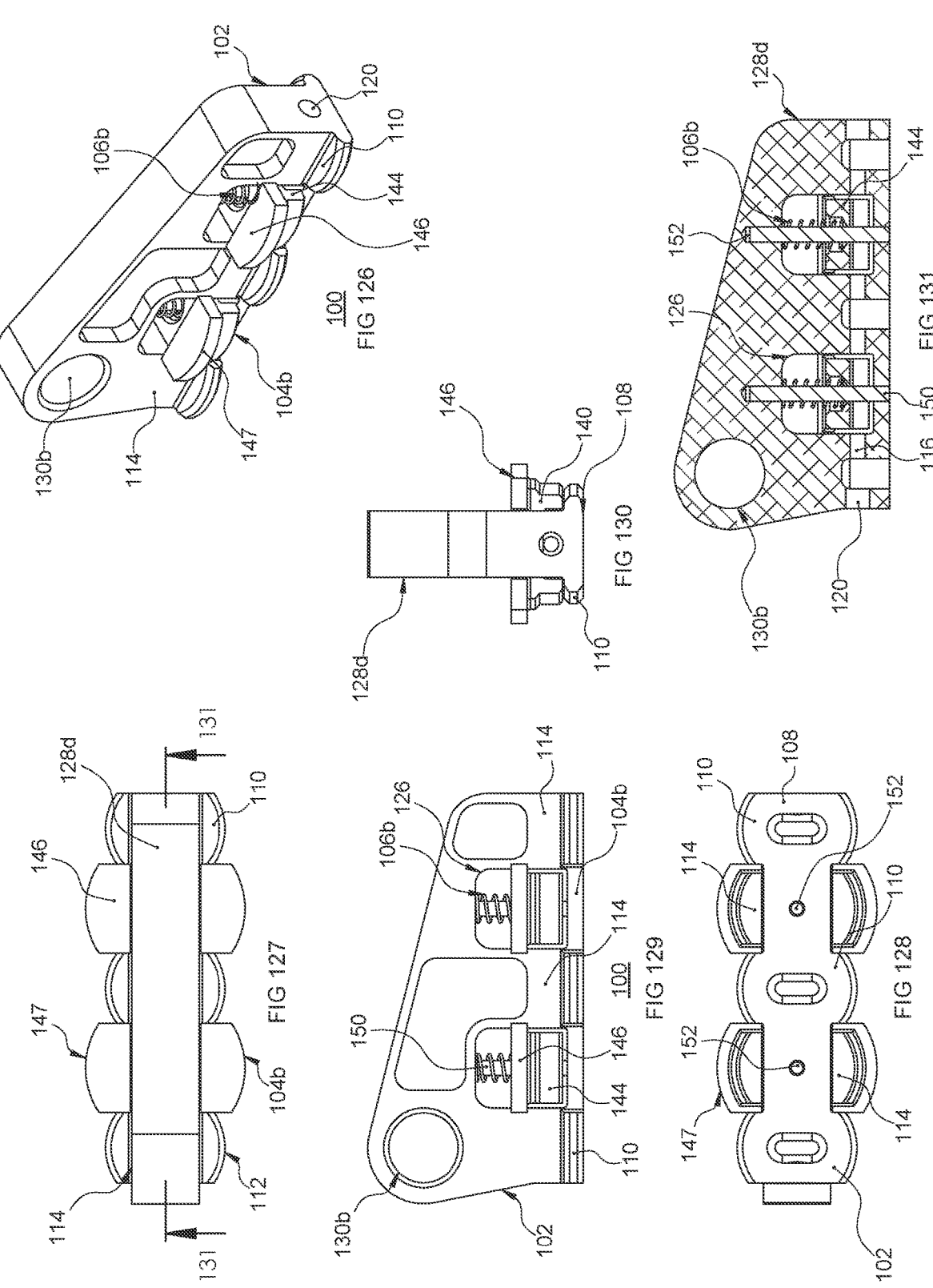

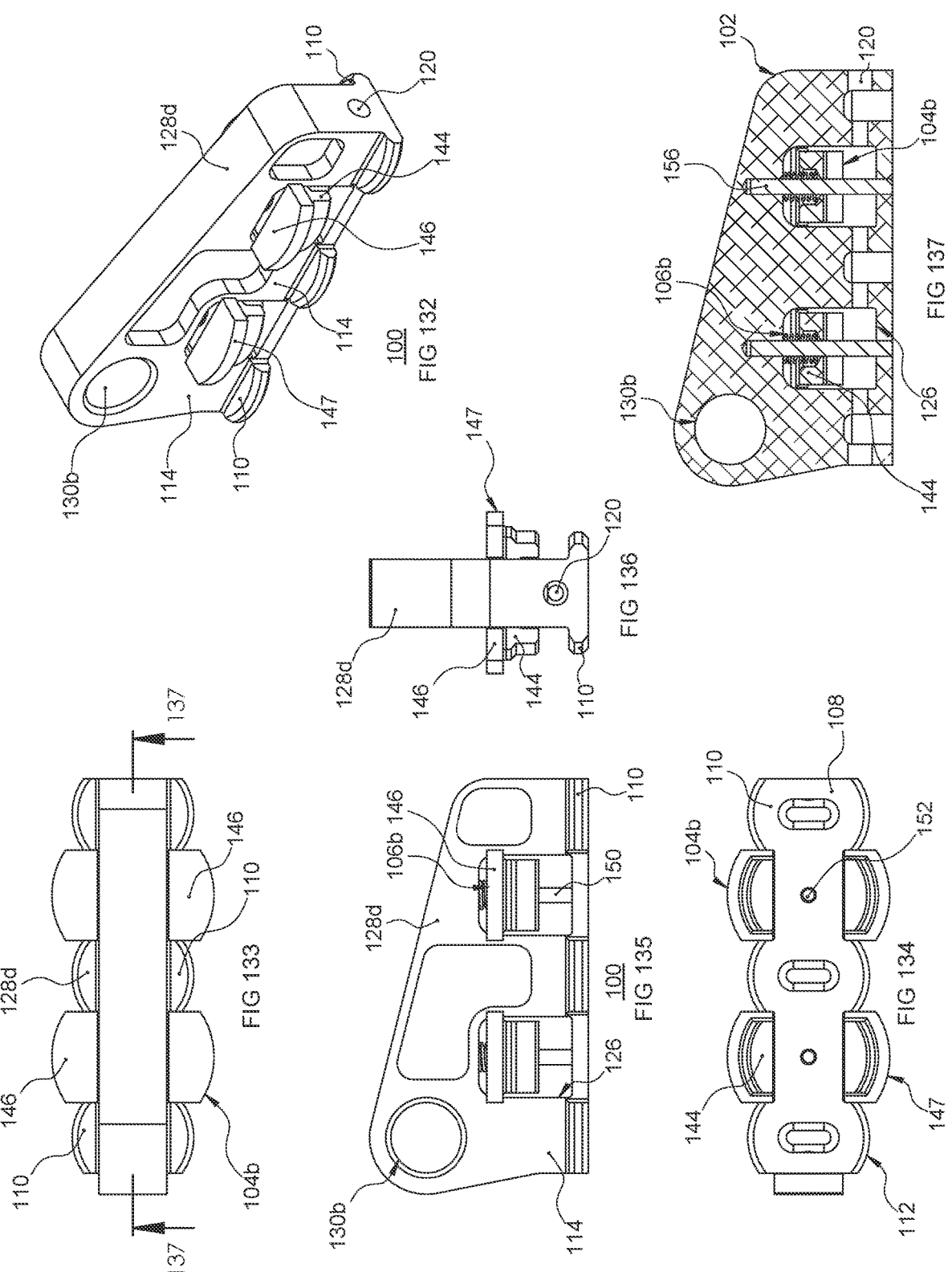

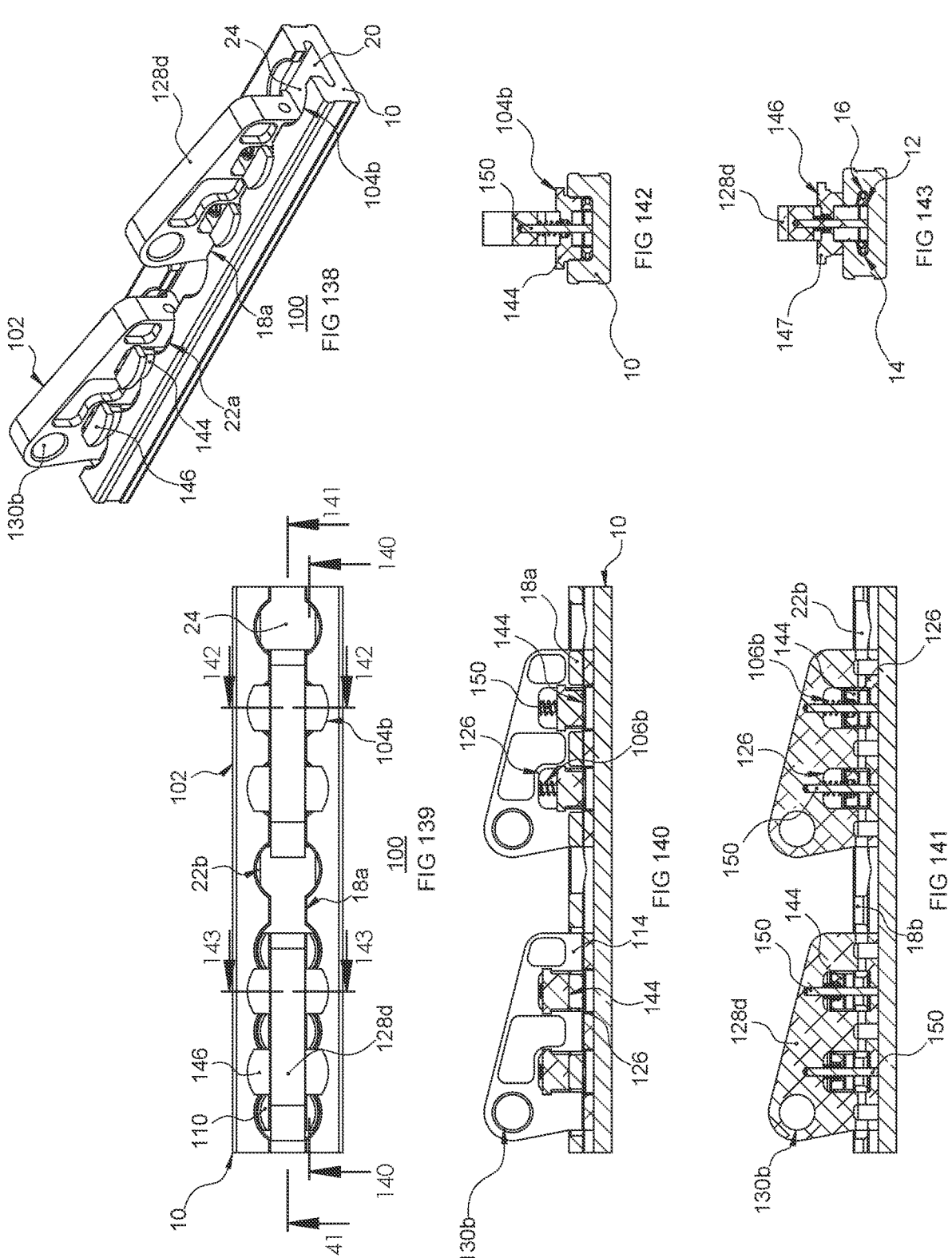

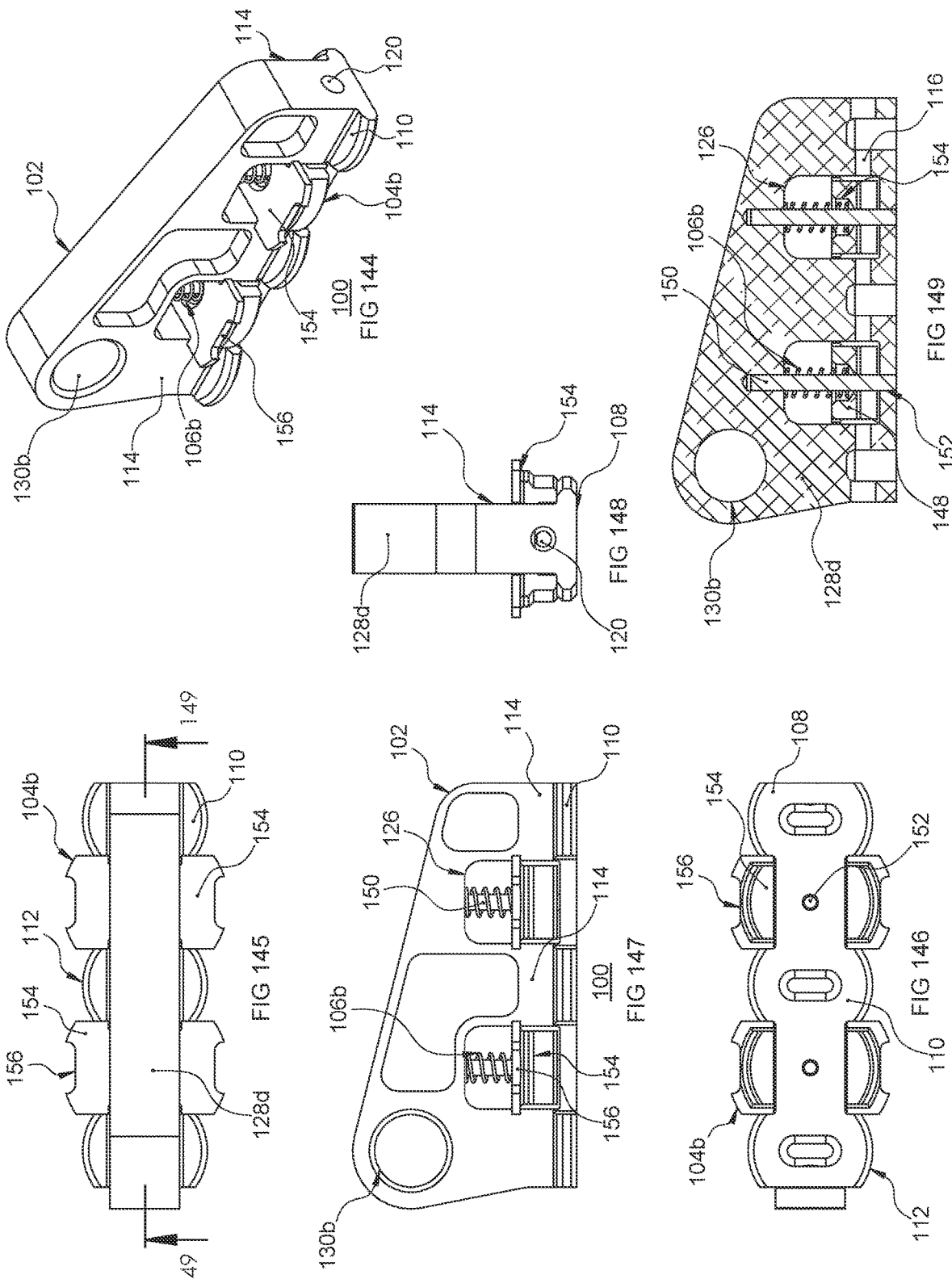

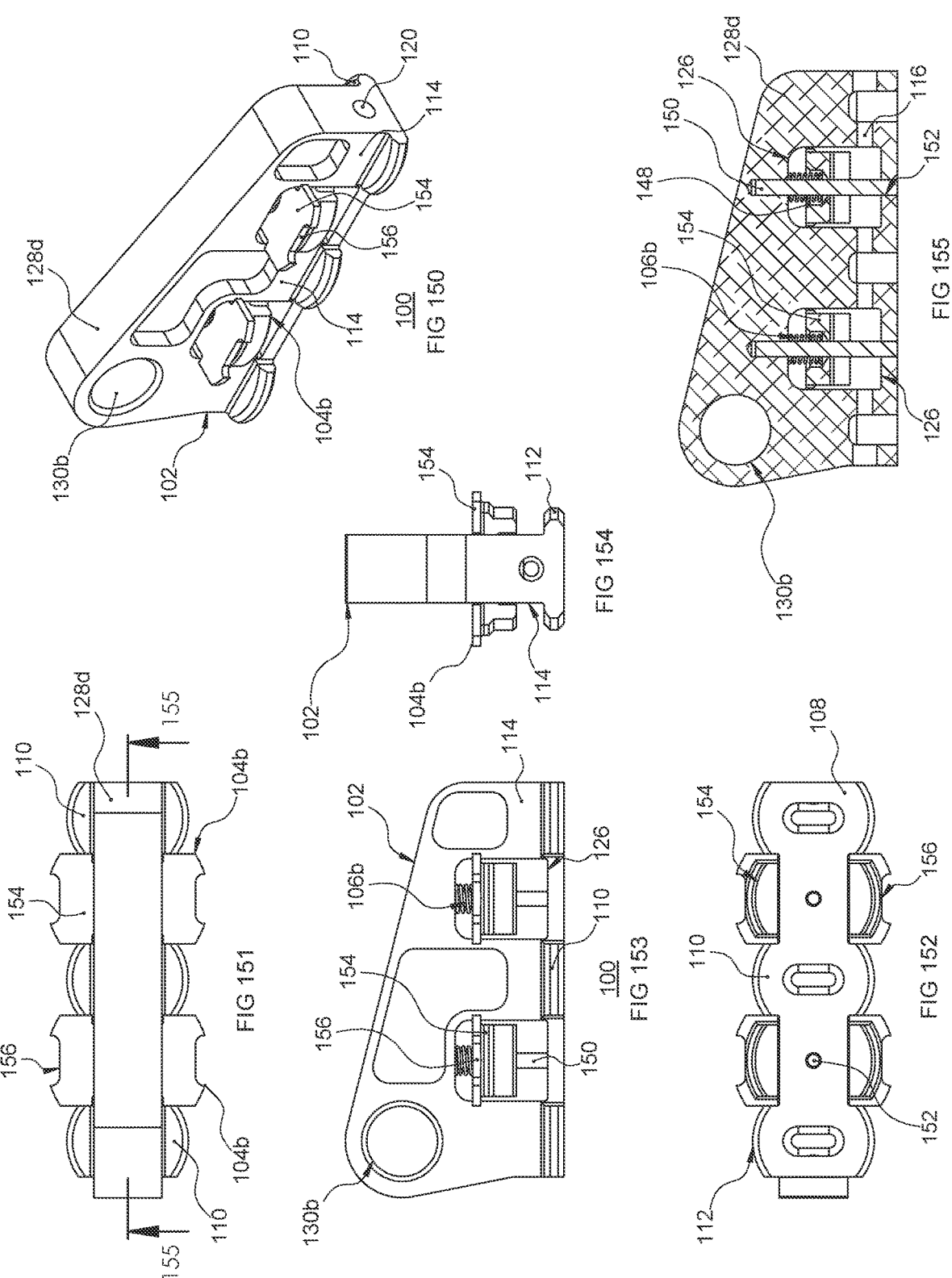

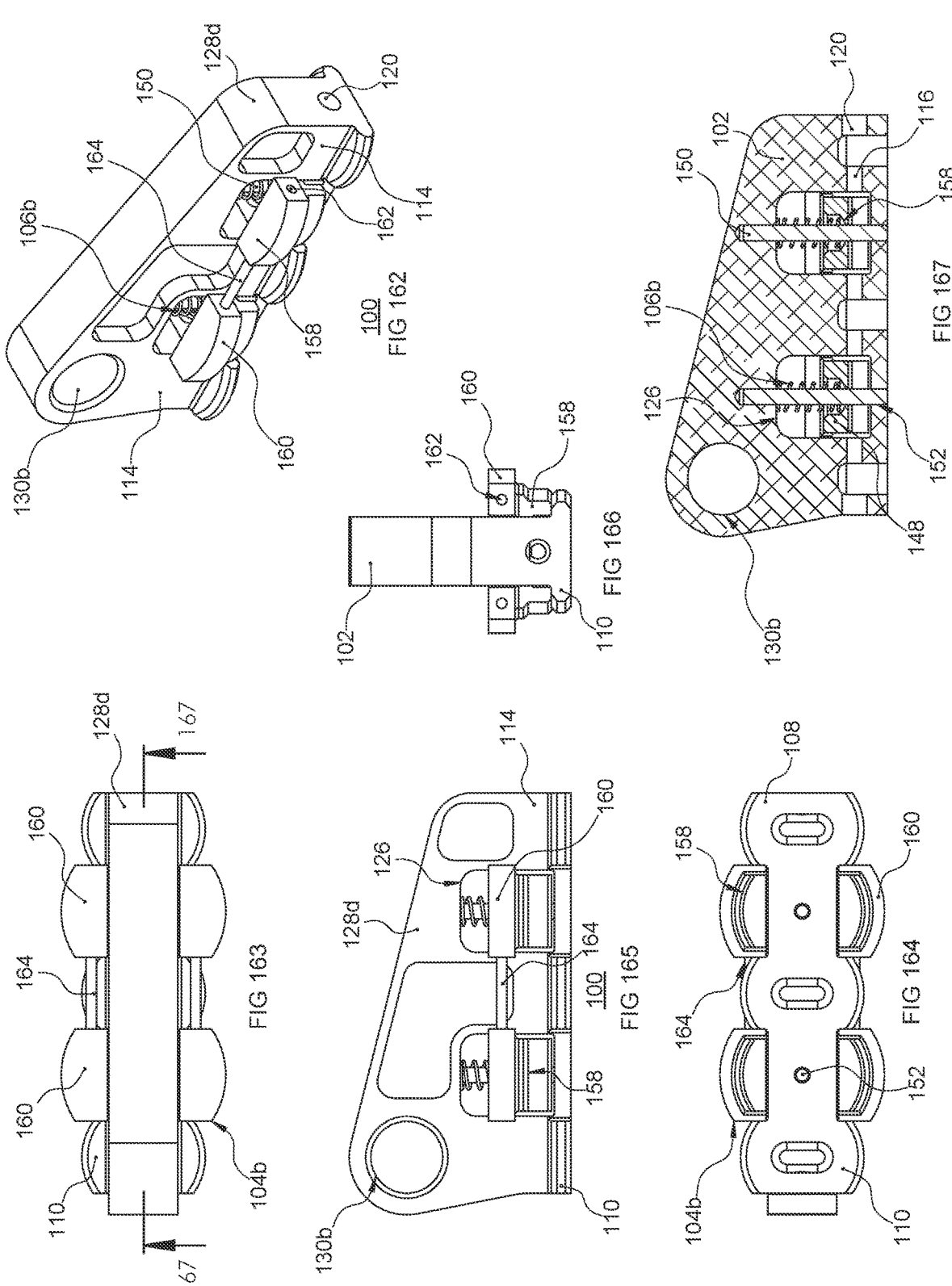

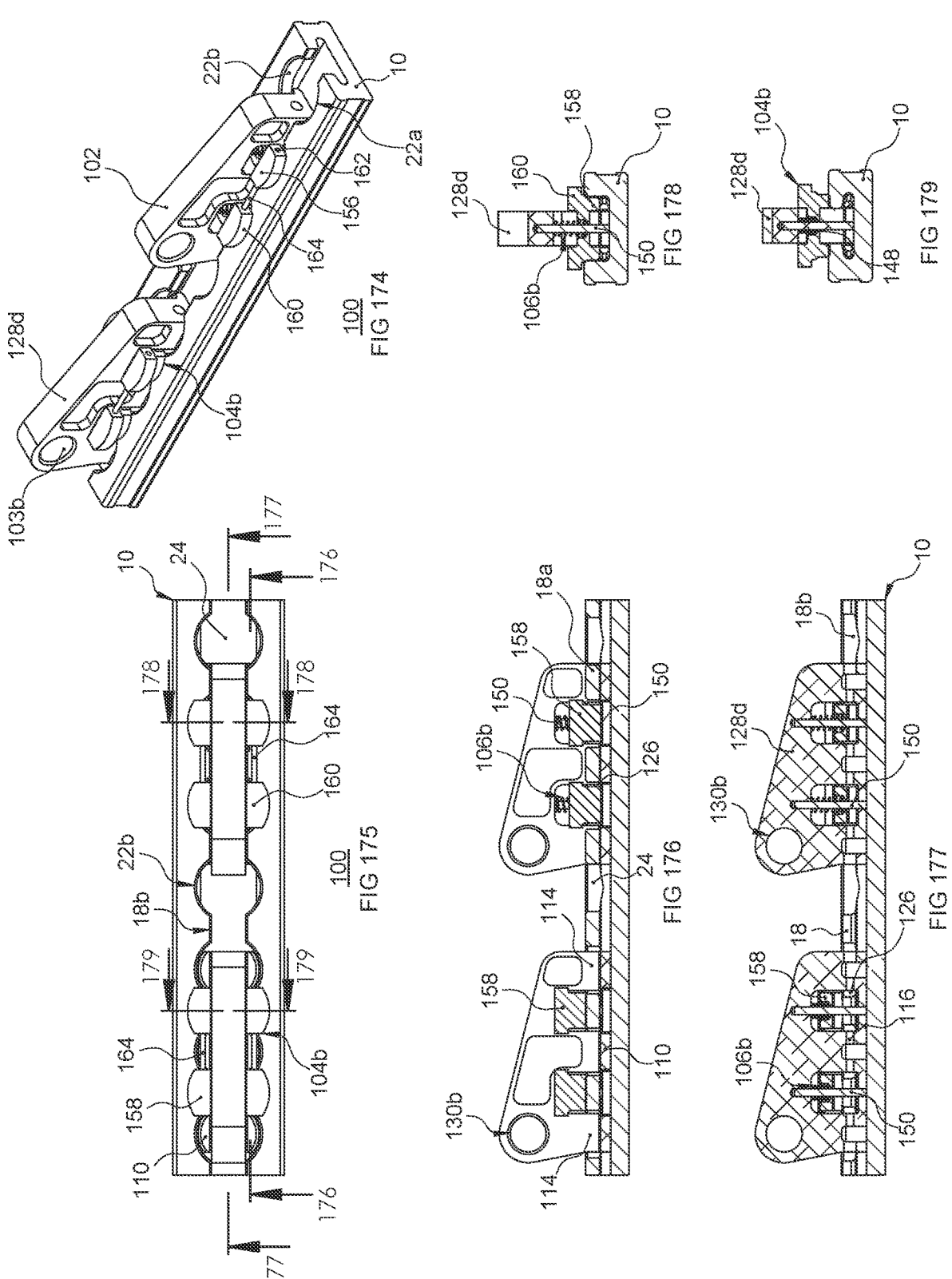

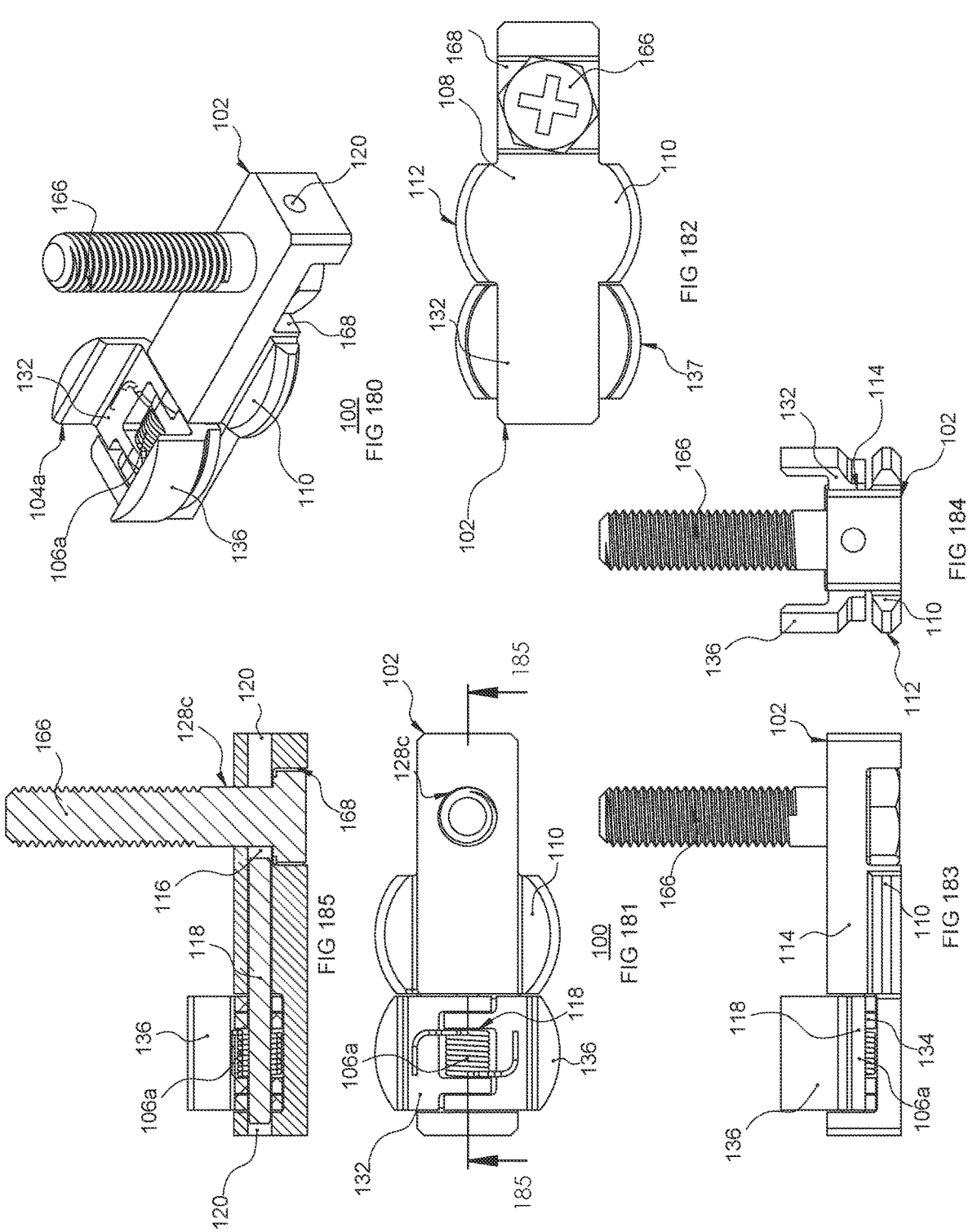

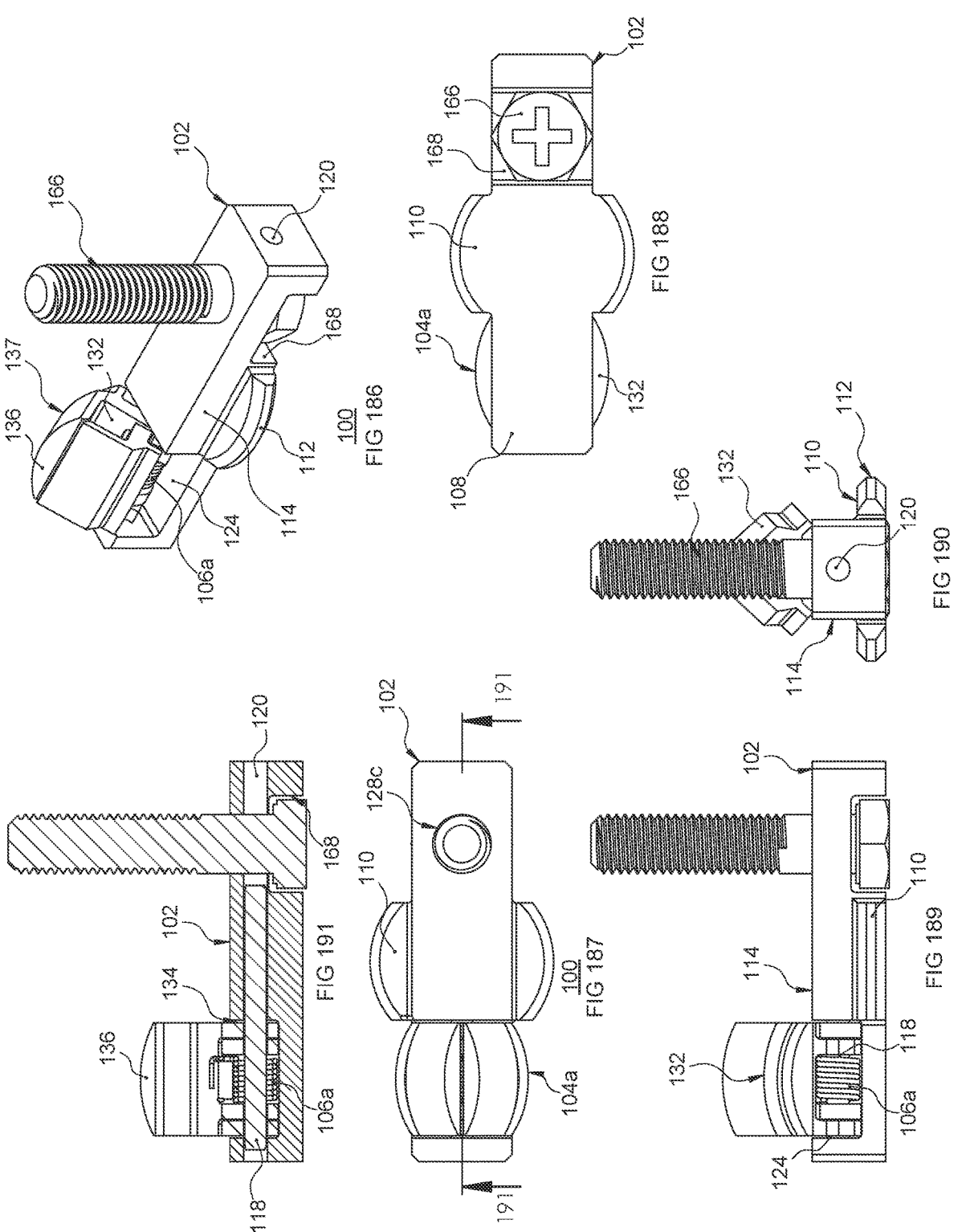

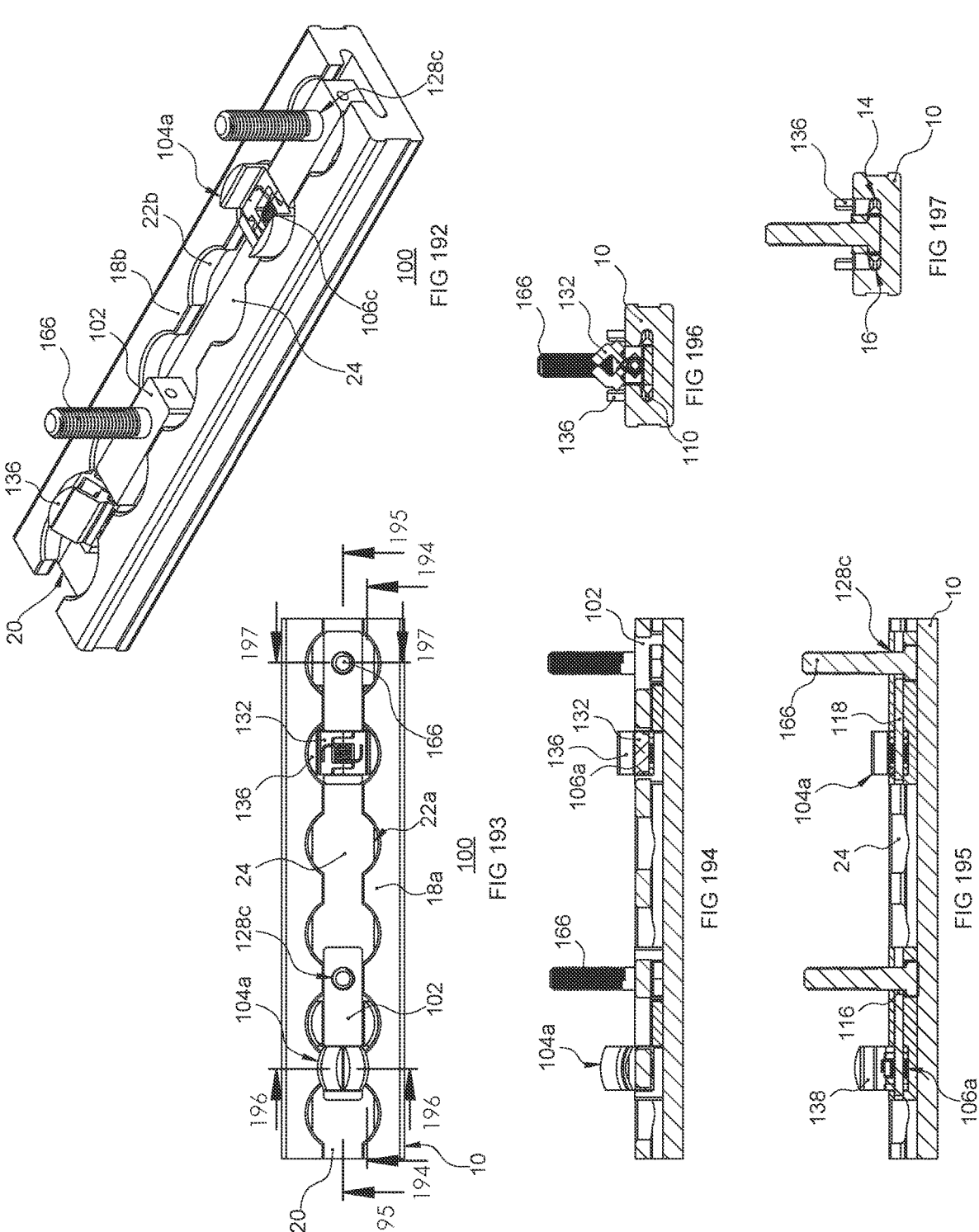

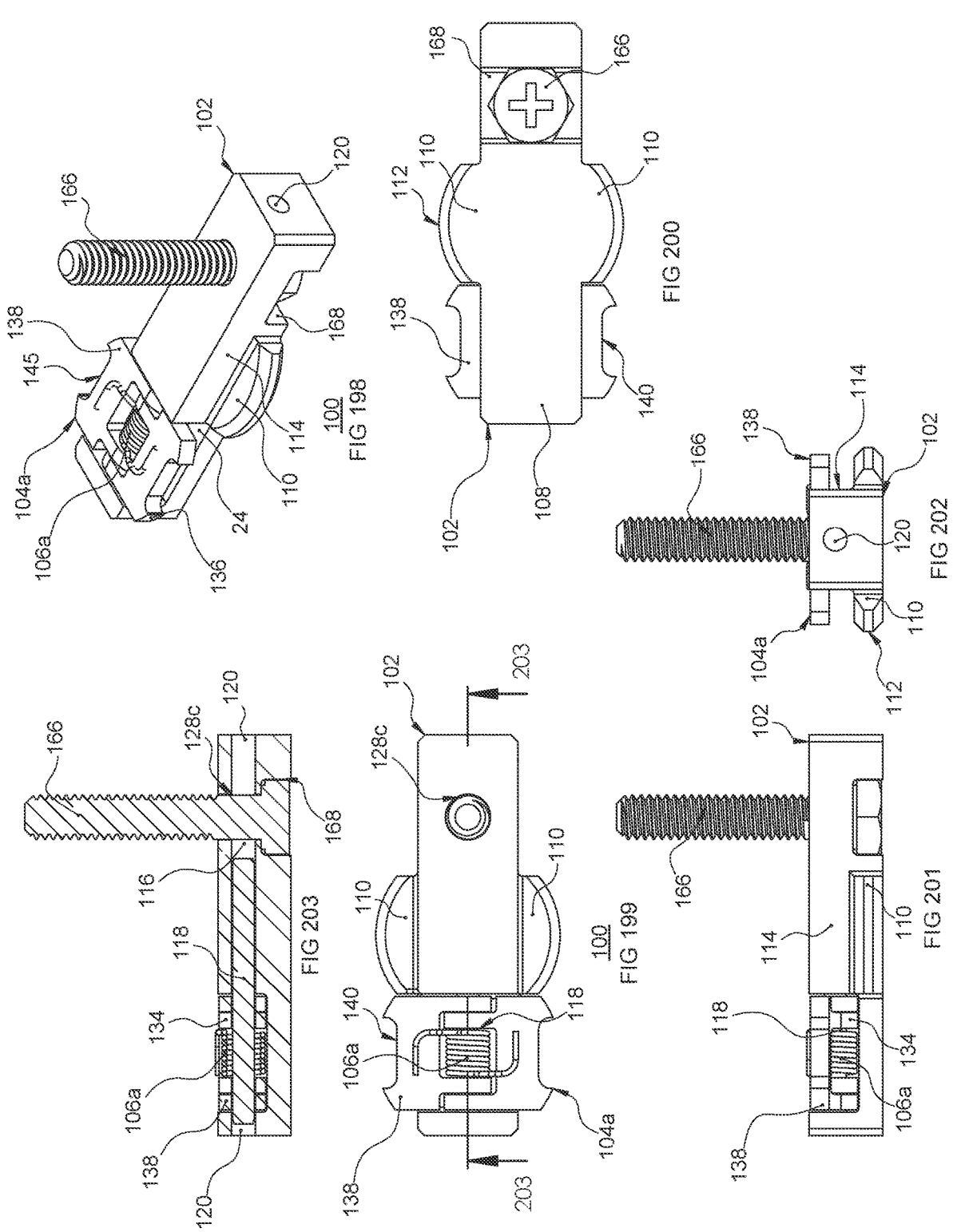

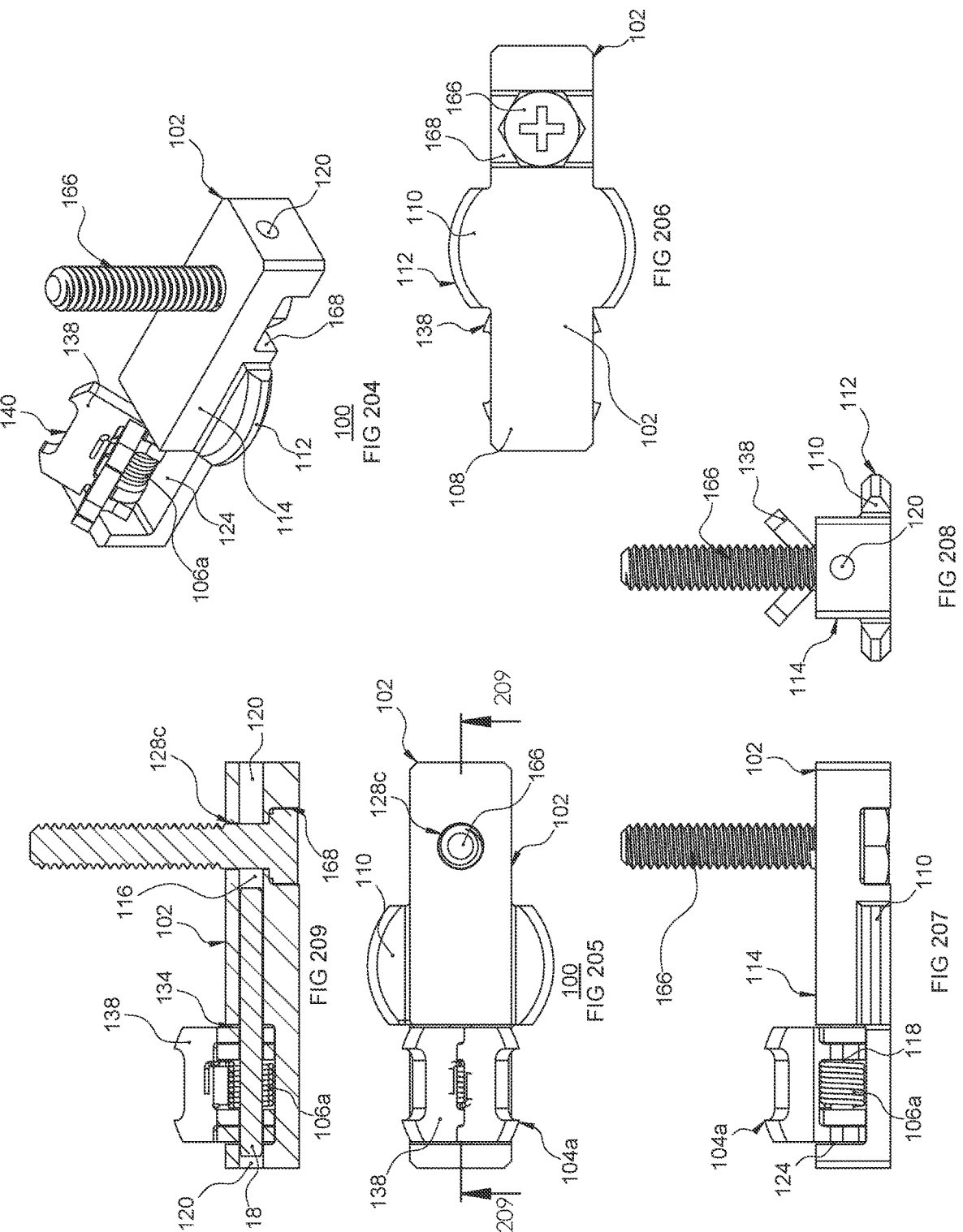

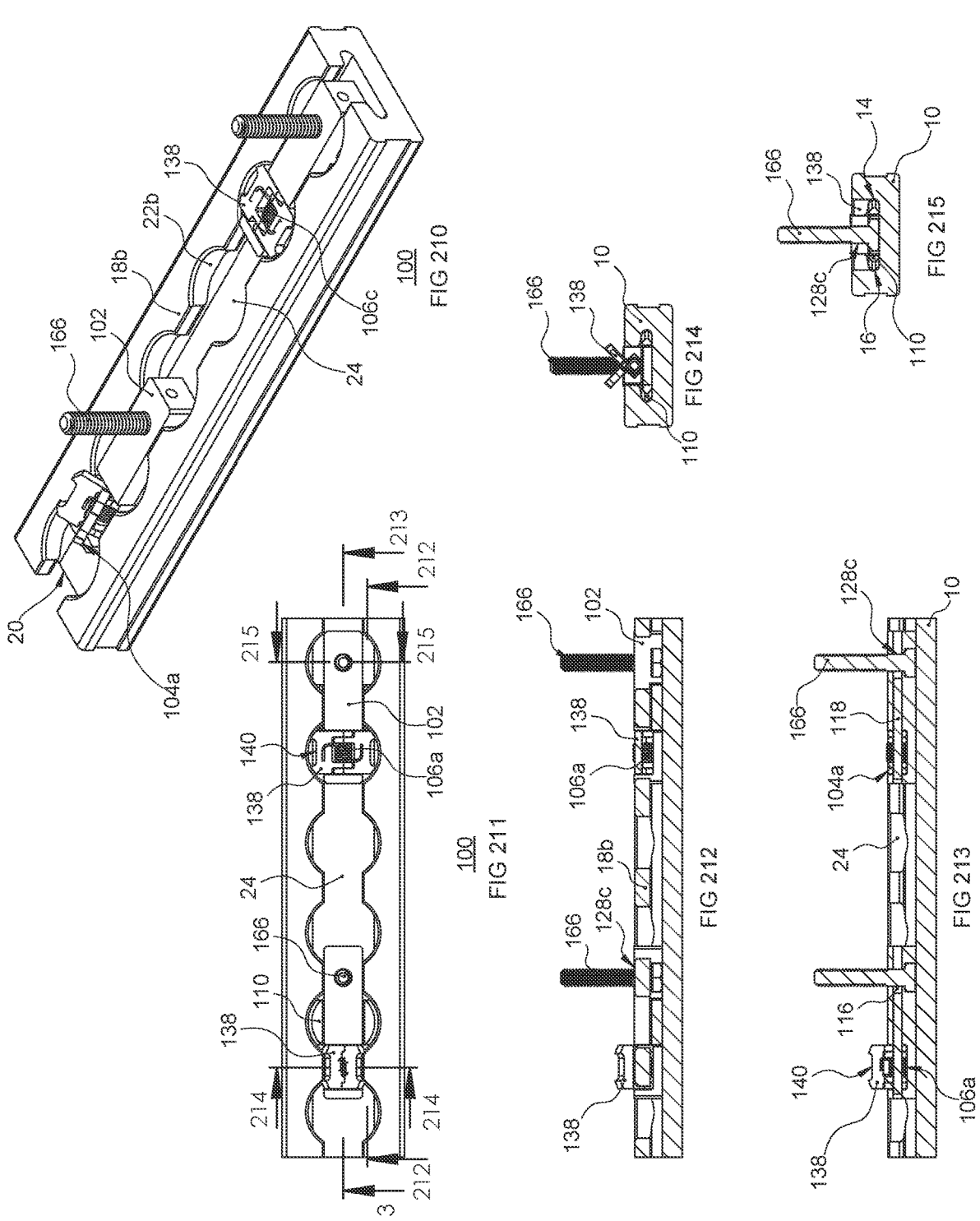

SEAT TRACK STRIKER FITTING ASSEMBLIES

BACKGROUND OF THE INVENTION

1. Field of the Invention

This invention generally relates to seat track striker fitting assemblies.

2. Description of the Related Art

Seat, cargo, and airline tracks with long C-shaped extrusions with evenly spaced holes along the flanges are commonly used in aviation and ground transportation for securing assemblies and cargo using specifically designed fittings for these tracks. Traditional fittings are positive locking devices that use thick, heavy washers to lock them into place. In recent years, accidental disengagement of traditional locking features has led to fittings having bulky and heavy designs to ensure continuous engagement. These locking features keep the fittings in place and reduce noise and rattles caused by turbulence and operational vibration. However, the newer fittings use various fasteners, e.g., threaded parts, screws, levers, or springs, that engage other mechanical parts for final engagement with the seat track. The traditional and newer fittings require tools and risk the parts rotating out of position from vibrations during operation. Using these fittings increases the fitting's size, weight, and complexity. In addition, these prior complex fitting designs have more points of failure and may disengage if the screws back out from vibration under load or accidental contact is made with the lever. Moreover, these traditional and newer fittings use a spring or other biasing mechanism to help release or remove the fastener under positive disengagement.

BRIEF SUMMARY OF THE INVENTION

Accordingly, the invention is directed to an improved seat track striker fitting assembly that is smaller, weighs less, does not require tools to install or remove, and offers multiple redundant locking mechanisms.

The invention is further directed to a seat track striker fitting assembly with a rotational or movable striker assembly having a mechanical biasing mechanism to provide positive engagement or force to retain the seat track striker fitting assembly within a seat track such that the striker fitting assembly will not disengage under the action of any forces or components of forces to which it is subject during normal use.

In general, in a first aspect, the invention relates to a seat track striker fitting assembly that is removably securable to a seat track. The seat track striker fitting assembly has a base fitting body with opposed, laterally protruding feet or shoulders and at least one attachment mechanism. The base fitting body also has at least one pin conduit configured to removably secure a pin mechanism to a striker body channel or opening. The seat track striker fitting assembly also has a striker assembly with a striker body engaged with the pin mechanism of the base fitting body. The striker assembly has a mechanical biasing mechanism configured to provide positive engagement or force on the striker body toward an engaged position with the seat track.

In one embodiment, the protruding feet or shoulders of the base fitting body are crescent-shaped and are configured to engage the seat track to prevent vertical movement of the seat striker fitting assembly in the engaged position.

In one embodiment, upright surfaces of the base fitting body extend generally perpendicular to the protruding feet or shoulders and are configured to engage the seat track to prevent lateral movement of the seat striker fitting assembly in the engaged position.

In one embodiment, the attachment mechanism has a threaded mounting socket, a push button mounting socket, a through mounting bore, a structural mass body having one or more attachment features, or a combination thereof configured to removably fasten or attach a part, assembly, or object to the seat track striker fitting assembly.

In one embodiment, the attachment feature of the structural mass body comprises a threaded stud, a through connection bore, or a combination thereof.

In one embodiment, the base fitting body further is an elongate base fitting body with the striker body channel and a longitudinal pin conduit having terminal striker pin sockets.

In one embodiment, the elongate base fitting body further includes an attachment mechanism channel in a lower portion of the elongate base fitting body, and the attachment mechanism channel is connected to the attachment mechanism.

In one embodiment, the striker pin sockets are coaxially aligned and axially spaced longitudinally along the longitudinal pin conduit of the elongate base fitting body.

In one embodiment, the base fitting body is a structural mass fitting body with the striker body opening and the pin conduit having terminal striker pin sockets.

In one embodiment, the striker pin sockets are coaxially aligned and axially spaced along the pin conduit of the structural mass fitting body.

In one embodiment, the striker assembly is configured to rotate about or move along the pin mechanism against the positive engagement or force provided by the mechanical biasing mechanism to a disengaged position.

In one embodiment, the striker assembly is a rotational striker assembly, a movable striker assembly, or a combination thereof.

In one embodiment, the rotational striker assembly has a butterfly or torsion spring connected to striker body leaves to provide the positive engagement or force toward the engaged position.

In one embodiment, the striker body leaves have rotation leaf apertures for receipt of the pin mechanism, and the striker body leaves are configured to rotate about a horizontal axis of the pin mechanism between the engaged position and the disengaged position.

In one embodiment, the striker body leaves are low-profile striker body leaves, embossed striker body leaves, bridged striker body leaves, or a combination thereof.

In one embodiment, the striker body leaves have an arcuate, crescent-shaped terminal edge.

In one embodiment, the low-profile striker body leaves has a slot.

In one embodiment, the embossed striker body leaves have an upright embossment with the arcuate, crescent-shaped terminal edge.

In one embodiment, the bridged striker body leaves have an upright embossment with the arcuate, crescent-shaped terminal edge, and the embossment further has a bridged pin conduit.

In one embodiment, the striker assembly has at least two sets of bridged striker body leaves connected with a bridged pin secured in the bridged pin conduits of adjacent bridged striker body leaves.

In one embodiment, the movable striker assembly has a compression spring connected to a movable striker body to provide the positive engagement or force toward the engaged position.

In one embodiment, the striker body has a vertical pin aperture for receipt of the pin mechanism, and the movable striker body is configured to move axially along a vertical axis of the pin mechanism between the engaged position and the disengaged position.

In one embodiment, the movable striker body is a low-profile striker body, an embossed striker body, a bridged striker body, or a combination thereof.

In one embodiment, the movable striker body has arcuate, crescent-shaped terminal edges.

In one embodiment, the low-profile striker body has a slot.

In one embodiment, the embossed striker body has upright embossments with the arcuate, crescent-shaped terminal edges.

In one embodiment, the bridged striker body has upright embossments with the arcuate, crescent-shaped terminal edges, wherein the embossments further comprise bridged pin conduits.

In one embodiment, the striker assembly has at least two sets of bridged striker bodies connected with a bridged pin secured in the bridged pin conduits of adjacent bridged striker bodies.

In general, in a second aspect, the invention relates to a seat track striker fitting assembly attachable to a seat track. The seat track has inwardly extending flange portions spaced apart to form a groove extending longitudinally along a length of the seat track. The seat track also has crescent-shaped openings formed by the inwardly extending flange portions to form a series of circular receptacles spaced longitudinally along a length of the seat track.

The seat track striker fitting assembly includes a base fitting body with opposed, laterally protruding crescent-shaped feet or shoulders having a total width equal to or less than a width of the receptacle formed by the flange portions of the seat track. The crescent-shaped feet or shoulders are configured to engage the inwardly extending flange portions of the seat track to prevent vertical movement of the seat striker fitting assembly when engaged with the seat track. The base fitting body also has upright surfaces extending generally perpendicular to the crescent-shaped feet or shoulders, and the upright surfaces are configured to engage the inwardly extending flange portions of the seat track to prevent lateral movement of the seat striker fitting assembly when engaged with the seat track. The base fitting body further includes a striker body channel or opening and a pin conduit configured to span the striker body channel or opening. The pin conduit has pin sockets coaxially aligned and axially spaced along the pin conduit. The base fitting body also has at least one attachment mechanism.

The seat track striker fitting assembly also includes a rotational striker assembly removably connected to the striker body channel or opening of the base fitting body. The rotational striker assembly has a pin mechanism removably secured within the pin conduit of the base fitting body. Striker body leaves have arcuate, crescent-shaped terminal edges configured to engage the crescent-shaped openings of the seat track to prevent the longitudinal movement of the seat striker fitting assembly when engaged with the seat track. The striker body leaves have rotation leaf apertures configured to receive the pin mechanism. A butterfly or torsion spring is configured to provide positive engagement or force on the striker assembly toward an engaged position, and the striker body leaves are configured to rotate about the pin mechanism against the positive engagement or force provided by the butterfly or torsion spring to a disengaged position. The butterfly or torsion spring, the pin mechanism, and the rotation leaf apertures of the striker body leaves are coaxially aligned and axially spaced along the pin conduit of the elongate base fitting body.

In one embodiment, the attachment mechanism is configured to removably fasten or attach the part, assembly, or object to the seat track striker fitting assembly using a fastener, and the fastener is a bolt, a screw, a stud, a push-button pin, a connection rod, a tie, or a combination thereof.

In one embodiment, the attachment mechanism is a threaded mounting socket, a push button mounting socket, a through mounting bore, a structural mass body having one or more attachment features, or a combination thereof.

In one embodiment, the base fitting body is an elongate base fitting body having the striker body channel and a longitudinal pin conduit with terminal pin sockets, and the terminal pin sockets are coaxially aligned and axially spaced longitudinally along the longitudinal pin conduit of the elongate base fitting body.

In one embodiment, the elongate base fitting body has an attachment mechanism channel in a lower portion of the elongate base fitting body, and the attachment mechanism channel is connected to the attachment mechanism.

In one embodiment, the base fitting body is a structural mass fitting body having the striker body opening and the pin conduit with terminal pin sockets, and the terminal pin sockets are coaxially aligned and axially spaced along the pin conduit of the structural mass fitting body.

In one embodiment, the elongate base fitting body has an attachment mechanism channel in a lower portion of the elongate base fitting body, and the attachment mechanism channel is connected to the attachment mechanism.

In one embodiment, the striker body leaves are configured to rotate about a horizontal axis of the pin mechanism in a longitudinal pin conduit between the engaged position and the disengaged position.

In one embodiment, the striker body leaves are low-profile striker body leaves, embossed striker body leaves, bridged striker body leaves, or a combination thereof.

In one embodiment, the low-profile striker body leaves have a slot.

In one embodiment, the embossed striker body leaves have an upright embossment with the arcuate, crescent-shaped terminal edge.

In one embodiment, the bridged striker body leaves have an upright embossment with the arcuate, crescent-shaped terminal edge, and the embossment further has a bridged pin conduit.

In one embodiment, the striker assembly has at least two sets of bridged striker body leaves connected with a bridged pin secured in the bridged pin conduits of adjacent bridged striker body leaves.

In general, in a third aspect, the invention relates to a seat track striker fitting assembly attachable to a seat track. The seat track has inwardly extending flange portions spaced apart to form a groove extending longitudinally along a length of the seat track. The seat track also has crescent-shaped openings formed by the inwardly extending flange portions to form a series of circular receptacles spaced longitudinally along a length of the seat track.

The seat track striker fitting assembly includes a structural mass base fitting body having opposed, laterally protruding crescent-shaped feet or shoulders and at least one attachment mechanism. The crescent-shaped feet or shoulders have a total width equal to or less than a width of the receptacle formed by the flange portions of the seat track. The crescent-shaped feet or shoulders are configured to engage the inwardly extending flange portions of the seat track to prevent vertical movement of the seat striker fitting assembly when engaged with the seat track. The structural mass base fitting body also has upright surfaces extending generally perpendicular to the crescent-shaped feet or shoulders. The upright surfaces are configured to engage the inwardly extending flange portions of the seat track to prevent lateral movement of the seat striker fitting assembly when engaged with the seat track. The structural mass base fitting body also has a striker body opening and a pin conduit configured to span the striker body opening. The pin conduit has pin sockets coaxially aligned and axially spaced along the pin conduit The seat track striker fitting assembly also includes a movable striker assembly removably connected to the striker body opening of the base fitting body. The movable striker assembly has a pin mechanism removably secured within the pin conduit of the base fitting body. A movable striker body has arcuate, crescent-shaped terminal edges configured to engage the crescent-shaped openings of the seat track to prevent the longitudinal movement of the seat striker fitting assembly when engaged with the seat track. The moveable striker body also has a pin aperture configured to receive the pin mechanism. A compression spring is configured to provide positive engagement or force on the striker assembly toward an engaged position, and the movable striker assembly is configured to move along the pin mechanism against the positive engagement or force provided by the compression spring to a disengaged position. The compression spring, the pin mechanism, and the pin aperture of the movable striker body are coaxially aligned and axially spaced along the pin conduit of the base fitting body.

In one embodiment, the attachment mechanism is configured to removably fasten or attach the part, assembly, or object to the seat track striker fitting assembly using a fastener, and the fastener is a bolt, a screw, a stud, a push-button pin, a connection rod, a tie, or a combination thereof.

In one embodiment, the attachment mechanism is a threaded mounting socket, a push button mounting socket, a through mounting bore, a structural mass body having one or more attachment features, or a combination thereof.

In one embodiment, the structural mass fitting body has the striker body opening and a vertical pin conduit with terminal pin sockets, and the terminal pin sockets are coaxially aligned and axially spaced along the vertical pin conduit of the structural mass fitting body.

In one embodiment, the movable striker body is configured to move axially along a vertical axis of the pin mechanism in a vertical pin conduit between the engaged position and the disengaged position.

In one embodiment, the movable striker body is a low-profile striker body, an embossed striker body, a bridged striker body, or a combination thereof.

In one embodiment, the low-profile striker body has a slot.

In one embodiment, the embossed striker body has upright embossments with the arcuate, crescent-shaped terminal edges.

In one embodiment, the bridged striker body has upright embossments with the arcuate, crescent-shaped terminal edges, wherein the embossments further comprise bridged pin conduits.

In one embodiment, at least two sets of bridged striker bodies connected with a bridged pin secured in the bridged pin conduits of adjacent bridged striker bodies.

BRIEF DESCRIPTION OF THE DRAWINGS

The above and other objects and advantages of this invention may be more clearly seen when viewed in conjunction with the accompanying drawing wherein:

FIG. 4 is a perspective view of an example of a base fitting body having a through mounting bore and configured for receipt of a rotational striker assembly in accordance with an illustrative embodiment of the invention disclosed herein.

FIG. 5 is a perspective view of an example of a base fitting body having a plurality of mounting sockets and configured for receipt of a rotational striker assembly in accordance with an illustrative embodiment of the invention disclosed herein.

FIG. 18 is a perspective view of an example of a seat track striker fitting assembly having a base fitting body with a threaded mounting socket and an embossed, rotational striker assembly in an engaged position in accordance with an illustrative embodiment of the invention disclosed herein.

FIG. 19 is a top plan view of the seat track striker fitting assembly shown in FIG. 18.

FIG. 20 is a bottom plan view of the seat track striker fitting assembly shown in FIG. 18.

FIG. 21 is a side elevation view of the seat track striker fitting assembly shown in FIG. 18, with the opposing side view being a mirror image thereof.

FIG. 22 is an end elevation view of the seat track striker fitting assembly shown in FIG. 18.

FIG. 23 is a cross-sectional view along lines 23-23 of the rotational striker fitting assembly shown in FIG. 19.

FIG. 24 is a perspective view of the seat track striker fitting assembly shown in FIG. 18 in a disengaged position in accordance with an illustrative embodiment of the invention disclosed herein.

FIG. 25 is a top plan view of the seat track striker fitting assembly shown in FIG. 24.

FIG. 26 is a bottom plan view of the seat track striker fitting assembly shown in FIG. 24.

FIG. 27 is a side elevation view of the seat track striker fitting assembly shown in FIG. 24, with the opposing side view being a mirror image thereof.

FIG. 28 is an end elevation view of the seat track striker fitting assembly shown in FIG. 24.

FIG. 29 is a cross-sectional view along lines 29-29 of the seat track striker fitting assembly shown in FIG. 25.

FIG. 30 is a perspective view of a pair of seat track striker fitting assemblies shown in FIGS. 18-29 removably attached to a seat track in accordance with an illustrative embodiment of the invention disclosed herein.

FIG. 31 is a top plan view of the seat track striker fitting assemblies removably attached to the seat track shown in FIG. 30.

FIG. 32 is a side, partial cutaway elevation view along lines 32-32 of the seat track striker fitting assemblies removably attached to the seat track shown in FIG. 31.

FIG. 33 is a side cross-sectional view along lines 33-33 of the seat track striker fitting assemblies removably attached to the seat track shown in FIG. 31.

FIG. 34 is an end, cross-sectional elevation view along lines 34-34 of the seat track striker fitting assemblies removably attached to the seat track shown in FIG. 31.

FIG. 35 is an end, cross-sectional elevation view along lines 35-35 of the rotational striker fitting assemblies removably attached to the seat track shown in FIG. 31.

FIG. 36 is a perspective view of an example of a seat track striker fitting assembly having a base fitting body with a push button mounting socket and a low-profile, rotational striker assembly in an engaged position in accordance with an illustrative embodiment of the invention disclosed herein.

FIG. 37 is a top plan view of the seat track striker fitting assembly shown in FIG. 36.

FIG. 38 is a bottom plan view of the seat track striker fitting assembly shown in FIG. 36.

FIG. 39 is a side elevation view of the seat track striker fitting assembly shown in FIG. 36, with the opposing side view being a mirror image thereof.

FIG. 40 is an end elevation view of the seat track striker fitting assembly shown in FIG. 36.

FIG. 41 is a cross-sectional view along lines 41-41 of the rotational striker fitting assembly shown in FIG. 37.

FIG. 42 is a perspective view of the seat track striker fitting assembly shown in FIG. 36 in a disengaged position in accordance with an illustrative embodiment of the invention disclosed herein.

FIG. 43 is a top plan view of the seat track striker fitting assembly shown in FIG. 42.

FIG. 44 is a bottom plan view of the seat track striker fitting assembly shown in FIG. 42.

FIG. 45 is a side elevation view of the seat track striker fitting assembly shown in FIG. 42, with the opposing side view being a mirror image thereof.

FIG. 46 is an end elevation view of the seat track striker fitting assembly shown in FIG. 42.

FIG. 47 is a cross-sectional view along lines 47-47 of the seat track striker fitting assembly shown in FIG. 43.

FIG. 72 is a perspective view of an example of a seat track striker fitting assembly having a base fitting body having a structural mass body with a through connection bore and a pair of embossed, rotational striker assemblies in
    an engaged position in accordance with an illustrative embodiment of the invention disclosed herein.

FIG. 73 is a top plan view of the seat track striker fitting assembly shown in FIG. 72.

FIG. 74 is a bottom plan view of the seat track striker fitting assembly shown in FIG. 72.

FIG. 75 is a side elevation view of the seat track striker fitting assembly shown in FIG. 72, with the opposing side view being a mirror image thereof.

FIG. 76 is an end elevation view of the seat track striker fitting assembly shown in FIG. 72.

FIG. 77 is a cross-sectional view along lines 77-77 of the rotational striker fitting assembly shown in FIG. 73.

FIG. 78 is a perspective view of the seat track striker fitting assembly shown in FIG. 72 in a disengaged position in accordance with an illustrative embodiment of the invention disclosed herein.

FIG. 79 is a top plan view of the seat track striker fitting assembly shown in FIG. 78.

FIG. 80 is a bottom plan view of the seat track striker fitting assembly shown in FIG. 78.

FIG. 81 is a side elevation view of the seat track striker fitting assembly shown in FIG. 78, with the opposing side view being a mirror image thereof.

FIG. 82 is an end elevation view of the seat track striker fitting assembly shown in FIG. 79.

FIG. 83 is a cross-sectional view along lines 83-83 of the seat track striker fitting assembly shown in FIG. 79.

FIG. 84 is a perspective view of a pair of seat track striker fitting assemblies shown in FIGS. 72-83 removably attached to a seat track in accordance with an illustrative embodiment of the invention disclosed herein.

FIG. 85 is a top plan view of the seat track striker fitting assemblies removably attached to the seat track shown in FIG. 84.

FIG. 86 is a side, partial cutaway elevation view along lines 86-86 of the seat track striker fitting assemblies removably attached to the seat track shown in FIG. 85.

FIG. 87 is a side cross-sectional view along lines 87-87 of the seat track striker fitting assemblies removably attached to the seat track shown in FIG. 85.

FIG. 88 is an end, cross-sectional elevation view along lines 88-88 of the seat track striker fitting assemblies removably attached to the seat track shown in FIG. 85.

FIG. 89 is an end, cross-sectional elevation view along lines 89-89 of the rotational striker fitting assemblies removably attached to the seat track shown in FIG. 85.

FIG. 102 is a perspective view of a pair of seat track striker fitting assemblies shown in FIGS. 90-101 removably attached to a seat track in accordance with an illustrative embodiment of the invention disclosed herein.

FIG. 103 is a top plan view of the seat track striker fitting assemblies removably attached to the seat track shown in FIG. 102.

FIG. 104 is a side, partial cutaway elevation view along lines 104-104 of the seat track striker fitting assemblies removably attached to the seat track shown in FIG. 103.

FIG. 105 is a side cross-sectional view along lines 105-105 of the seat track striker fitting assemblies removably attached to the seat track shown in FIG. 103.

FIG. 106 is an end, cross-sectional elevation view along lines 106-106 of the seat track striker fitting assemblies removably attached to the seat track shown in FIG. 103.

FIG. 107 is an end, cross-sectional elevation view along lines 107-107 of the rotational striker fitting assemblies removably attached to the seat track shown in FIG. 103.

FIG. 108 is a perspective view of an example of a seat track striker fitting assembly having a base fitting body having a structural mass body with a through connection bore and a bridged, rotational striker assembly in an engaged position in accordance with an illustrative embodiment of the invention disclosed herein.

FIG. 109 is a top plan view of the seat track striker fitting assembly shown in FIG. 108.

FIG. 110 is a bottom plan view of the seat track striker fitting assembly shown in FIG. 108.

FIG. 111 is a side elevation view of the seat track striker fitting assembly shown in FIG. 108, with the opposing side view being a mirror image thereof.

FIG. 112 is an end elevation view of the seat track striker fitting assembly shown in FIG. 108.

FIG. 113 is a cross-sectional view along lines 113-113 of the rotational striker fitting assembly shown in FIG. 109.

FIG. 114 is a perspective view of the seat track striker fitting assembly shown in FIG. 108 in a disengaged position in accordance with an illustrative embodiment of the invention disclosed herein.

FIG. 115 is a top plan view of the seat track striker fitting assembly shown in FIG. 114.

FIG. 116 is a bottom plan view of the seat track striker fitting assembly shown in FIG. 114.

FIG. 117 is a side elevation view of the seat track striker fitting assembly shown in FIG. 114, with the opposing side view being a mirror image thereof.

FIG. 118 is an end elevation view of the seat track striker fitting assembly shown in FIG. 114.

FIG. 119 is a cross-sectional view along lines 119-119 of the seat track striker fitting assembly shown in FIG. 115.

FIG. 120 is a perspective view of a pair of seat track striker fitting assemblies shown in FIGS. 108-119 removably attached to a seat track in accordance with an illustrative embodiment of the invention disclosed herein.

FIG. 121 is a top plan view of the seat track striker fitting assemblies removably attached to the seat track shown in FIG. 114.

FIG. 122 is a side, partial cutaway elevation view along lines 122-122 of the seat track striker fitting assemblies removably attached to the seat track shown in FIG. 121.

FIG. 123 is a side cross-sectional view along lines 123-123 of the seat track striker fitting assemblies removably attached to the seat track shown in FIG. 121.

FIG. 124 is an end, cross-sectional elevation view along lines 124-124 of the seat track striker fitting assemblies removably attached to the seat track shown in FIG. 121.

FIG. 125 is an end, cross-sectional elevation view along lines 125-125 of the rotational striker fitting assemblies removably attached to the seat track shown in FIG. 121.

FIG. 126 is a perspective view of an example of a seat track striker fitting assembly having a base fitting body having a structural mass body with a through connection bore and an embossed movable striker assembly in an engaged position in accordance with an illustrative embodiment of the invention disclosed herein.

FIG. 127 is a top plan view of the seat track striker fitting assembly shown in FIG. 126.

FIG. 128 is a bottom plan view of the seat track striker fitting assembly shown in FIG. 126.

Figure 1A:
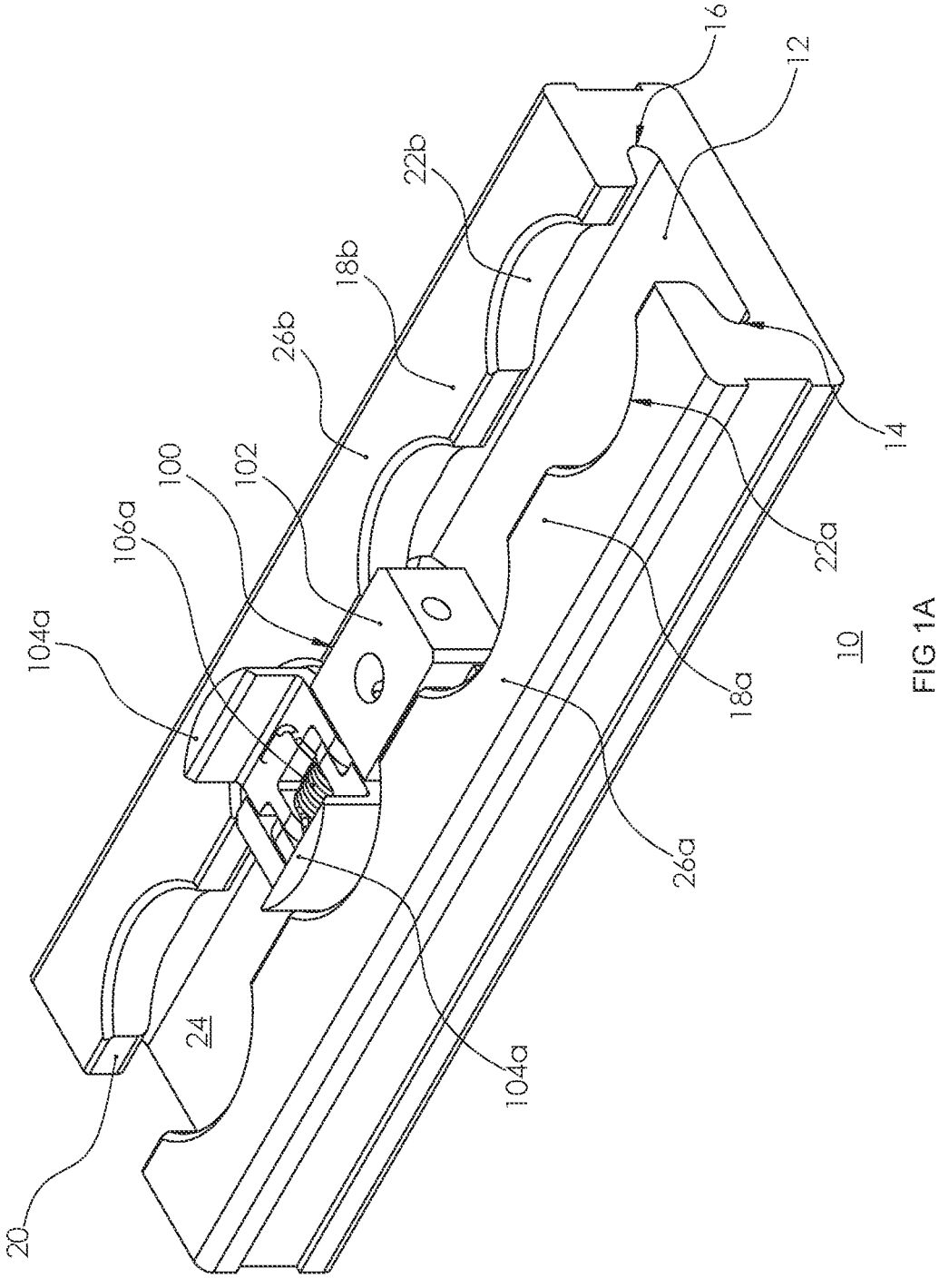
FIG. 1A is a top perspective view of a conventional seat track with an example of a seat track striker fitting assembly engaged therewith in accordance with an illustrative embodiment of the invention disclosed here.

FIG. 129 is a side elevation view of the seat track striker fitting assembly shown in FIG. 126, with the opposing side view being a mirror image thereof.

FIG. 130 is an end elevation view of the seat track striker fitting assembly shown in FIG. 126.

FIG. 131 is a cross-sectional view along lines 131-131 of the rotational striker fitting assembly shown in FIG. 127.

FIG. 132 is a perspective view of the seat track striker fitting assembly shown in FIG. 126 in a disengaged position in accordance with an illustrative embodiment of the invention disclosed herein.

FIG. 133 is a top plan view of the seat track striker fitting assembly shown in FIG. 132.

FIG. 134 is a bottom plan view of the seat track striker fitting assembly shown in FIG. 132.

FIG. 135 is a side elevation view of the seat track striker fitting assembly shown in FIG. 132, with the opposing side view being a mirror image thereof.

FIG. 136 is an end elevation view of the seat track striker fitting assembly shown in FIG. 132.

FIG. 137 is a cross-sectional view along lines 137-137 of the seat track striker fitting assembly shown in FIG. 133.

FIG. 138 is a perspective view of a pair of seat track striker fitting assemblies, as shown in FIGS. 126-137, removably attached to a seat track in accordance with an illustrative embodiment of the invention disclosed herein.

FIG. 139 is a top plan view of the seat track striker fitting assemblies removably attached to the seat track shown in FIG. 138.

FIG. 140 is a side, partial cutaway elevation view along lines 140-140 of the seat track striker fitting assemblies removably attached to the seat track shown in FIG. 139.

FIG. 141 is a side cross-sectional view along lines 141-141 of the seat track striker fitting assemblies removably attached to the seat track shown in FIG. 139.

FIG. 142 is an end, cross-sectional elevation view along lines 142-142 of the seat track striker fitting assemblies removably attached to the seat track shown in FIG. 139.

FIG. 143 is an end, cross-sectional elevation view along lines 143-143 of the rotational striker fitting assemblies removably attached to the seat track shown in FIG. 139.

FIG. 144 is a perspective view of an example of a seat track striker fitting assembly having a base fitting body having a structural mass body with a through connection bore and a low-profile movable striker assembly in an engaged position in accordance with an illustrative embodiment of the invention disclosed herein.

FIG. 145 is a top plan view of the seat track striker fitting assembly shown in FIG. 144.

FIG. 146 is a bottom plan view of the seat track striker fitting assembly shown in FIG. 144.

FIG. 147 is a side elevation view of the seat track striker fitting assembly shown in FIG. 144, with the opposing side view being a mirror image thereof.

FIG. 148 is an end elevation view of the seat track striker fitting assembly shown in FIG. 144.

FIG. 149 is a cross-sectional view along lines 149-149 of the rotational striker fitting assembly shown in FIG. 145.

FIG. 150 is a perspective view of the seat track striker fitting assembly shown in FIG. 144 in a disengaged position in accordance with an illustrative embodiment of the invention disclosed herein.

FIG. 151 is a top plan view of the seat track striker fitting assembly shown in FIG. 150.

FIG. 152 is a bottom plan view of the seat track striker fitting assembly shown in FIG. 150.

FIG. 153 is a side elevation view of the seat track striker fitting assembly shown in FIG. 150, with the opposing side view being a mirror image thereof.

FIG. 154 is an end elevation view of the seat track striker fitting assembly shown in FIG. 150.

FIG. 155 is a cross-sectional view along lines 155-155 of the seat track striker fitting assembly shown in FIG. 151.

Figures 156, 157, 158, 159, 160, 161:
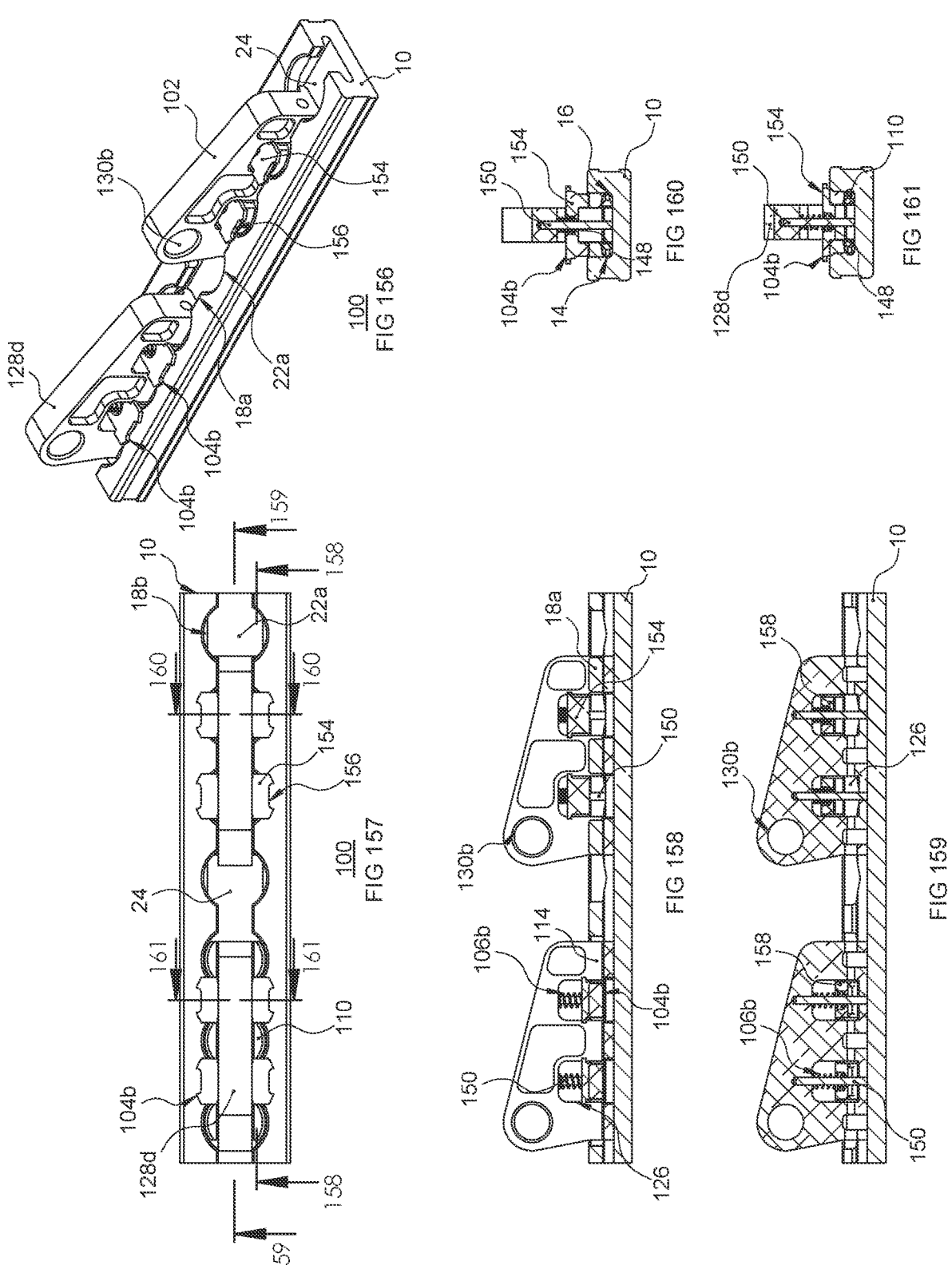

FIG. 156 is a perspective view of a pair of seat track striker fitting assemblies, as shown in FIGS. 144-155, removably attached to a seat track in accordance with an illustrative embodiment of the invention disclosed herein.

FIG. 157 is a top plan view of the seat track striker fitting assemblies removably attached to the seat track shown in FIG. 156.

FIG. 158 is a side, partial cutaway elevation view along lines 158-158 of the seat track striker fitting assemblies removably attached to the seat track shown in FIG. 157.

FIG. 159 is a side cross-sectional view along lines 159-159 of the seat track striker fitting assemblies removably attached to the seat track shown in FIG. 157.

FIG. 160 is an end, cross-sectional elevation view along lines 160-160 of the seat track striker fitting assemblies removably attached to the seat track shown in FIG. 157.

FIG. 161 is an end, cross-sectional elevation view along lines 161-161 of the rotational striker fitting assemblies removably attached to the seat track shown in FIG. 157.

FIG. 162 is a perspective view of an example of a seat track striker fitting assembly having a base fitting body having a structural mass body with a through connection bore and a bridged movable striker assembly in an engaged position in accordance with an illustrative embodiment of the invention disclosed herein.

FIG. 163 is a top plan view of the seat track striker fitting assembly shown in FIG. 162.

FIG. 164 is a bottom plan view of the seat track striker fitting assembly shown in FIG. 162.

FIG. 165 is a side elevation view of the seat track striker fitting assembly shown in FIG. 162, with the opposing side view being a mirror image thereof.

FIG. 166 is an end elevation view of the seat track striker fitting assembly shown in FIG. 162.

FIG. 167 is a cross-sectional view along lines 167-167 of the rotational striker fitting assembly shown in FIG. 163.

Figures 168, 169, 170, 171, 172, 173:
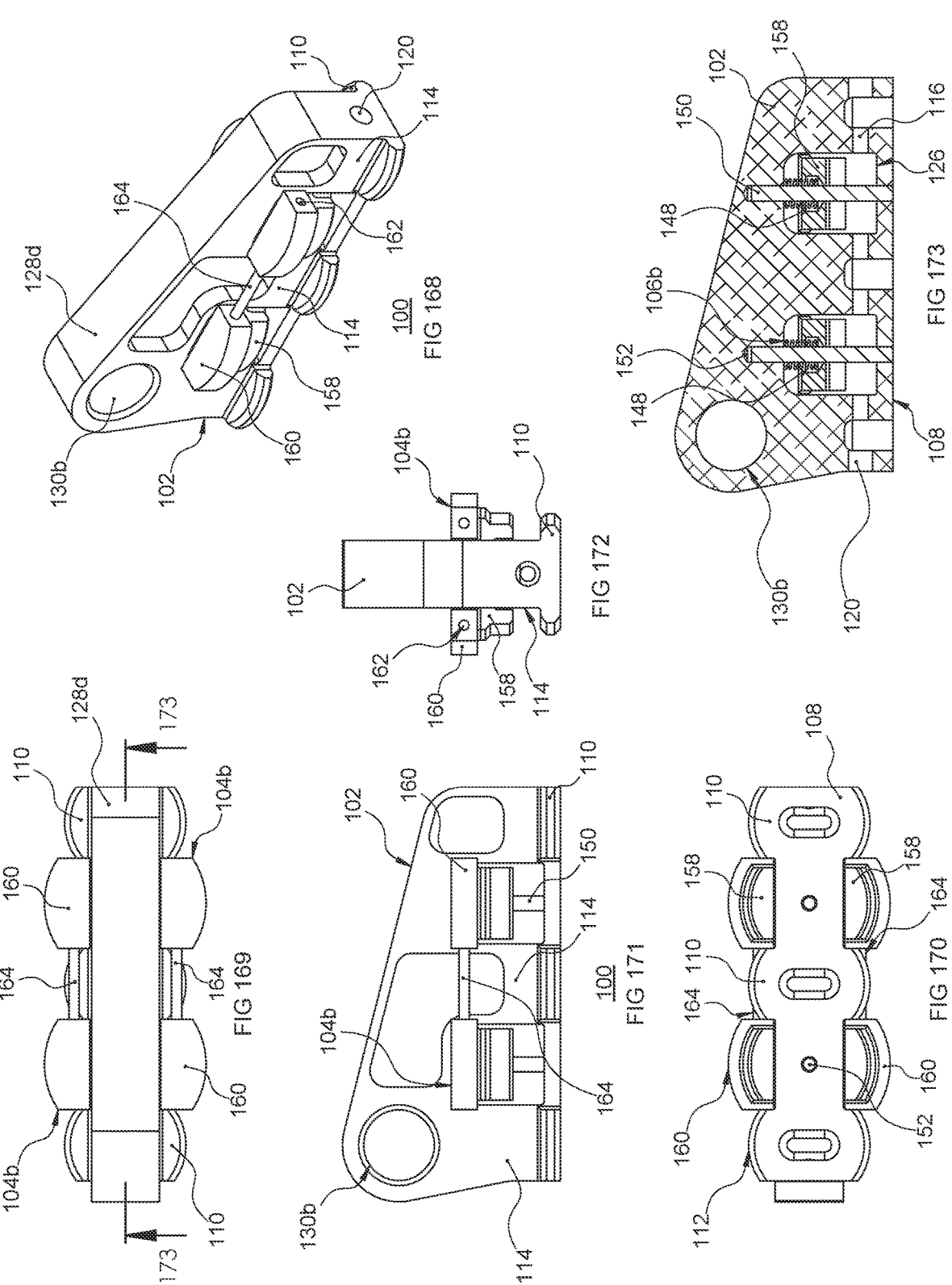

FIG. 168 is a perspective view of the seat track striker fitting assembly shown in FIG. 162 in a disengaged position in accordance with an illustrative embodiment of the invention disclosed herein.

FIG. 169 is a top plan view of the seat track striker fitting assembly shown in FIG. 168.

FIG. 170 is a bottom plan view of the seat track striker fitting assembly shown in FIG. 168.

FIG. 171 is a side elevation view of the seat track striker fitting assembly shown in FIG. 168, with the opposing side view being a mirror image thereof.

FIG. 172 is an end elevation view of the seat track striker fitting assembly shown in FIG. 168.

FIG. 173 is a cross-sectional view along lines 173-173 of the seat track striker fitting assembly shown in FIG. 169.

FIG. 174 is a perspective view of a pair of seat track striker fitting assemblies, as shown in FIGS. 162-173, removably attached to a seat track in accordance with an illustrative embodiment of the invention disclosed herein.

FIG. 175 is a top plan view of the seat track striker fitting assemblies removably attached to the seat track shown in FIG. 174.

FIG. 176 is a side, partial cutaway elevation view along lines 176-176 of the seat track striker fitting assemblies removably attached to the seat track shown in FIG. 175.

FIG. 177 is a side cross-sectional view along lines 177-177 of the seat track striker fitting assemblies removably attached to the seat track shown in FIG. 175.

FIG. 178 is an end, cross-sectional elevation view along lines 178-178 of the seat track striker fitting assemblies removably attached to the seat track shown in FIG. 175.

FIG. 179 is an end, cross-sectional elevation view along lines 179-179 of the rotational striker fitting assemblies removably attached to the seat track shown in FIG. 175.

FIG. 180 is a perspective, view of an example of a seat track striker fitting assembly having a base fitting body with a threaded bolt engaged with a through mounting bore in the base fitting body and an embossed rotational striker assembly in an engaged position in accordance with an illustrative embodiment of the invention disclosed herein.

FIG. 181 is a top plan view of the seat track striker fitting assembly shown in FIG. 180.

FIG. 182 is a bottom plan view of the seat track striker fitting assembly shown in FIG. 180.

FIG. 183 is a side elevation view of the seat track striker fitting assembly shown in FIG. 180, with the opposing side view being a mirror image thereof.

FIG. 184 is an end elevation view of the seat track striker fitting assembly shown in FIG. 180.

FIG. 185 is a cross-sectional view along lines 185-185 of the seat track striker fitting assembly shown in FIG. 181.

FIG. 186 is a perspective view of the seat track striker fitting assembly shown in FIG. 180 in a disengaged position in accordance with an illustrative embodiment of the invention disclosed herein.

FIG. 187 is a top plan view of the seat track striker fitting assembly shown in FIG. 186.

FIG. 188 is a bottom plan view of the seat track striker fitting assembly shown in FIG. 186.

FIG. 189 is a side elevation view of the seat track striker fitting assembly shown in FIG. 186, with the opposing side view being a mirror image thereof.

FIG. 190 is an end elevation view of the seat track striker fitting assembly shown in FIG. 186.

FIG. 191 is a cross-sectional view along lines 191-191 of the seat track striker fitting assembly shown in FIG. 187.

FIG. 192 is a perspective view of a pair of seat track striker fitting assemblies shown in FIGS. 180-191 removably attached to a seat track in accordance with an illustrative embodiment of the invention disclosed herein.

FIG. 193 is a top plan view of the seat track striker fitting assemblies removably attached to the seat track shown in FIG. 192.

FIG. 194 is a side, partial cutaway elevation view along lines 194-194 of the seat track striker fitting assemblies removably attached to the seat track shown in FIG. 193.

FIG. 195 is a side cross-sectional view along lines 195-195 of the seat track striker fitting assemblies removably attached to the seat track shown in FIG. 193.

FIG. 196 is an end, cross-sectional elevation view along lines 196-196 of the seat track striker fitting assemblies removably attached to the seat track shown in FIG. 193.

FIG. 197 is an end, cross-sectional elevation view along lines 197-197 of the rotational striker fitting assemblies removably attached to the seat track shown in FIG. 193.

FIG. 198 is a perspective, view of an example of a seat track striker fitting assembly having a base fitting body with a threaded bolt engaged with a through mounting bore in the base fitting body and a low-profile rotational striker assembly in an engaged position in accordance with an illustrative embodiment of the invention disclosed herein.

FIG. 199 is a top plan view of the seat track striker fitting assembly shown in FIG. 198.

FIG. 200 is a bottom plan view of the seat track striker fitting assembly shown in FIG. 198.

FIG. 201 is a side elevation view of the seat track striker fitting assembly shown in FIG. 198, with the opposing side view being a mirror image thereof.

FIG. 202 is an end elevation view of the seat track striker fitting assembly shown in FIG. 198.

FIG. 203 is a cross-sectional view along lines 185-185 of the seat track striker fitting assembly shown in FIG. 199.

FIG. 204 is a perspective view of the seat track striker fitting assembly shown in FIG. 198 in a disengaged position in accordance with an illustrative embodiment of the invention disclosed herein.

FIG. 205 is a top plan view of the seat track striker fitting assembly shown in FIG. 204.

FIG. 206 is a bottom plan view of the seat track striker fitting assembly shown in FIG. 204.

FIG. 207 is a side elevation view of the seat track striker fitting assembly shown in FIG. 204, with the opposing side view being a mirror image thereof.

FIG. 208 is an end elevation view of the seat track striker fitting assembly shown in FIG. 204.

FIG. 209 is a cross-sectional view along lines 209-209 of the seat track striker fitting assembly shown in FIG. 205.

FIG. 210 is a perspective view of a pair of seat track striker fitting assemblies shown in FIGS. 198-209, removably attached to a seat track in accordance with an illustrative embodiment of the invention disclosed herein.

FIG. 211 is a top plan view of the seat track striker fitting assemblies removably attached to the seat track shown in FIG. 210.

FIG. 212 is a side, partial cutaway elevation view along lines 213-213 of the seat track striker fitting assemblies removably attached to the seat track shown in FIG. 211.

FIG. 213 is a side cross-sectional view along lines 214-214 of the seat track striker fitting assemblies removably attached to the seat track shown in FIG. 211.

FIG. 214 is an end, cross-sectional elevation view along lines 215-215 of the seat track striker fitting assemblies removably attached to the seat track shown in FIG. 211.

FIG. 215 is an end, cross-sectional elevation view along lines 216-216 of the rotational striker fitting assemblies removably attached to the seat track shown in FIG. 211.

Figure 216:
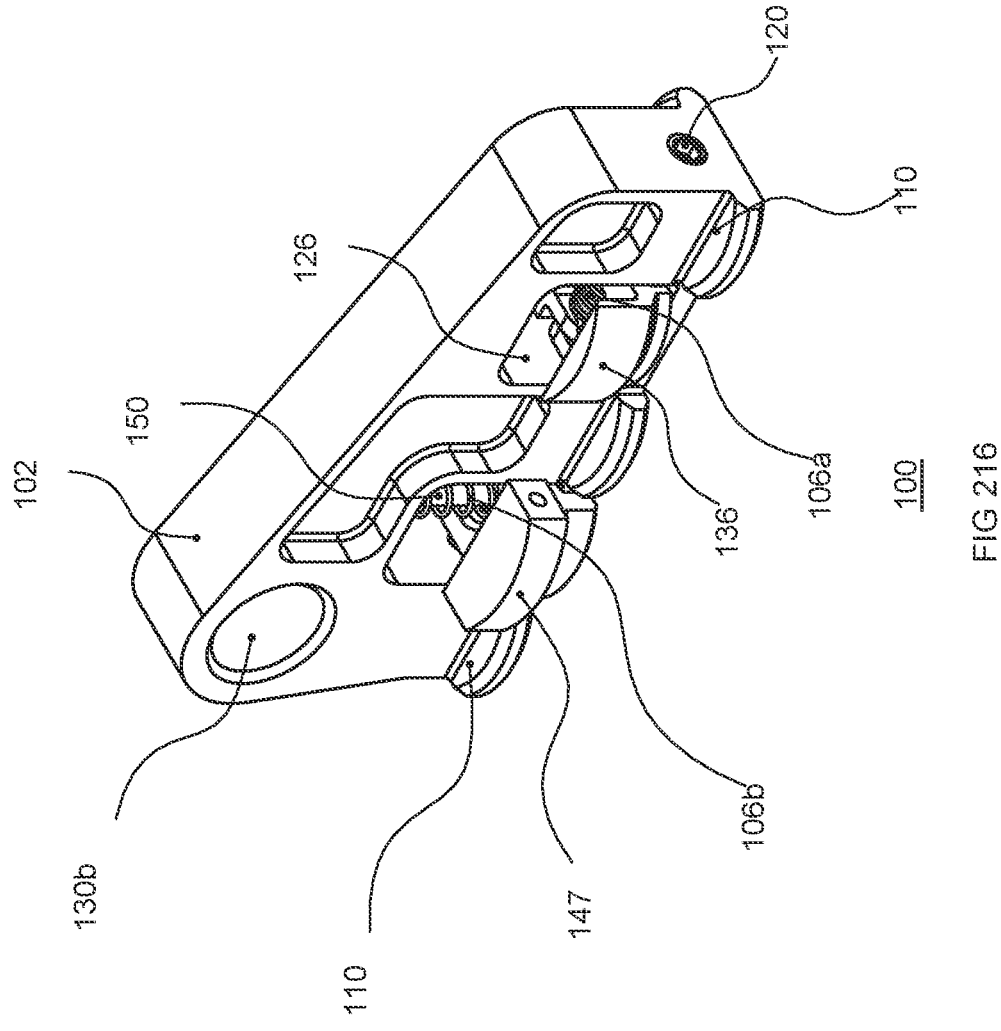

FIG. 216 is a perspective view of a seat track striker fitting assembly having a structural mass base fitting body with a rotational striker assembly and a movable striker assembly in accordance with an illustrative embodiment of the invention disclosed herein.

Figure 217:
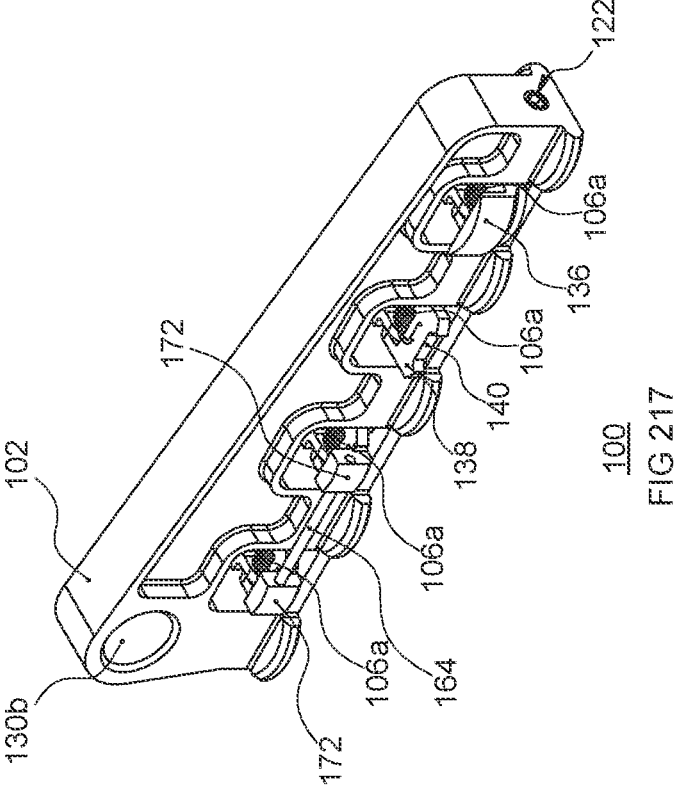

FIG. 217 is a perspective view of a seat track striker fitting assembly having a structural mass base fitting body with a low-profile rotational striker assembly, an embossed rotational striker assembly, and a bridged rotational striker assembly in accordance with an illustrative embodiment of the invention disclosed herein.

Figure 218:
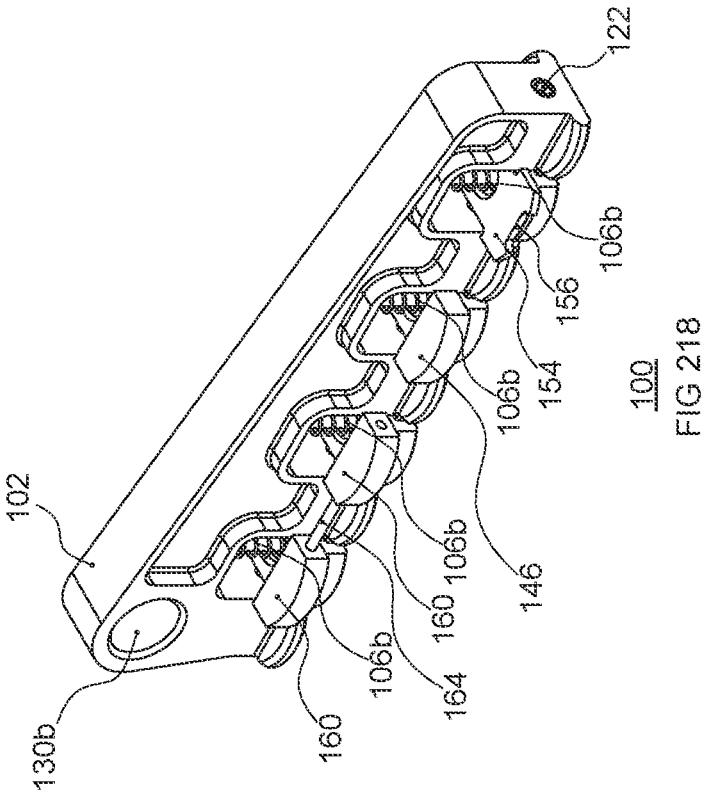

FIG. 218 is a perspective view of a seat track striker fitting assembly having a structural mass base fitting body with a low-profile moveable striker assembly, an embossed moveable striker assembly, and a bridged moveable striker assembly in accordance with an illustrative embodiment of the invention disclosed herein.

DETAILED DESCRIPTION OF THE INVENTION

This invention is susceptible to embodiment in many different forms, some of which are shown in the drawings and will be described in detail in some specific embodiments. It should be understood that the present disclosure is to be considered an exemplification of the principles of the invention and is not intended to limit the invention to the specific embodiments so described.

The invention is generally directed to a seat track striker fitting assembly with a mechanical biasing mechanism to provide positive engagement or force with a seat track such that the seat track striker fitting assembly will not disengage under the action of any forces or components of forces to which it is subject during operational use. The inventive seat track striker fitting assembly does not require tools to engage or disengage with the seat track, and the biasing mechanism of the striker fitting assembly positively engages with the seat track to restrict the movement of the fitting assembly.

The seat track striker fitting assembly has a base fitting body and a striker assembly removably attachable to the base fitting body. The base fitting body engages the seat track, and it can accept or attach various fasteners, such as bolts, screws, studs, push-button pins, connection rods, ties, or the like, to connect parts, assemblies, or other objects to the seat track striker fitting assembly. The base fitting body, the striker assembly, or both can be constructed from metal, aluminum, stainless steel, carbon fiber, or a combination thereof. The striker assembly can be configured to rotate about a horizontal axis or to move axially along a vertical axis to removably attach the seat track striker fitting assembly to the seat track. Using the positive engagement biasing mechanism, the striker assembly secures to the seat track, and the seat track retains opposing protrusions, shoulders, or feet of the base fitting assembly. The seat track striker fitting assembly can be removed from the seat track without tools by compressing the striker assembly's biasing mechanism and removing the base fitting body from the seat track.

Figure 1B:
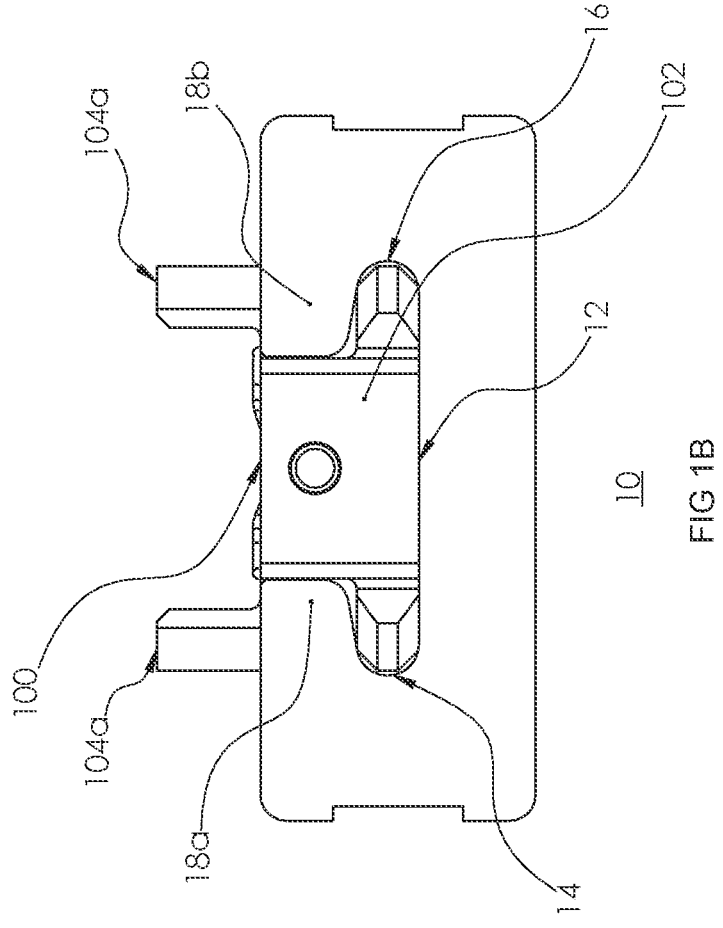
FIG. 1B is an end elevation view of the seat track striker fitting assembly shown in FIG. 1A.
Figure 1C:
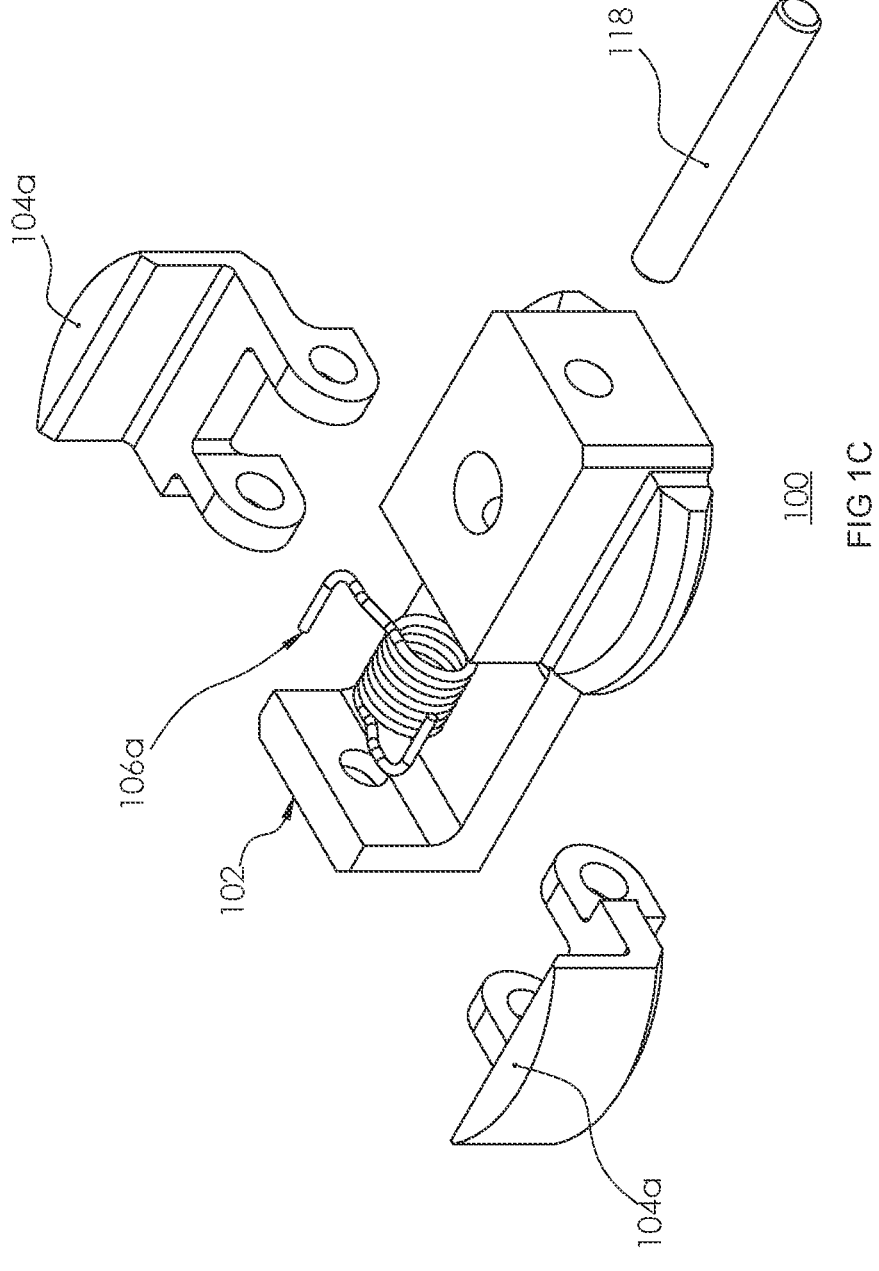
FIG. 1C is an exploded view of the seat track striker fitting assembly shown in FIGS. 1A and 1B.

Referring now to the figures of the drawings, wherein like numerals of reference designate like elements throughout the several views, and initially to FIGS. 1A-1C, a conventional seat track 10 has a bottom surface 12 extending between spaced side walls 14 and 16, which have inwardly extending flange portions 18*a* and 18*b* spaced apart to form a groove 20 extending longitudinally along a length of the track 10. Generally, crescent-shaped openings 22*a* and 22*b* are formed by the flanges 18*a* and 18*b* to form a series of circular receptacles 24 spaced longitudinally along the length of the track 10. The crescent-shaped openings 22a and 22b have track lip segments 26a and 26b extending along the groove 20. The seat track striker fitting assembly 100 can be attached to or removed from the seat track 10 without tools by compressing the mechanical biasing mechanism 106 of the striker assembly 104, sliding the seat track striker fitting assembly 100 along the groove 20 extending longitudinally along the length of the track 10, and securing/removing the seat track striker fitting assembly 100 to/from the seat track 10.

The track 10 exemplified in the drawings is of conventional design and forms no part of the invention except in combination with the seat track striker fitting assembly 100 described herein. A portion of a typical seat track 10 is illustrated in various figures to illustrate the cooperative relationship between the seat track striker fitting assembly 100 and the track 10. It will be appreciated that the seat track section 10 has a typical cross-section, but other configurations may be employed.

It will be appreciated that the track 10 and the seat track striker fitting assembly 100 could be secured to the fuselage of an aircraft or secured to structures other than aircraft, such as buses, trains, all-terrain vehicles, and other land and water-based vehicles. In addition, the seat track striker fitting assembly 100 can be employed for mounting structures other than aircraft seats or bulkhead cabinetry, such as cargo pallets or tie-down straps to the floor of aircraft, trucks, ships, buildings, and other structures, or for mounting parts, objects, accessories, or other assemblies in other vehicles.

As initially shown in FIGS. 2-11, the base fitting body 102 can be constructed as a unitary member or constructed in multiple segments. A lower portion 108 of the base fitting body 102 has opposed, laterally protruding crescent-shaped feet or shoulders 110 that have a total width equal to or less than the width of the receptacle 24, formed by the flanges 18a and 18b of the track 10, such that the lower portion 108 of the base fitting body 102 can be seated within the receptacle 24 and in sliding engagement with the groove 20. The opposed, laterally protruding feet or shoulders 110 of the base fitting body 102 can have tapered terminal ends 112 and engage the inwardly extending flange portions 18a and 18b to prevent vertical movement of the seat striker fitting assembly 100 when engaged with the seat track 10. The base fitting body 102 also has opposing upright surfaces 114 extending generally perpendicular from the feet 110 on the lower portion 108 of the base fitting body 102. The upright surfaces 114 of the base fitting body 102 are configured to engage the inwardly extending flange portions 18a and 18b to prevent lateral movement of the seat striker fitting assembly 100 when engaged with the seat track 10.

The base fitting body 102 also includes a horizontal or longitudinal striker pin conduit 116 and/or a vertical striker pin conduit 152 configured to receive a pin mechanism, namely a shaft, axle, or other rod or spindle, respectively, that is used to attach the striker assembly 104 to the base fitting body 102. Striker pin sockets 120 are coaxially aligned and axially spaced along the striker pin conduit 116 or 152 of the base fitting body 102. The striker pin sockets 120 can be threaded or a through bore and are configured to receive and retain a terminal end of the pin 118, such as by using a threaded set screw for the pin 118. Alternatively, the pin 118 can have threaded terminal ends or can be press-fit within at least one of the striker pin sockets 120. The base fitting body 102 can have a striker body channel 124, and the horizontal striker pin conduit 116 spans the striker body channel 124 and is configured to attach the striker assembly

104 to the base fitting body 102 such that a rotational striker assembly 104a can rotate about a horizontal axis. Alternatively, the base fitting body 102 can have a striker body opening 126, and the vertical striker pin conduit 152 spans the striker body opening 126 and is configured to attach the striker assembly 104 to the base fitting body 102 such that a movable striker assembly 104b can move axially along a vertical axis.

Figures 2, 3:
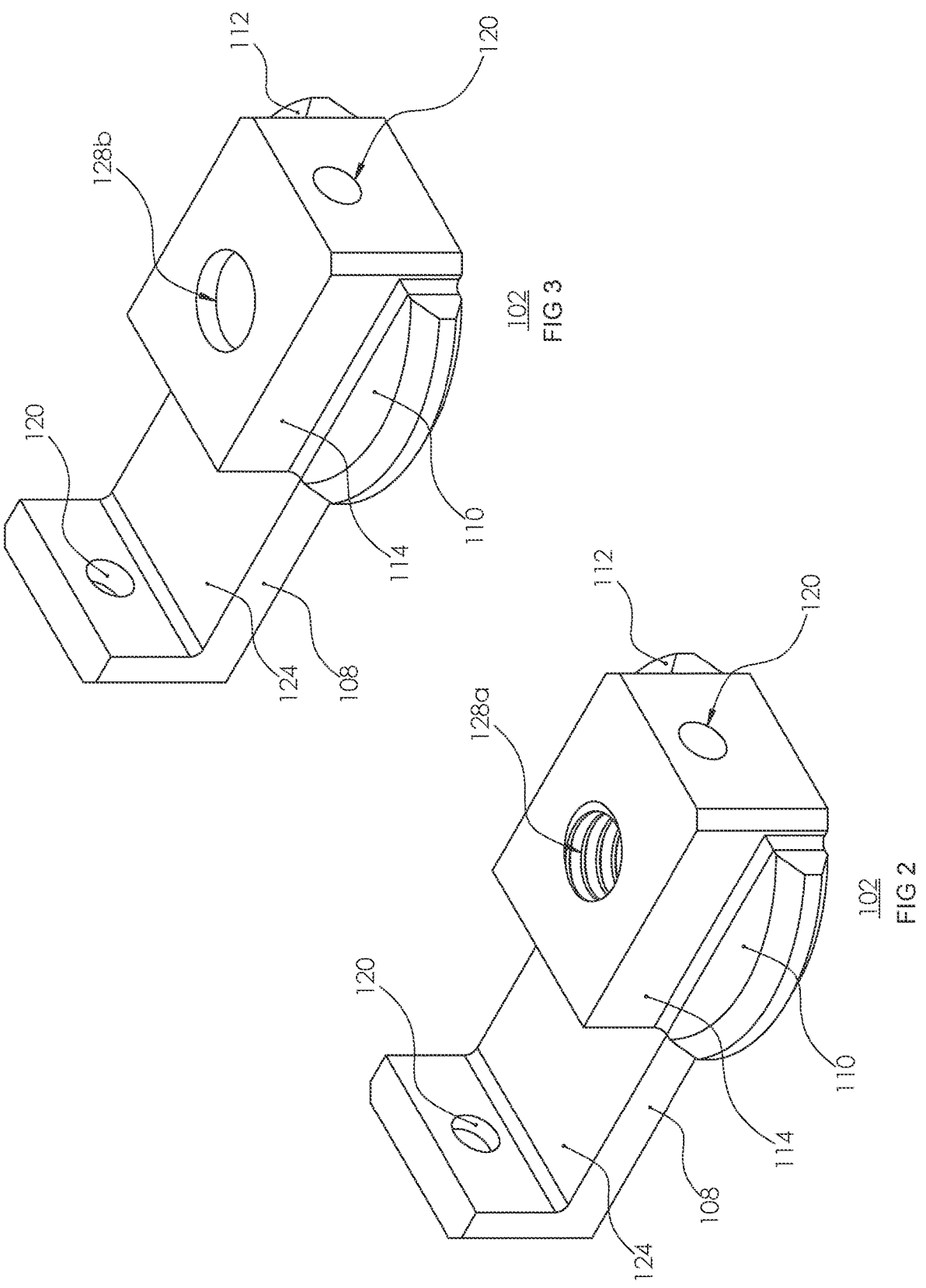
FIG. 2 is a perspective view of an example of a base fitting body having a threaded mounting socket and configured for receipt of a rotational striker assembly in accordance with an illustrative embodiment of the invention disclosed herein.
FIG. 3 is a perspective view of an example of a base fitting body having a push button mounting socket and configured for receipt of a rotational striker assembly in accordance with an illustrative embodiment of the invention disclosed herein.
Figures 6, 7:
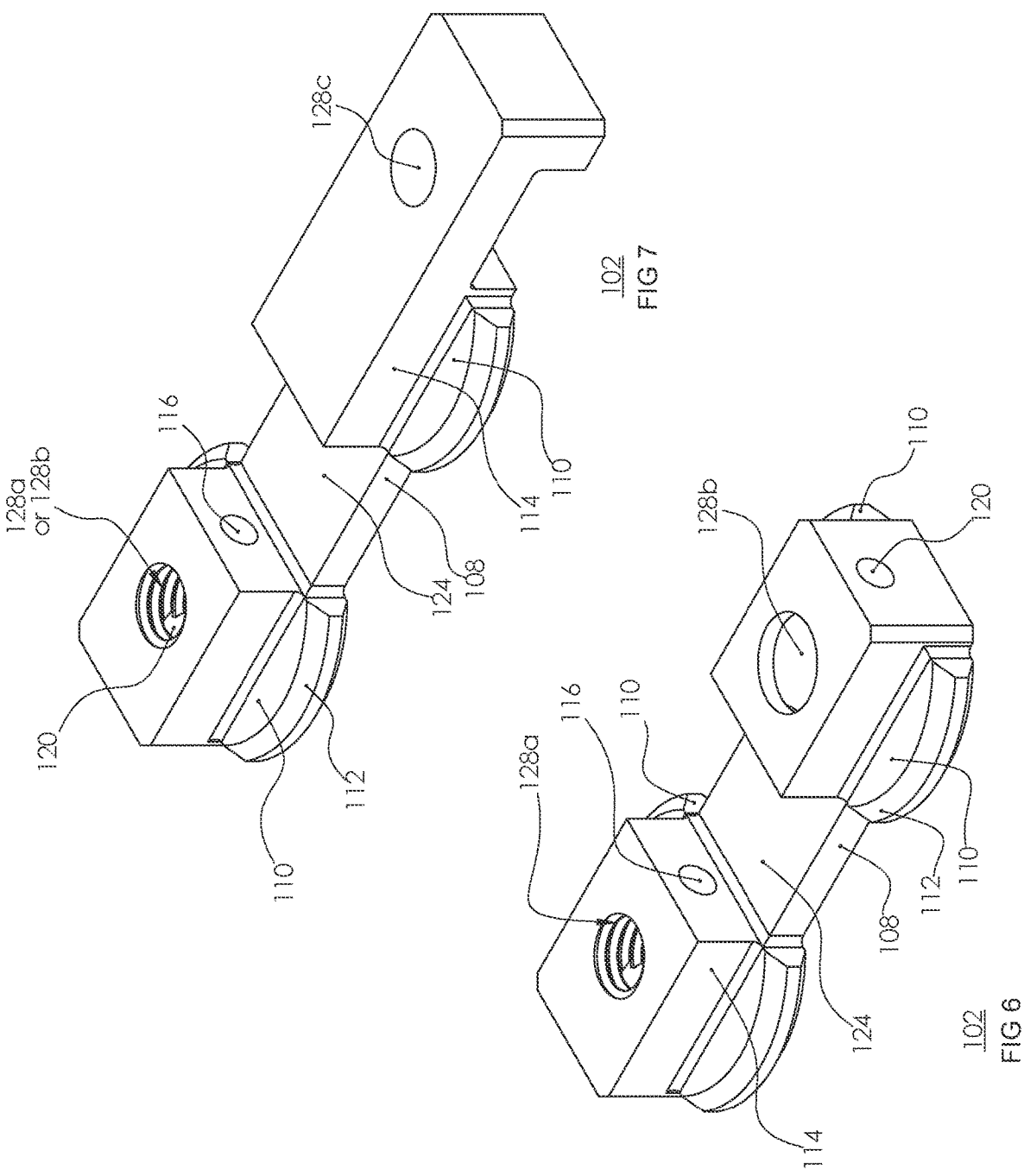
FIG. 6 is a perspective view of an example of a base fitting body having a plurality of mounting sockets and configured for receipt of a rotational striker assembly in accordance with an illustrative embodiment of the invention disclosed herein.
FIG. 7 is a perspective view of an example of a base fitting body having a mounting socket and a mounting bore and configured for receipt of a rotational striker assembly in accordance with an illustrative embodiment of the invention disclosed herein.
Figures 8, 9:
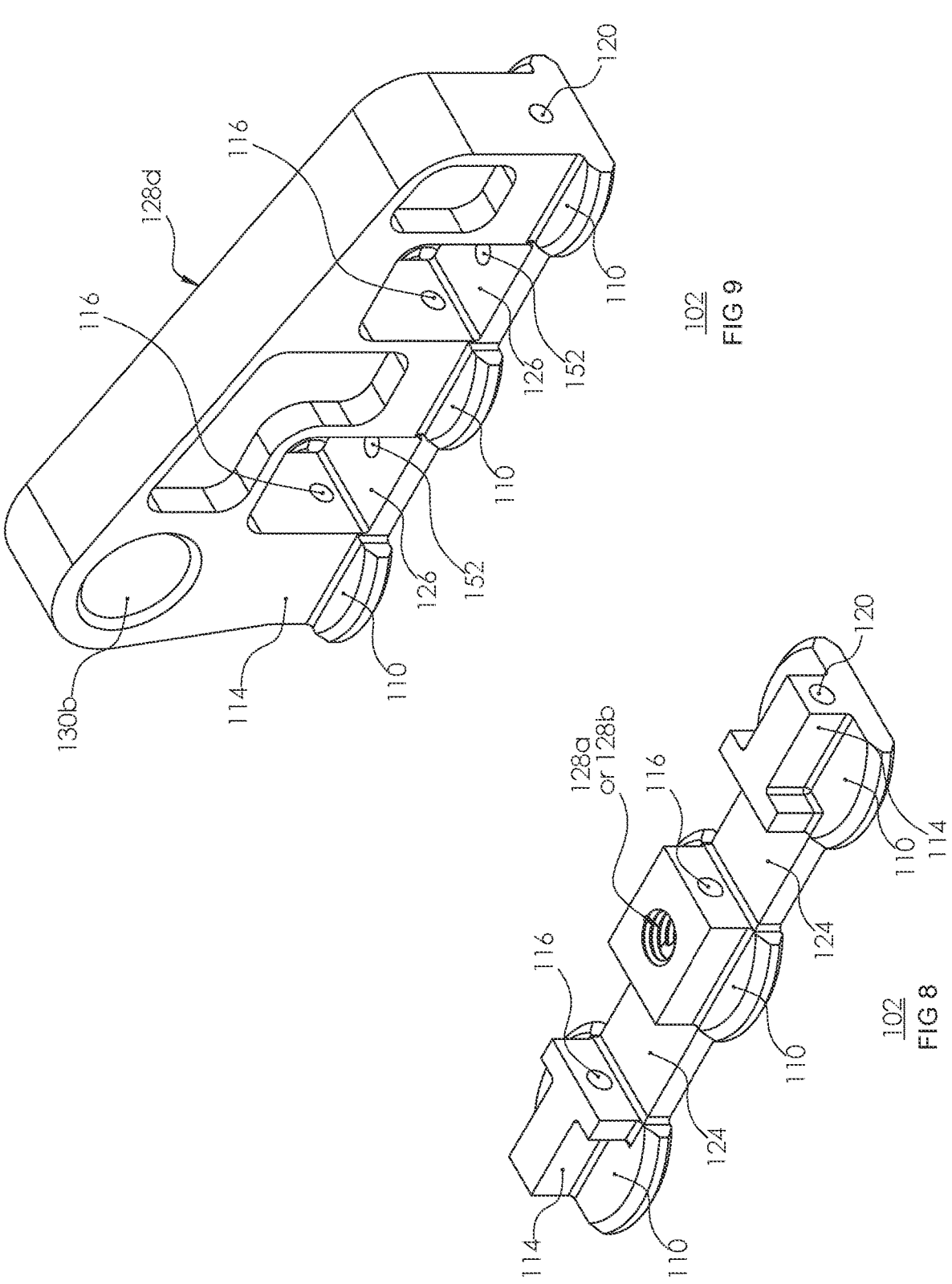
FIG. 8 is a perspective view of an example of a base fitting body having an intermediate push button mounting socket and configured for receipt of a pair of rotational striker assemblies in accordance with an illustrative embodiment of the invention disclosed herein.
FIG. 9 is a perspective view of an example of a base fitting body having a structural mass body with a through connection bore and configured for receipt of a rotational striker assembly and/or a movable striker assembly in accordance with an illustrative embodiment of the invention disclosed herein.
Figure 11:
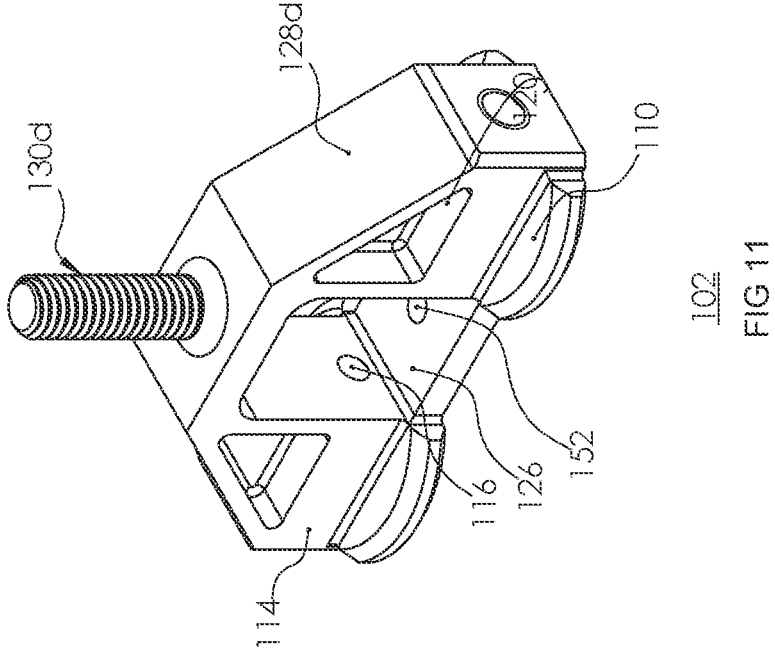
FIG. 11 is a perspective view of an example of a base fitting body having a structural mass body with a threaded stud and configured for receipt of a rotational striker assembly or a movable striker assembly in accordance with an illustrative embodiment of the invention disclosed herein.
Figure 10:
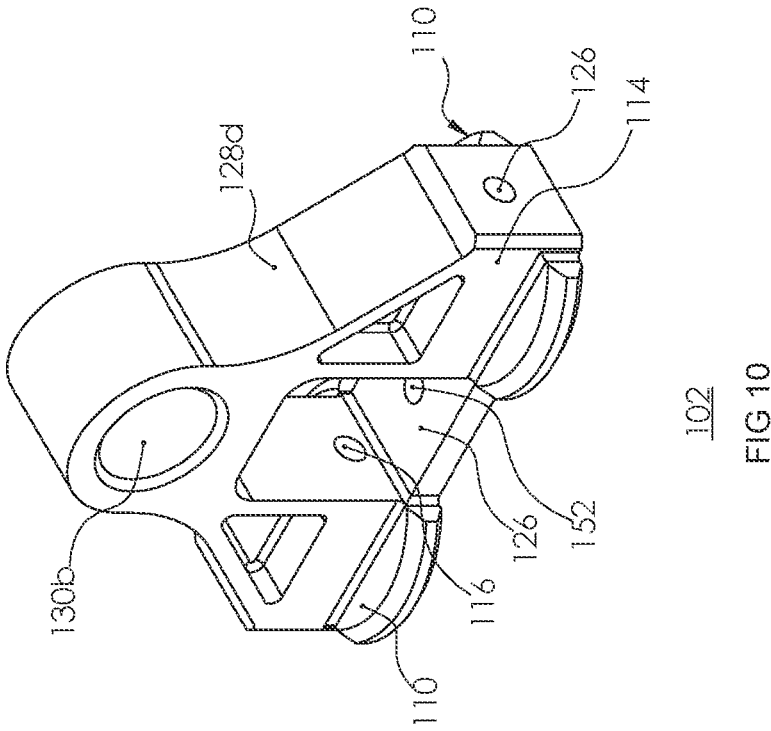
FIG. 10 is a perspective view of an example of a base fitting body having a structural mass body with a through connection bore and configured for receipt of a rotational striker assembly or a movable striker assembly in accordance with an illustrative embodiment of the invention disclosed herein.

In addition, the base fitting body 102 includes an attachment mechanism 128, such as a threaded mounting socket 128a, a push button mounting socket 128b, a through mounting bore 128c, a structural mass body 128d having one or more attachment features 130 (e.g., a threaded stud 130a or a through connection bore 130b), or a combination thereof (see, e.g., FIGS. 6-7). The attachment mechanism is configured to removably fasten or attach parts, assemblies, or other objects to the seat track striker fitting assembly 100. FIG. 2 depicts the base fitting body 102 with the threaded mounting socket 128a configured for receipt of a corresponding threaded fastener, such as a bolt, screws, stud, or the like. FIGS. 3, 5, and 8 depict the base fitting body 102 with the push button mounting socket 128b configured for receipt of a push button pin fastener. FIG. 4 depicts the base fitting body 102 with the through mounting bore 128c configured to receive a mechanical fastener, such as a bolt, screw, stud, or the like. FIGS. 9-11 depict the base fitting body 102 with the structural mass body 128d, and in particular, FIGS. 9-10 show the structural mass body 128d configured with at least one through connection bore 130b to provide a structure with which to fasten an object and FIG. 11 shows the structural mass body 128d configured with at least one protruding threaded stud 130d for receipt of a threaded fastener, e.g., a nut, to provide a clamping force and prevent movement of an attached object.

Figure 14:
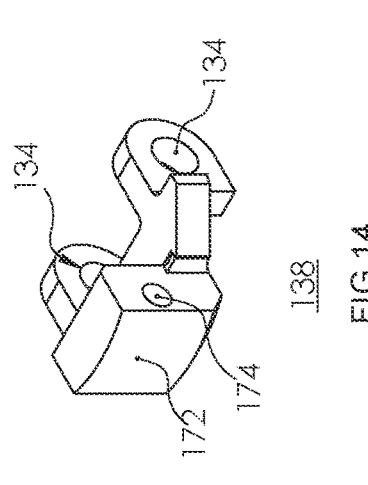
FIG. 14 is a perspective view of an example of a bridged striker leaf for a rotational striker assembly having an embossment with a bridging pin conduit for connecting the leaf to an adjacent bridged striker leaf in accordance with an illustrative embodiment of the invention disclosed herein.
Figure 13:
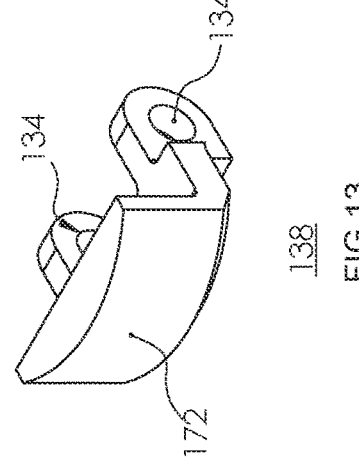
FIG. 13 is a perspective view of an example of an embossed striker leaf for a rotational striker assembly having an embossment for disengagement in accordance with an illustrative embodiment of the invention disclosed herein.
Figure 12:
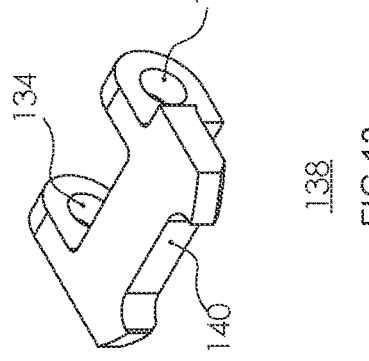
FIG. 12 is a perspective view of an example of a low-profile striker leaf for a rotational striker assembly having no protruding features and a slot for disengagement in accordance with an illustrative embodiment of the invention disclosed herein.
Figure 16:
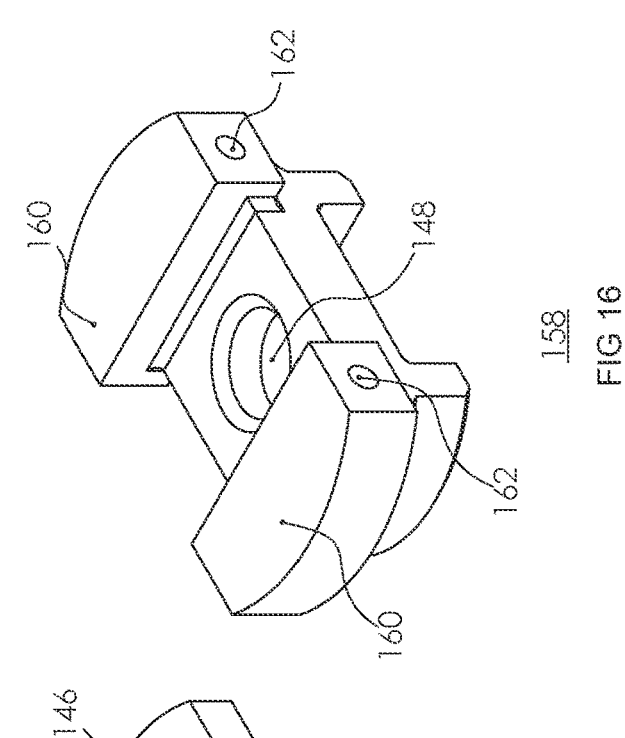
FIG. 16 is a perspective view of an example of a bridged striker body for a movable striker assembly having an embossment with a bridging pin conduit for connecting the body to an adjacent bridged striker body in accordance with an illustrative embodiment of the invention disclosed herein.
Figure 15:
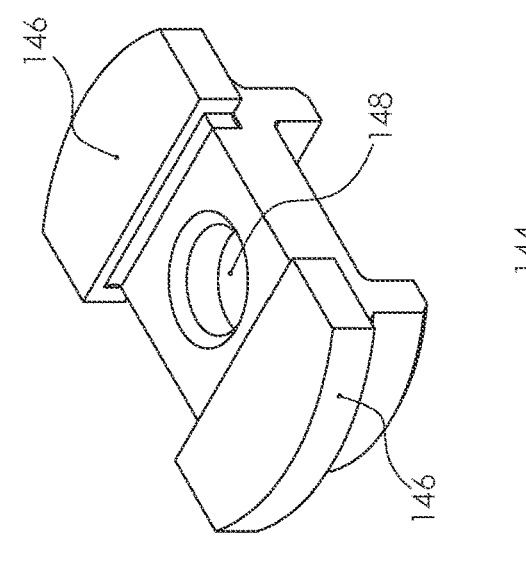
FIG. 15 is a perspective view of an example of an embossed striker body for a movable striker assembly in accordance with an illustrative embodiment of the invention disclosed herein.
Figure 17:
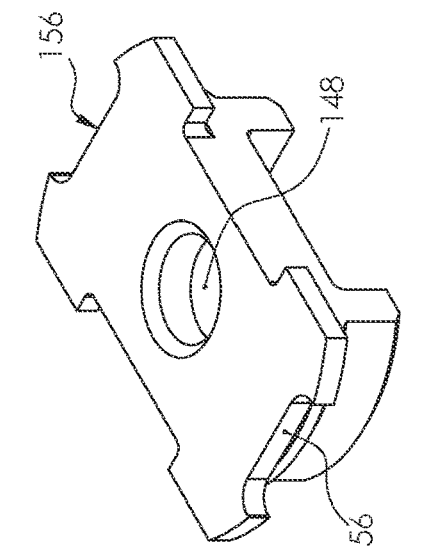
FIG. 17 is a perspective view of an example of a low-profile striker body for a movable striker assembly having no protruding features and a slot for disengagement in accordance with an illustrative embodiment of the invention disclosed herein.
Figures 48, 49, 50, 51, 52, 53:
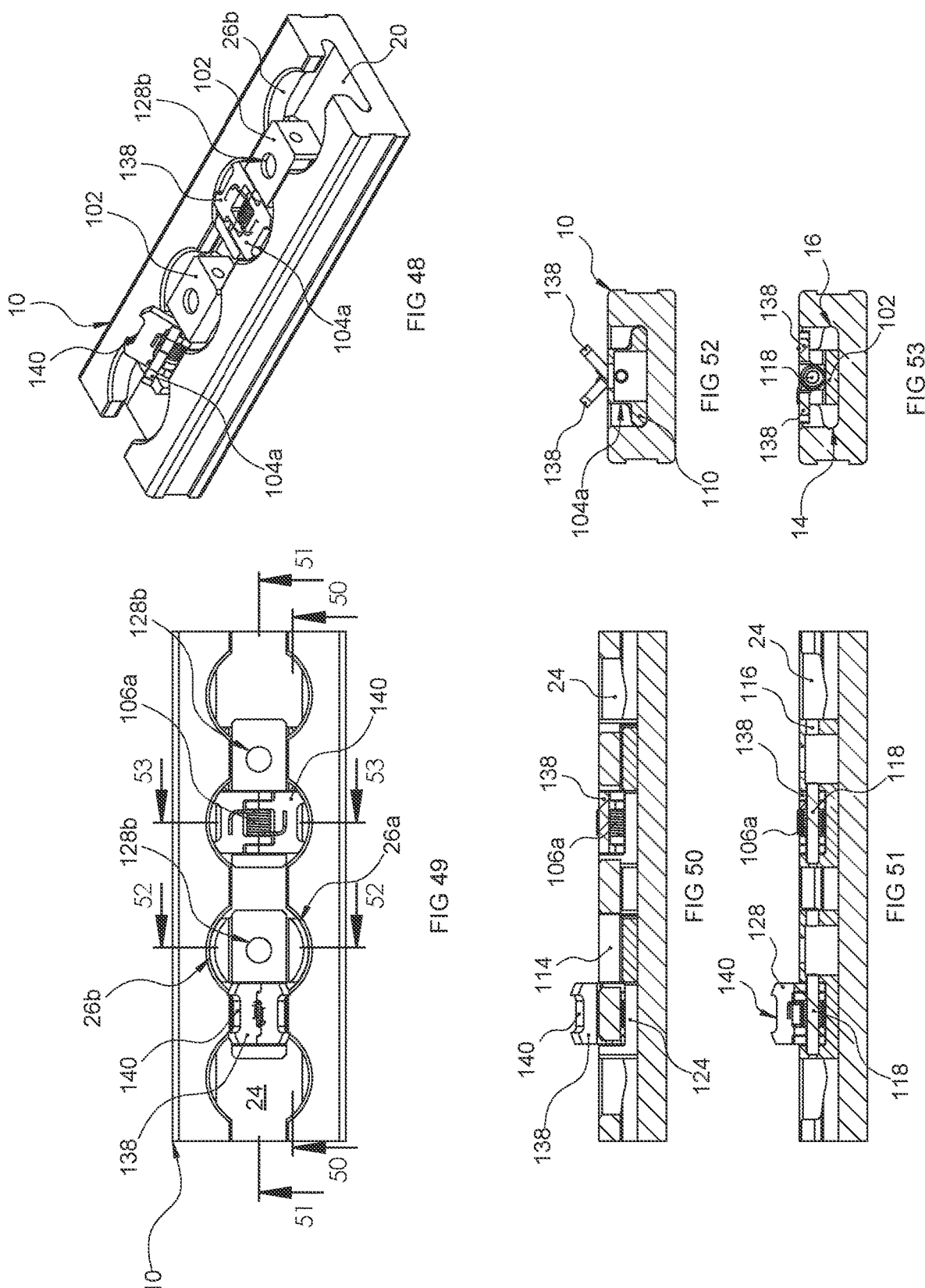
FIG. 48 is a perspective view of a pair of seat track striker fitting assemblies shown in FIGS. 36-47 removably attached to a seat track in accordance with an illustrative embodiment of the invention disclosed herein.
FIG. 49 is a top plan view of the seat track striker fitting assemblies removably attached to the seat track shown in FIG. 48.
FIG. 50 is a side, partial cutaway elevation view along lines 50-50 of the seat track striker fitting assemblies removably attached to the seat track shown in FIG. 49.
FIG. 51 is a side cross-sectional view along lines 51-51 of the seat track striker fitting assemblies removably attached to the seat track shown in FIG. 49.
FIG. 52 is an end, cross-sectional elevation view along lines 52-52 of the seat track striker fitting assemblies removably attached to the seat track shown in FIG. 49.
FIG. 53 is an end, cross-sectional elevation view along lines 53-53 of the rotational striker fitting assemblies removably attached to the seat track shown in FIG. 49.

The striker assembly 104 can be configured as a rotating striker assembly 104a that rotates about a horizontal axis (FIGS. 12-14) or as a movable striker assembly 104b that moves axially along a vertical axis (FIGS. 15-17). Depending upon the application, the striker assembly 104 can have a low-profile configuration (FIGS. 12 and 17), an embossed configuration (FIGS. 13 and 15), or a bridged configuration (FIGS. 14 and 16). The striker assembly 104 removably attaches the seat track striker fitting assembly 100 to the seat track 10 by positively engaging the seat track 10 using a mechanical biasing mechanism 106 (e.g., a torsion or butterfly spring 106a or a compression spring 106b). The striker assembly 104 is configured to engage the crescent-shaped openings 22a and 22b and prevent lateral or longitudinal movement of the seat track striker fitting assembly 100 along the groove 20 when engaged within the seat track 10.

Turning now to FIGS. 18-35, the seat track striker fitting assembly 100 has an elongate base fitting body 102 with a threaded mounting socket 128a and opposed, laterally protruding feet 110 and an embossed, rotational striker assembly 104a. The mounting socket 128a is configured to accept a corresponding threaded fastener. As exemplified in FIGS. 23 and 29, the mounting socket 128a extends through the top of the base fitting body 102 and through the lower portion 108 of the elongate base fitting body 102. It will be appreciated, however, that the invention is not so limited, and the mounting socket 128a may extend only partially through the base fitting body 102 and not through the lower portion 108 of the base fitting body 102.

The rotational striker assembly 104a of FIGS. 18-35 has two embossed striker body leaves 132 positioned about a butterfly spring 106a, which biases the leaves 132 toward an engaged position (e.g., as shown in FIGS. 18-23). The butterfly spring 106a may be tensioned and rotated toward a disengaged position (e.g., as shown in FIGS. 24-29). Each striker leaf 132 has an upright embossment 136 with an arcuate, crescent-shaped terminal edge 137 and rotational leaf apertures 134 that are axially spaced and coaxially aligned. A pin 118 is sized to pass through striker pin sockets 120, fit within the striker pin conduit 116, the rotational leaf apertures 134, and the butterfly spring 106a to secure the rotational striker assembly 104a within the striker body channel 124 of the elongate base fitting body 102. The butterfly spring 106a has legs 107 respectively connected to the two embossed striker body leaves 132. The butterfly spring 106a is arranged so that its extending butterfly legs 107 are tensioned together to bias the embossed striker body leaves 132 toward the engaged position. A set screw or other suitable securing mechanisms 122 may be used to retain the pin 118 within the striker pin conduit 116, which can be removed to detach the rotational striker assembly 104a from the base fitting body 102.

FIGS. 30-35 show the embossed rotational striker assembly 104a in the engaged position and the disengaged position on the seat track 10. In the engaged position, the arcuate edges 137 of the embossments 136 of the respective striker body leaves 132 engage the crescent-shaped openings 22a and 22b of the seat track 10 to prevent longitudinal movement of the seat track striker fitting assembly 100 along the groove 20 of the seat track 10. The embossments 136 of the striker body leaves 132 are upright in the engaged position and are used to rotate the striker body leaves 132 about the pin 118 between the engaged position and the disengaged position. When the rotational striker assembly 104a is disengaged from the crescent-shaped openings 22a and 22b, the butterfly spring 106a is compressed and the edges 137 of the embossed striker body leaves 132 no longer directly engage the crescent-shaped openings 22. Using the embossments 136 on the striker body leaves 132, the seat track striker fitting assembly 100 can be removed from one of the circular receptacles 24 along the groove 20 of the seat track 10.

Turning now to FIGS. 36-53, the seat track striker fitting assembly 100 has an elongate base fitting body 102 and a low-profile, rotational striker assembly 104a. The base fitting body 102 has a push button mounting socket 128b and opposed, laterally protruding feet 110. The mounting socket 128b is configured to accept a corresponding push-button pin. The mounting socket 128b of FIGS. 36-53 is shown as extending through the top of the upright surface 114 and the lower portion 108 of the elongate base fitting body 102; however, like the above-described embodiment, it will be appreciated that the mounting socket 128b may extend only partially through the base fitting body 102.

As exemplified in FIGS. 36-53, the rotational striker assembly 104a has two low-profile striker body leaves 138 positioned about a torsion or butterfly spring 106a. The butterfly spring 106a has legs 107 respectively connected to the two low-profile striker body leaves 138 to bias the embossed striker body leaves 132 toward the engaged position shown in FIGS. 36-41. As illustrated, each striker leaf 138 has no protruding features, axially spaced and coaxially aligned leaf apertures 134, and a slot 140. Although the slot 140 is shown in the figures as a recessed edge of the striker leaf 138, it will be appreciated that the slot 140 in other non-limiting embodiments may be configured as an aperture in the striker leaf 138. A pin 118 passes through striker pin sockets 120, such that the pin 118 is positioned through the rotational leaf apertures 134, the butterfly spring 106a, and the rotational striker assembly 104a to secure the rotational striker assembly 104a within the striker body channel 124. Set screws or other suitable securing mechanisms 122 may be used to secure the pin 118 within the striker pin conduit 116 of the base fitting body 102.

FIGS. 36-41 depict the rotational striker assembly 104a in the engaged position and FIGS. 42-47 depict the rotational striker assembly 104a in the disengaged position. FIGS. 48-53 illustrate a side-by-side comparison of the low-profile rotational striker assembly 104a in the engaged and disengaged positions on the seat track 10. When engaged, the crescent-shaped edges of the low-profile striker body leaves 138 engage the crescent-shaped openings 22a and 22b of the seat track 10, thereby preventing longitudinal movement of the seat track striker fitting assembly 100. As can be seen in the drawings, the low-profile striker assembly 104a is substantially flush with a top surface of the seat track 10 when engaged. The crescent-shaped protruding feet 110 of the base fitting body 102 engage the inwardly extending flange portions 18a and 18b to prevent vertical movement of the seat striker fitting assembly 100 when engaged with the seat track 10. The upright surfaces 114 of the base fitting body 102 to engage the inwardly extending flange portions 18a and 18b to prevent lateral movement of the seat striker fitting assembly 100 when engaged with the seat track 10.

Using a flat-headed tool or other implement to engage the slots 140 initially, the striker body leaves 138 rotate about the pin 118 and against the rotational force of the butterfly spring 106a. When the rotational striker assembly 104a is disengaged from the crescent-shaped openings 22a and 22b, as shown in the position shown in FIGS. 48, 50-51, and 53, the edges of the low-profile striker body leaves 138 no longer directly engage the crescent-shaped openings 22, and the low-profile striker body leaves 138 can be used to pull the seat track striker fitting assembly 100 from one of the circular receptacles 24 along the groove 20 of the seat track 10.

As illustrated in FIGS. 54-71, the seat track striker fitting assembly 100 has a base fitting body 102 configured as a structural mass body 128d with a threaded stud 130a and two sets of opposed, laterally protruding feet 110. The threaded stud 130a exemplified in FIGS. 54-71 extends vertically from the structural mass body 128d to receive a nut (not shown), thereby removably attaching other parts, assemblies, or objects to the seat track striker fitting assembly 100. Although only one threaded stud 130a is depicted in the illustrated embodiment, it will be appreciated that more than one threaded stud 130a may be configured on the same structural mass body 128d in other non-limiting embodiments. Further, the threaded stud 130a is shown as centrally positioned on the structural mass body 128d and perpendicular to the lower portion 108 of the base fitting body 102; however, it will be appreciated that the threaded stud 130a of other non-limiting embodiments may be positioned at non-central locations about the structural mass body 128d and, in some instances, is positioned at a non-perpendicular angle relative to the lower portion 108 of the base fitting body 102.

Figures 54, 55, 56, 57, 58, 59:
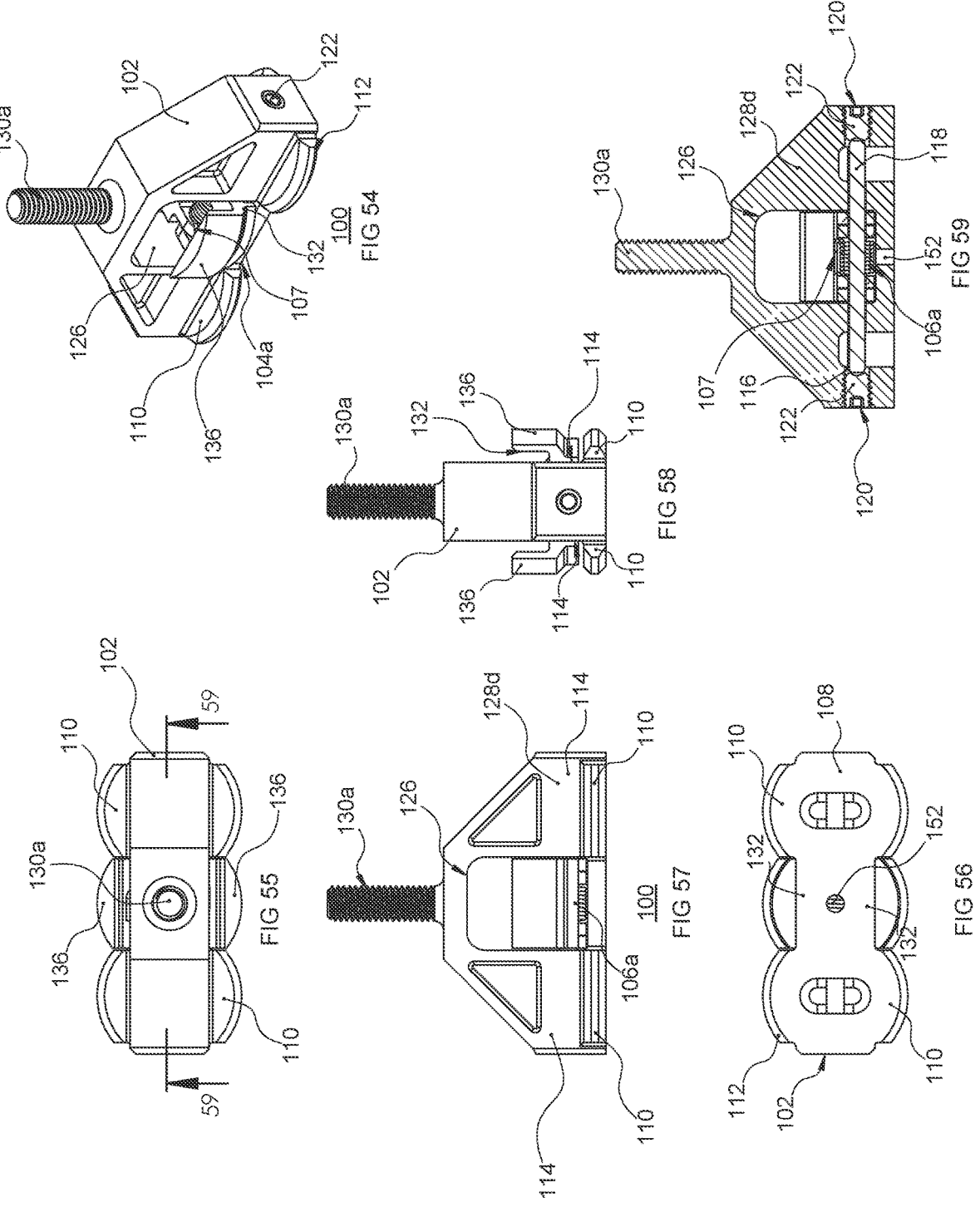
FIG. 54 is a perspective view of an example of a seat track striker fitting assembly having a base fitting body having a structural mass body with a threaded stud and an embossed, rotational striker assembly in an engaged position in accordance with an illustrative embodiment of the invention disclosed herein.
FIG. 55 is a top plan view of the seat track striker fitting assembly shown in FIG. 54.
FIG. 56 is a bottom plan view of the seat track striker fitting assembly shown in FIG. 54.
FIG. 57 is a side elevation view of the seat track striker fitting assembly shown in FIG. 54, with the opposing side view being a mirror image thereof.
FIG. 58 is an end elevation view of the seat track striker fitting assembly shown in FIG. 54.
FIG. 59 is a cross-sectional view along lines 59-59 of the rotational striker fitting assembly shown in FIG. 55.
Figures 60, 61, 62, 63, 64, 65:
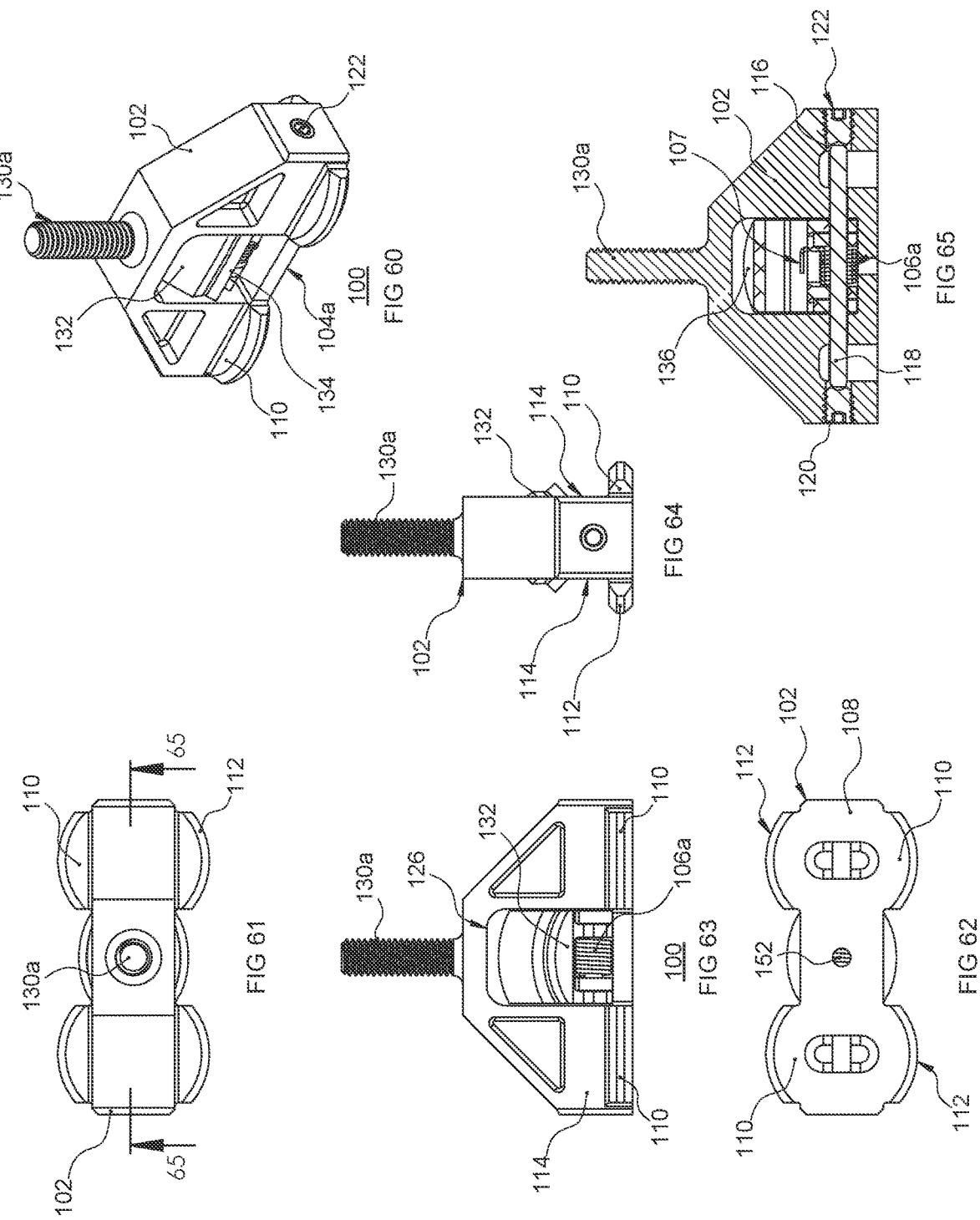
FIG. 60 is a perspective view of the seat track striker fitting assembly shown in FIG. 54 in a disengaged position in accordance with an illustrative embodiment of the invention disclosed herein.
FIG. 61 is a top plan view of the seat track striker fitting assembly shown in FIG. 60.
FIG. 62 is a bottom plan view of the seat track striker fitting assembly shown in FIG. 60.
FIG. 63 is a side elevation view of the seat track striker fitting assembly shown in FIG. 60, with the opposing side view being a mirror image thereof.
FIG. 64 is an end elevation view of the seat track striker fitting assembly shown in FIG. 60.
FIG. 65 is a cross-sectional view along lines 65-65 of the seat track striker fitting assembly shown in FIG. 61.
Figures 66, 67, 68, 69, 70, 71:
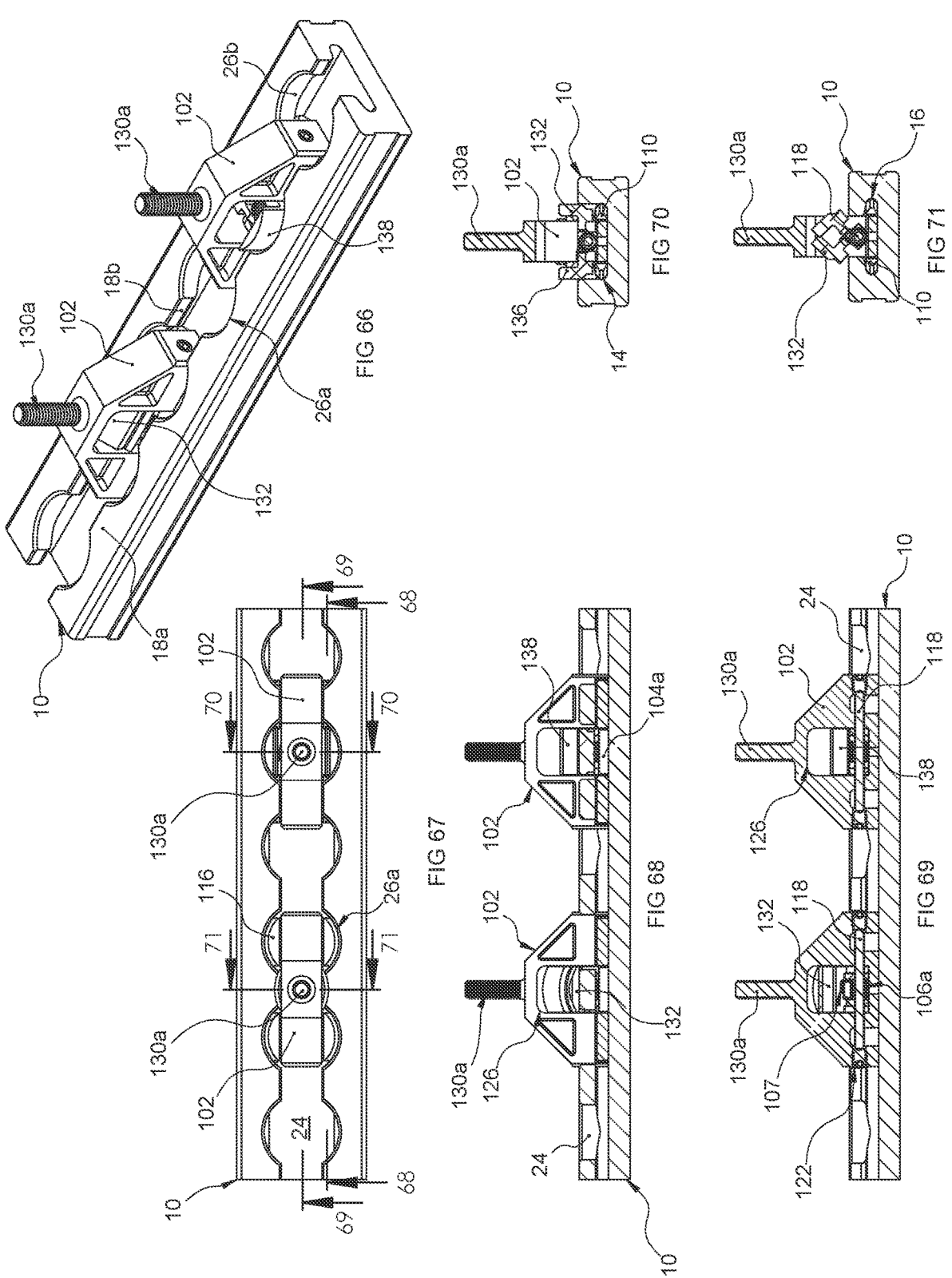
FIG. 66 is a perspective view of a pair of seat track striker fitting assemblies, as shown in FIGS. 54-65, removably attached to a seat track in accordance with an illustrative embodiment of the invention disclosed herein.
FIG. 67 is a top plan view of the seat track striker fitting assemblies removably attached to the seat track shown in FIG. 66.
FIG. 68 is a side, partial cutaway elevation view along lines 68-68 of the seat track striker fitting assemblies removably attached to the seat track shown in FIG. 67.
FIG. 69 is a side cross-sectional view along lines 69-69 of the seat track striker fitting assemblies removably attached to the seat track shown in FIG. 67.
FIG. 70 is an end, cross-sectional elevation view along lines 70-70 of the seat track striker fitting assemblies removably attached to the seat track shown in FIG. 67.
FIG. 71 is an end, cross-sectional elevation view along lines 71-71 of the rotational striker fitting assemblies removably attached to the seat track shown in FIG. 67.
Figures 90, 91, 92, 93, 94, 95:
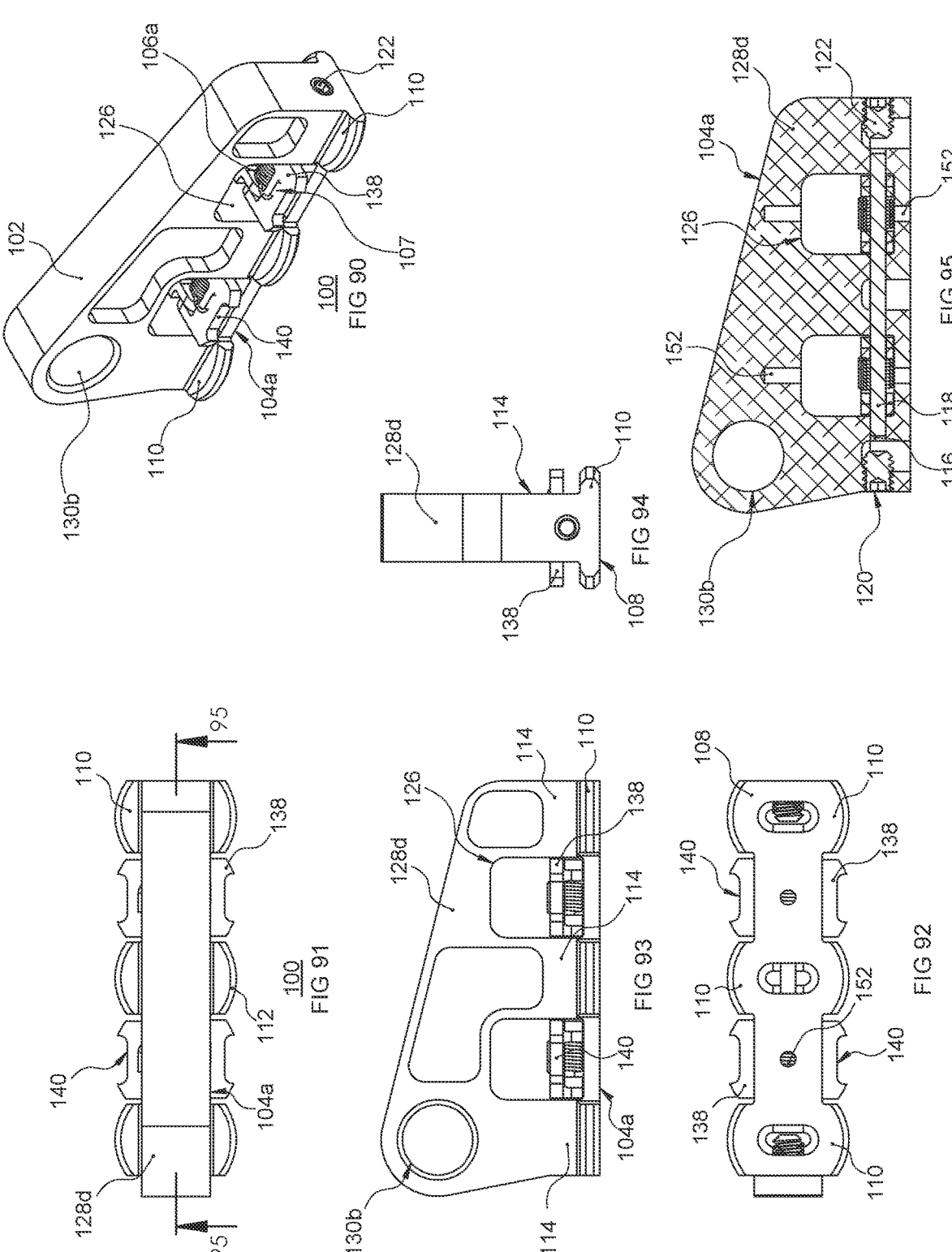
FIG. 90 is a perspective view of an example of a seat track striker fitting assembly having a base fitting body having a structural mass body with a through connection bore and a pair of low-profile, rotational striker assemblies in an engaged position in accordance with an illustrative embodiment of the invention disclosed herein.
FIG. 91 is a top plan view of the seat track striker fitting assembly shown in FIG. 90.
FIG. 92 is a bottom plan view of the seat track striker fitting assembly shown in FIG. 90.
FIG. 93 is a side elevation view of the seat track striker fitting assembly shown in FIG. 90, with the opposing side view being a mirror image thereof.
FIG. 94 is an end elevation view of the seat track striker fitting assembly shown in FIG. 90.
FIG. 95 is a cross-sectional view along lines 95-95 of the rotational striker fitting assembly shown in FIG. 91.
Figures 96, 97, 98, 99, 100, 101:
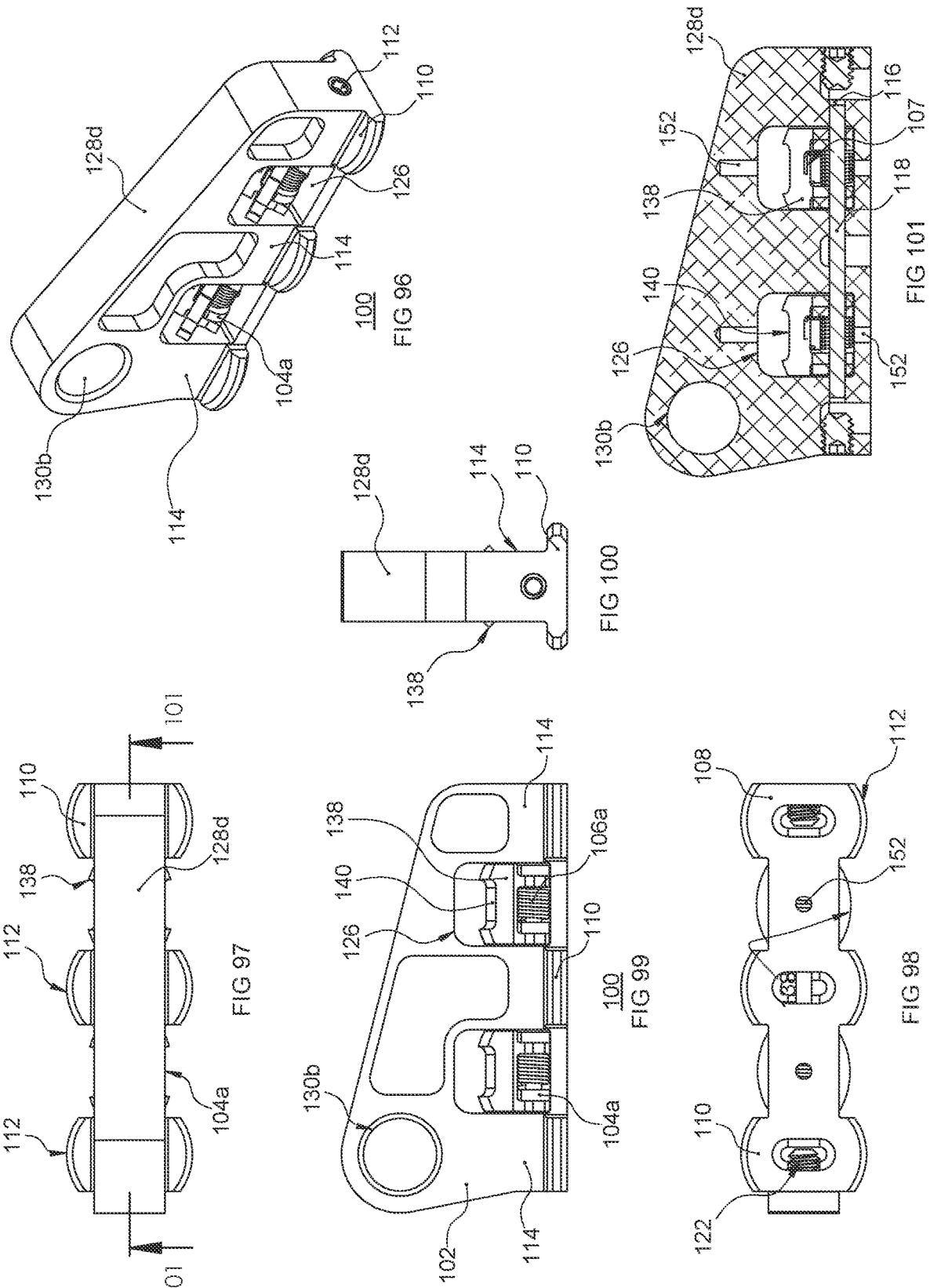
FIG. 96 is a perspective view of the seat track striker fitting assembly shown in FIG. 90 in a disengaged position in accordance with an illustrative embodiment of the invention disclosed herein.
FIG. 97 is a top plan view of the seat track striker fitting assembly shown in FIG. 96.
FIG. 98 is a bottom plan view of the seat track striker fitting assembly shown in FIG. 96.
FIG. 99 is a side elevation view of the seat track striker fitting assembly shown in FIG. 96, with the opposing side view being a mirror image thereof.
FIG. 100 is an end elevation view of the seat track striker fitting assembly shown in FIG. 96.
FIG. 101 is a cross-sectional view along lines 101-101 of the seat track striker fitting assembly shown in FIG. 97.

The seat track striker fitting assembly 100 exemplified in FIGS. 54-71 has a rotational striker assembly 104a with a pair of embossed striker body leaves 132 positioned about a torsion or butterfly spring 106a. The butterfly spring 106a has legs 107 respectively connected to the embossed striker body leaves 132. The butterfly spring 106a is arranged so that its extending butterfly legs 107 are tensioned together to bias the embossed striker body leaves 132 toward the engaged position. As can be seen in FIGS. 59 and 65, a pin 118 engages the rotational leaf apertures 134 and the butterfly spring 106a to secure the rotational striker assembly 104 within the striker body opening 126 of the structural mass body 128d. The pin 118 may enter the striker pin conduit 116 through the striker pin sockets 120 on either end of the base fitting body 102. Although FIGS. 59 and 65 depict only one pin 118 used to secure the rotational striker assembly 104a to the base fitting body 102, it will be appreciated that two pins 118 can be used in alternative embodiments to secure the rotational striker assembly 104a separately. Set screws or other suitable securing mechanisms 122 can secure the pin 118 within the striker pin conduit 116.

FIGS. 54-59 show the rotational striker assembly 104a in the engaged position, while FIGS. 60-65 show the rotational striker assembly 104a in the disengaged position. FIGS. 66-71 illustrate a side-by-side comparison of the embossed rotational striker assembly 104a in the engaged position and the disengaged position on the seat track 10.

In order to engage the seat track striker fitting assembly 100 with the seat track 10, the embossed striker body leaves 132 of the rotational striker assembly 104a are rotated, compressing the spring 106a, and the crescent-shaped protruding feet 110 of the base fitting body 102 are inserted into adjacent receptacles 24 of the seat track 10. The seat track striker fitting assembly 100 is then slid along with groove 20 of the seat track 10, and the spring 106a positively biases the embossed striker body leaves 132 into engagement with the seat track 10. To disengage the seat track striker fitting assembly 100 from the seat track 10, the embossed striker body leaves 132 of the rotational striker assembly 104a are rotated, compressing the butterfly spring 106a, and the seat track striker fitting assembly 100 is then slid along with groove 20 of the seat track 10 until the protruding feet 110 of the base fitting body 102 are positioned within adjacent receptacles 24 of the seat track 10. The seat track striker fitting assembly 100 can then be removed from the seat track 10 without the use of tools or other implements.

Turning now to FIGS. 72-89, in this illustrative embodiment, the seat track striker fitting assembly 100 has a base fitting body 102 and embossed, rotational striker assemblies 104a. The base fitting body 102 is illustrated as a structural mass body 128d with a through connection bore 130b and a plurality of opposed, laterally protruding feet 110. The through connection bore 130b is configured at one end of the protruding structural mass body 128d and is used to fasten another assembly to the seat track striker fitting assembly 100, such as using a connection rod or rail to attach an aircraft seat.

Each rotational striker assembly 104a of FIGS. 72-89 is secured within a separate striker body opening 126 of the structural mass body 128d. Although the embodiment is illustrated with a pair of embossed, rotational striker assemblies, the invention is not so limited; the seat track striker fitting assembly 100 could utilize a mixture or combination of rotational striker assemblies 104a, such as an embossed, rotational striker assembly 104a and a low-profile, rotational striker assembly 104a. A torsion or butterfly spring 106a is arranged so that extending butterfly legs 107 are tensioned together to bias the embossed striker body leaves 132 toward the engaged position shown in FIGS. 72-77. As depicted in FIGS. 77 and 83, a pin 118 passes through the striker pin conduit 116 and engages the butterfly spring 106a and the rotational leaf apertures 134 of the embossed striker body leaves 132 to secure the rotational striker assembly 104a within one of the striker body openings 126. The pin 118 may enter the striker pin conduit 116 through the striker pin sockets 120 on either end of the base fitting body 102, and the pin 118 can be secured within the striker pin conduit 116 by set screws or other suitable securing mechanisms 122. Although FIGS. 77 and 83 depict one pin 118 securing both rotational striker assemblies 104a to the base fitting body 102, two pins 118 may be used to separately secure the rotational striker assemblies 104a and a suitable securing mechanism 122 may be used within the striker pin conduit 116 to secure the interior ends of the pins 118.

FIGS. 72-77 depict the rotational striker assembly 104 in the engaged position, while FIGS. 78-83 depict the rotational striker assembly 104 in the disengaged position. FIGS. 84-89 present further side-by-side comparison of the embossed rotational striker assembly 104 in the engaged position and the disengaged position on the seat track 10. Similar to the embodiment shown in FIGS. 54-71, the embossed striker body leaves 132 of the rotational striker assembly 104a are rotated, compressing the butterfly or torsion spring 106a, and the crescent-shaped protruding feet 110 of the base fitting body 102 are inserted into adjacent receptacles 24 of the seat track 10. The seat track striker fitting assembly 100 is then slid along with groove 20 of the seat track 10, and the torsion spring 106a positively biases the embossed striker body leaves 132 to engage the seat track striker fitting assembly 100 with the seat track 10. In the engaged position, the embossed striker body leaves 132 engage the crescent-shaped openings 22a and 22b and prevent longitudinal movement of the seat track striker fitting assembly 100. The protruding feet 110 of the base fitting body 102 engage the inwardly extending flange portions 18a and 18b of the seat track 10 to prevent vertical movement of the seat striker fitting assembly 100, and the upright surface 114 of the base fitting body 102 to engage the inwardly extending flange portions 18a and 18b to prevent lateral movement of the seat striker fitting assembly 100 with the seat track 10.

To disengage the seat track striker fitting assembly 100 from the seat track 10, the embossed striker body leaves 132 of the rotational striker assembly 104a are rotated, compressing the torsion spring 106a, and the seat track striker fitting assembly 100 is then slid along with groove 20 of the seat track 10 until the protruding feet 110 of the base fitting body 102 are positioned within adjacent receptacles 24 of the seat track 10. The seat track striker fitting assembly 100 can then be removed from the seat track 10 without the use of tools or other implements.

The embodiment of the seat track striker fitting assembly 100 shown in FIGS. 90-107 is similar to that shown in FIGS. 72-89, except that the striker assemblies 104 exemplify low-profile rotational striker assemblies 104a. Again, while illustrated as a pair of low-profile rotational striker assemblies 104a, the seat track striker fitting assembly 100 can utilize a combination of different configurations and types of rotational and/or vertical striker assemblies 104. FIGS. 90-95 depict the rotational striker assembly 104 in the engaged position, while FIGS. 96-101 depict the rotational striker assembly 104 in the disengaged position. FIGS. 102-107 present further side-by-side comparisons of the low-profile rotational striker assembly 104 in the engaged position and the disengaged position on the seat track 10.

When engaged, the crescent-shaped edges of the low-profile striker body leaves 138 are biased into engagement with the crescent-shaped openings 22a and 22b of the seat track 10 by the torsion or butterfly spring 106a. As can be seen in FIGS. 102 and 104-106, the low-profile striker assembly 104a is substantially flush with the top surface of the seat track 10 when engaged. Using a flat-headed tool or other implement to engage the slots 140 initially, the striker body leaves 138 rotate about the pin 118 and against the rotational tension of the butterfly spring 106a. When the rotational striker assembly 104a is disengaged from the crescent-shaped openings 22a and 22b, as shown in the position shown in FIGS. 102 and 104-106, the edges of the low-profile striker body leaves 138 are no longer level with the top of the crescent-shaped openings 22. The low-profile striker body leaves 138 can then be used to pull the seat track striker fitting assembly 100 from one of the circular receptacles 24 along the groove 20 of the seat track 10.

Turning now to FIGS. 108-125, the seat track striker fitting assembly 100 has a base fitting body 102 and bridged, rotational striker assemblies 104a. Like the embodiments shown in FIGS. 72-89 and 90-107, the base fitting body 102 is configured as a structural mass body 128d with a through connection bore 130b that is configured at one end of the protruding structural mass body 128d and is used to fasten another assembly to the seat track striker fitting assembly 100, such as using a connection rod or rail to attach an aircraft seat.

In this embodiment, each rotational striker assembly 104a is secured within a separate striker body opening 126 of the structural mass body 128d, and the rotational striker assemblies 104a are joined using a bridging pin 164. Each of the bridged rotational striker assemblies 104a has two bridged striker body leaves 158 positioned about a torsion or butterfly spring 106a, which biases the leaves 158 between an engaged position (e.g., as shown in FIGS. 108-113) and a disengaged position (e.g., as shown in 114-119). Each striker leaf 158 has an upright embossment 172 with an arcuate, crescent-shaped terminal edge 176 and rotational leaf apertures 134 that are axially spaced and coaxially aligned. In addition, each embossment 172 on the bridged striker body leaves 158 includes a bridging pin conduit 174 for receipt of the bridging pin 167.

As can be seen in FIGS. 113 and 119, a pin 118 passes through the striker pin conduit 116 and engages the butterfly spring 106a and the rotational leaf apertures 134 of the bridged striker body leaves 158 to secure the rotational striker assembly 104a within one of the striker body openings 126. The pin 118 may enter the striker pin conduit 116 through the striker pin sockets 120 on either end of the base fitting body 102, and the pin 118 can be secured within the striker pin conduit 116 by set screws or other suitable securing mechanisms 122.

During usage, the bridged striker body leaves 158 are rotated using the bridging pin 164, compressing the springs 106a of both rotational striker assemblies 104a, and the crescent-shaped protruding feet 110 of the base fitting body 102 are inserted into receptacles 24 of the seat track 10. The seat track striker fitting assembly 100 is then slid along with groove 20 of the seat track 10, and the butterfly spring 106a positively biases the bridged striker body leaves 158 to engage the seat track striker fitting assembly 100 with the seat track 10. In the engaged position, the crescent-shaped edge of the bridged striker body leaves 158 are seated within the crescent-shaped openings 22a and 22b and prevent longitudinal movement of the seat track striker fitting assembly 100. The protruding feet 110 of the base fitting body 102 are retained between the bottom surface 12 and the inwardly extending flange portions 18a and 18b of the seat track 10 to prevent vertical movement of the seat striker fitting assembly 100, and the upright surfaces 114 of the base fitting body 102 engage the inwardly extending flange portions 18a and 18b to prevent lateral movement of the seat striker fitting assembly 100 with the seat track 10.

In order to disengage the seat track striker fitting assembly 100 from the seat track 10, the bridged striker body leaves 158 of the rotational striker assembly 104a are rotated using the bridging pin 164, compressing the butterfly spring 106a, and the seat track striker fitting assembly 100 is then slid along with groove 20 of the seat track 10 until the protruding feet 110 of the base fitting body 102 are positioned within receptacles 24 of the seat track 10. The seat track striker fitting assembly 100 can then be removed from the seat track 10 without using tools or other implements.

Figures 120, 121, 122, 123, 124, 125:
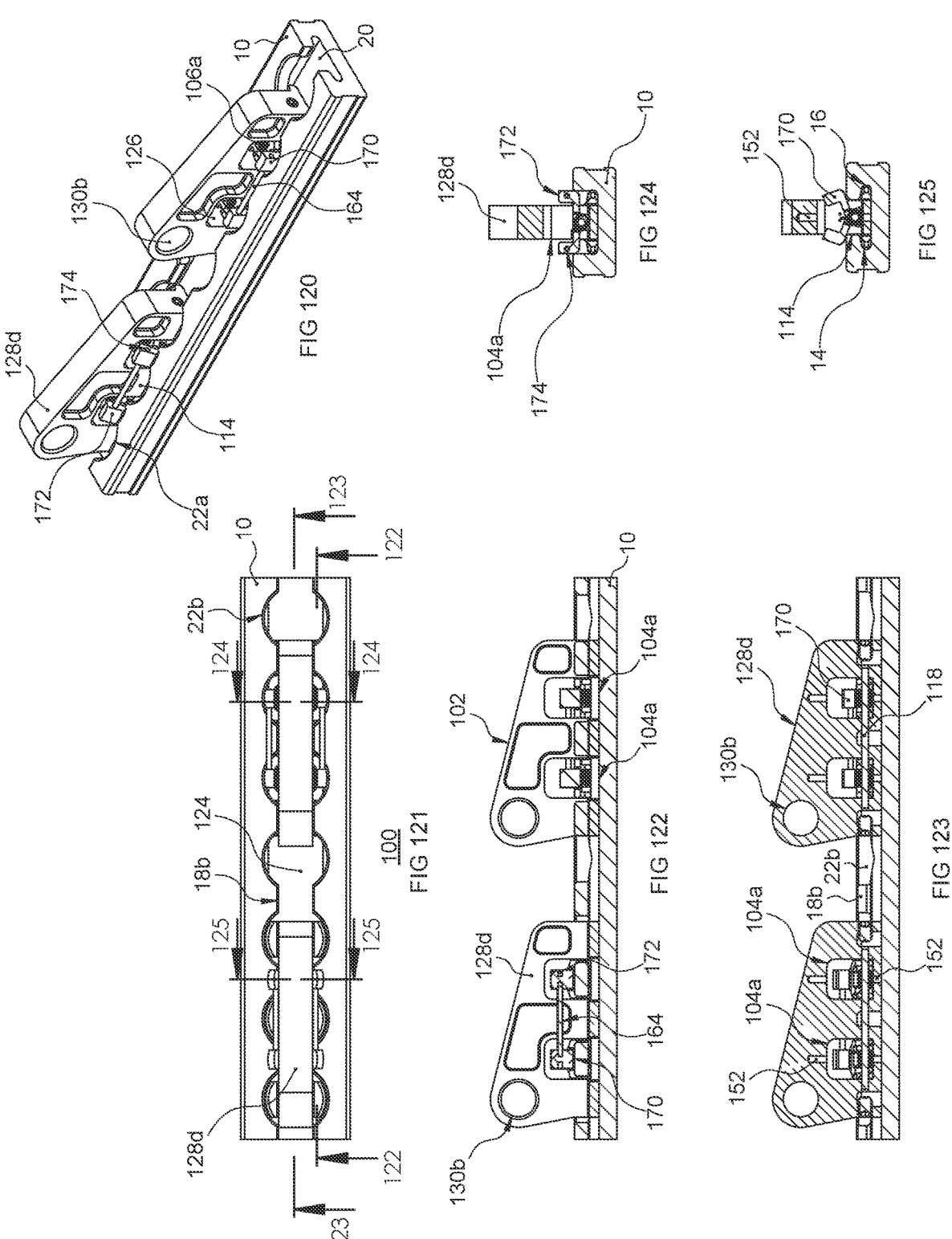

Although FIGS. 18-125 depict various embodiments of the rotational striker assembly 104a that use a torsion or butterfly spring 106a, it will be appreciated that other mechanical biasing mechanisms may be utilized to maintain the positive engagement between the seat track striker fitting assembly 100 and the seat track 10.

Turning now to FIGS. 126-179, the seat track striker fitting assembly 100 has a base fitting body 102 having a structural mass body 128d with a through connection bore 130b configured at one end of the structural mass body 128d and a plurality of opposed, laterally protruding feet 110. As illustrated, a plurality of striker body openings 126 are positioned intermediate of opposing, laterally protruding feet 110 and the upright surfaces 114 of the base fitting body 102. Vertical striker assemblies 104b are respectively secured within the striker body openings 126 of the base fitting body 102.

The movable striker assembly 104b is exemplified as an embossed, movable striker assembly 104b in FIGS. 126-143 with an embossed striker body 144 having embossments 146, a low-profile, movable striker assembly 104b in FIGS. 144-161 with a low-profile striker body 154 having slots 156, and a bridged, movable striker assembly 104b in FIGS. 162-179 with a bridged striker body 158 having embossments 160, bridging pin conduits 162, and a bridging pin 164. A vertical pin 150 is inserted through a vertical striker pin conduit 152 such that the vertical pin 150 is positioned through the vertical pin aperture 148 of the movable striker assembly 104b to secure each movable striker assembly 104b within the striker body opening 126. A compression spring 106b is positioned within the vertical pin aperture 148, where the vertical pin 150 also passes through the compression spring 106b to secure it within the striker body opening 126. The compression spring 106b, the vertical pin 150, the vertical pin aperture 148, and the vertical pin conduit are axially spaced and coaxially aligned. Set screws or other suitable securing mechanisms may be used to retain the vertical pin 150 within the vertical striker pin conduit 152 of the base fitting body 102.

The compression spring 106b applies a positive downward force on the vertical striker body 144, 154, or 158, depending upon the configuration of the movable striker assembly 104b, and biases the vertical striker body 144, 154, or 158 into a lowered, engaged position. In the engaged position, as shown in FIGS. 126-131, 138-143, and 144-149, the vertical striker body 144, 154, or 158 are retained within the circular receptacles 24 of the seat track 10 to prevent lateral and longitudinal movement of the seat track striker fitting assembly 100.

The embossments 146 of vertical striker body 144 may be used to pull the vertical striker body 144 out of engagement with the circular receptacles 24 and raise the vertical striker body 144 upward along the vertical pin 150 to disengage the embossed vertical striker assemblies 104b from the seat track 10. For the low-profile vertical striker assemblies 104b, the slots 156 of the vertical striker body 154 may be used with a flat-headed tool or other implement to pull the vertical striker body 154 out of engagement with the circular receptacles 24 and raise the vertical striker body 154 upward along the vertical pin 150 and against the downward force of the compression spring 106b. For the bridged vertical striker assemblies 104b, the bridging pins 164 joining the vertical striker bodies 158 may be used to pull the vertical striker bodies 158 out of engagement with the circular receptacles 24 and raise the vertical striker bodies 158 upward along the vertical pin 150 and against the downward force of the compression spring 106b. When the movable striker assembly 104b is disengaged, the compression spring 106b is compressed, and the respective vertical striker body 144, 154, or 158 no longer directly engages the circular receptacles 24 of the seat track 10. As one skilled in the art will appreciate, multiple adjacent bridged vertical striker bodies 158 can be connected by one or more bridging pins 164 such that the vertical striker bodies 158 are engaged or disengaged concurrently. Suitable bridging pin securing mechanisms (not shown) may be used to secure the bridging pin 164 within the bridging pin conduits 162.

In FIGS. 72-179, only one through connection bore 130b is depicted in the respective structural mass bodies 128d of the exemplary embodiments; however, it will be appreciated that a plurality of through connection bores 130b may be configured on the same structural mass body 128d in other non-limiting embodiments. The through connection bore 130b of FIGS. 72-179 is also illustrated as being positioned at one end of the structural mass body 128d, but it will be appreciated that the through connection bore 130b may be positioned at different positions on the structural mass body 128d. The exemplary embodiment of FIG. 10, for example, depicts the structural mass body 128d with a through connection bore 130b that is centrally located relative to the sides of the structural mass body 128d. Further, the through connection bore 130b is depicted as circular; however, it will be appreciated that the through connection bore(s) 130b of other embodiments may be of different geometric shapes and/or sizes, such as triangular, square, rectangular, or other regular or irregular polygon.

Although FIGS. 126-179 show various embodiments of the movable striker assembly that use a compression spring 106b, it will be appreciated that other mechanical biasing mechanisms may be utilized to maintain the positive force and engagement between the seat track striker fitting assembly 100 and the seat track 10.

Turning now to FIGS. 180-216, the seat track striker fitting assembly 100 has a base fitting body 102 with a through mounting bore 128c and opposed, laterally protruding feet 110. A threaded bolt 166 is engaged with the through mounting bore 128c in the base fitting body 102. As illustrated, the through mounting bore 128c leads to a lower channel 168 in the lower portion 108 of the base fitting body 102, and a head of the threaded bolt 166 can be recessed within the channel 168. A nut (not depicted) may engage with the threaded bolt 166, thereby securing the threaded bolt 166 and the attached object to the base fitting body 102.

As shown in FIGS. 180-197, the rotational striker assembly 104a has two embossed striker body leaves 132 engaged with a butterfly spring 106a, whereas the rotational striker assembly 104b shown in FIGS. 198-215 has two low-profile striker body leaves 138 engaged with a butterfly spring 106a. A pin 118 is positioned through the rotational leaf apertures 134 and the butterfly spring 106a to secure the rotational striker assembly 104a within the striker body channel 124. The butterfly spring 106a has legs 107 respectively connected to the embossed striker body leaves 132 (FIGS. 180-197) or the low-profile striker body leaves 138

(FIGS. 198-215). The butterfly spring 106a is arranged so that its extending butterfly legs 107 are tensioned together to bias the striker body leaves 132 or 138 toward the engaged position. Set screws or other suitable securing mechanisms may be used to secure the pin 118 in the striker pin conduit 116.

In the engaged position, as shown in FIGS. 180-185 and 198-203, the respective striker body leaves 132 or 138 engage the crescent-shaped openings 22a and 22b of the seat track 10 to prevent lateral and longitudinal movement of the seat track striker fitting assembly 100 within the groove 20. The embossments 136 of the embossed striker body leaves 132 are upright in the engaged position, and the embossed striker body leaves 132 may be used to rotate the striker body leaves 132 inwards about the pin 118 and pull the striker fitting assembly 100 out of engagement with the crescent-shaped openings 22a and 22b. Similarly, the low-profile striker body leaves 138 may be used to rotate the rotational striker assembly 104a about the pin 118 and pull the seat track striker fitting assembly 100 out of engagement with the seat track 10. The butterfly spring 106a can be compressed, as shown in FIGS. 186-191 and 204-209, so that the rotational striker assembly 104a is no longer engaged with the crescent-shaped openings 22a and 22b of the seat track 10, and the seat track striker fitting assembly 100 can be removed from the seat track 10.

The foregoing description discloses various embodiments of the seat track striker fitting assembly 100 having one or two horizontal or vertical striker assemblies 104. It will be appreciated, however, that other quantities and/or arrangements of striker assemblies 104 may be used together in various embodiments of the seat track striker fitting assembly 100. For example, the seat track striker fitting assembly 100 could have three, four, five, six, seven, eight, or nine striker assemblies for the same seat track striker fitting assembly 100 and/or the seat track striker fitting assembly 100 may use a combination of different rotational striker assemblies 104a, a combination of different vertical striker assemblies 104b, or a combination of both rotational and vertical striker assemblies 104a/104b, such as shown in FIGS. 216-218.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the seat track striker fitting assembly be constructed to be operated in a particular orientation. Terms such as "connected," "connecting," "attached," "attaching," "join," and "joining" are used interchangeably and refer to one structure or surface being secured to another structure or surface or integrally fabricated in one piece.

The preceding detailed description of exemplary embodiments of the invention refers to the accompanying drawings, which show the exemplary embodiments by way of illustration. While these exemplary embodiments are described in sufficient detail to enable those skilled in the art to practice the invention, it should be understood that other embodiments may be realized and that logical and mechanical changes may be made without departing from the scope of the invention. Thus, the preceding detailed description is presented for purposes of illustration only and not of limitation, and the scope of the invention is defined by the preceding description and with respect to the attached claims.

What is claimed is:

1. A seat track striker fitting assembly that is removably securable to a seat track, the assembly comprising:
a base fitting body comprising opposed, laterally protruding feet or shoulders, the base fitting body further comprising at least one longitudinal pin conduit having terminal striker pin sockets configured to removably secure a pin mechanism to a striker body channel or opening, the base fitting body further comprising at least one attachment mechanism; and
a striker assembly comprising a striker body engaged with the pin mechanism of the base fitting body, the striker assembly comprising a mechanical biasing mechanism configured to provide positive engagement or force on the striker body toward an engaged position with the seat track.

2. The assembly of claim 1, wherein the protruding feet or shoulders of the base fitting body are crescent-shaped and are configured to engage the seat track to prevent vertical movement of the seat striker fitting assembly in the engaged position.

3. The assembly of claim 1, wherein upright surfaces of the base fitting body extend generally perpendicular to the protruding feet or shoulders and are configured to engage the seat track to prevent lateral movement of the seat striker fitting assembly in the engaged position.

4. The assembly of claim 1, wherein the attachment mechanism comprises a threaded mounting socket, a push button mounting socket, a through mounting bore, or a combination thereof configured to removably fasten or attach a part, assembly, or object to the seat track striker fitting assembly.

5. The assembly of claim 1, wherein the attachment mechanism comprises a structural mass body having one or more attachment features configured to removably fasten or attach a part, assembly, or object to the seat track striker fitting assembly, and wherein the attachment feature of the structural mass body comprises a threaded stud, a through connection bore, or a combination thereof.

6. The assembly of claim 1, wherein the base fitting body further comprises the striker body channel or opening in a lower portion of the base fitting body, and wherein the striker body channel or opening is connected to the attachment mechanism.

7. The assembly of claim 1, wherein the striker pin sockets are coaxially aligned and axially spaced longitudinally along the longitudinal pin conduit of the base fitting body.

8. The assembly of claim 1, wherein the base fitting body further comprises a structural mass fitting body comprising the striker body opening and the pin conduit having terminal striker pin sockets.

9. The assembly of claim 8, wherein the striker pin sockets are coaxially aligned and axially spaced along the pin conduit of the structural mass fitting body.

10. The assembly of claim 1, wherein the striker assembly is configured to rotate about or move along the pin mechanism against the positive engagement or force provided by the mechanical biasing mechanism to a disengaged position.

11. The assembly of claim 10, wherein the striker assembly further comprises a rotational striker assembly, a movable striker assembly, or a combination thereof.

12. The assembly of claim 10, wherein the striker assembly further comprises a rotational striker assembly having a butterfly or torsion spring connected to striker body leaves to provide the positive engagement or force toward the engaged position.

13. The assembly of claim 12, wherein the striker body leaves further comprise rotation leaf apertures for receipt of the pin mechanism, and the striker body leaves are configured to rotate about a horizontal axis of the pin mechanism between the engaged position and the disengaged position.

14. The assembly of claim 12, wherein the striker body leaves further comprise low-profile striker body leaves, embossed striker body leaves, bridged striker body leaves, or a combination thereof.

15. The assembly of claim 14, wherein the striker body leaves further comprise an arcuate, crescent-shaped terminal edge.

16. The assembly of claim 15, wherein the low-profile striker body leaves further comprise a slot.

17. The assembly of claim 15, wherein the embossed striker body leaves further comprise an upright embossment having the arcuate, crescent-shaped terminal edge.

18. The assembly of claim 15, wherein the bridged striker body leaves further comprise an upright embossment having the arcuate, crescent-shaped terminal edge, wherein the embossment further comprises a bridged pin conduit.

19. The assembly of claim 18, wherein the striker assembly further comprises at least two sets of bridged striker body leaves connected with a bridged pin secured in the bridged pin conduits of adjacent bridged striker body leaves.

20. A seat track striker fitting assembly attachable to a seat track, the seat track comprises inwardly extending flange portions spaced apart to form a groove extending longitudinally along a length of the seat track, the seat track further comprises crescent-shaped openings formed by the inwardly extending flange portions to form a series of circular receptacles spaced longitudinally along a length of the seat track, the seat track striker fitting assembly comprising:
a base fitting body comprising:
a. opposed, laterally protruding crescent-shaped feet or shoulders, the crescent-shaped feet or shoulders having a total width equal to or less than a width of the receptacle formed by the flange portions of the seat track, the crescent-shaped feet or shoulders configured to engage the inwardly extending flange portions of the seat track to prevent vertical movement of the seat striker fitting assembly when engaged with the seat track;
b. upright surfaces extending generally perpendicular to the crescent- shaped feet or shoulders, the upright surfaces configured to engage the inwardly extending flange portions of the seat track to prevent lateral movement of the seat striker fitting assembly when engaged with the seat track;
c. a striker body channel or opening;
d. a pin conduit configured to span the striker body channel or opening, the pin conduit comprising pin sockets coaxially aligned and axially spaced along the pin conduit; and
e. at least one attachment mechanism; and
a rotational striker assembly removably connected to the striker body channel or opening of the base fitting body, the rotational striker assembly comprising:
a. a pin mechanism removably secured within the pin conduit of the base fitting body;
b. striker body leaves comprising arcuate, crescent-shaped terminal edges configured to engage the crescent-shaped openings of the seat track to prevent the longitudinal movement of the seat striker fitting assembly when engaged with the seat track, the striker body leaves further comprise rotation leaf apertures configured to receive the pin mechanism; and c. a butterfly or torsion spring configured to provide positive engagement or force on the striker assembly toward an engaged position, the striker body leaves configured to rotate about the pin mechanism against the positive engagement or force provided by the butterfly or torsion spring to a disengaged position;

wherein the butterfly or torsion spring, the pin mechanism, and the rotation leaf apertures of the striker body leaves are coaxially aligned and axially spaced along the pin conduit of the base fitting body.

21. The seat track striker fitting assembly of claim 20, wherein the attachment mechanism is configured to removably fasten or attach a part, assembly, or object to the seat track striker fitting assembly using a fastener, and wherein the fastener comprises a bolt, a screw, a stud, a push-button pin, a connection rod, a tie, or a combination thereof.

22. The seat track striker fitting assembly of claim 21, wherein the attachment mechanism comprises a threaded mounting socket, a push button mounting socket, a through mounting bore, a structural mass body having one or more attachment features, or a combination thereof.

23. The seat track striker fitting assembly of claim 20, wherein the base fitting body further comprises a longitudinal pin conduit having terminal pin sockets, and wherein the terminal pin sockets are coaxially aligned and axially spaced longitudinally along the longitudinal pin conduit of the base fitting body.

24. The seat track striker fitting assembly of claim 23, wherein the base fitting body further comprises the striker body channel or opening in a lower portion of the base fitting body, and wherein the striker body channel or opening is connected to the attachment mechanism.

25. The seat track striker fitting assembly of claim 20, wherein the base fitting body further comprises a structural mass fitting body comprising the striker body opening and the pin conduit having terminal pin sockets, and wherein the terminal pin sockets are coaxially aligned and axially spaced along the pin conduit of the structural mass fitting body.

26. The seat track striker fitting assembly of claim 20, wherein the base fitting body further comprises the striker body channel or opening in a lower portion of the base fitting body, and wherein the striker body channel or opening is connected to the attachment mechanism.

27. The seat track striker fitting assembly of claim 20, wherein the striker body leaves are configured to rotate about a horizontal axis of the pin mechanism in a longitudinal pin conduit between the engaged position and the disengaged position.

28. The seat track striker fitting assembly of claim 20, wherein the striker body leaves further comprise low-profile striker body leaves, embossed striker body leaves, bridged striker body leaves, or a combination thereof.

29. The seat track striker fitting assembly of claim 28, wherein the low-profile striker body leaves further comprise a slot.

30. The seat track striker fitting assembly of claim 28, wherein the embossed striker body leaves further comprise an upright embossment having the arcuate, crescent-shaped terminal edge.

31. The seat track striker fitting assembly of claim 28, wherein the bridged striker body leaves further comprise an upright embossment having the arcuate, crescent-shaped terminal edge, wherein the embossment further comprises a bridged pin conduit.

32. The seat track striker fitting assembly of claim 31, wherein the striker assembly further comprises at least two sets of bridged striker body leaves connected with a bridged pin secured in the bridged pin conduits of adjacent bridged striker body leaves.

33. A seat track striker fitting assembly that is removably securable to a seat track, the assembly comprising:

a base fitting body comprising opposed, laterally protruding feet or shoulders, the base fitting body further comprising at least one pin conduit configured to removably secure a pin mechanism to a striker body channel or opening, the base fitting body further comprising at least one attachment mechanism; and a striker assembly comprising a striker body engaged with the pin mechanism of the base fitting body, the striker assembly comprising a mechanical biasing mechanism configured to provide positive engagement or force on the striker body toward an engaged position with the seat track, wherein the base fitting body further comprises a structural mass body comprising the striker body opening and the pin conduit having terminal striker pin sockets.

34. The assembly of claim 33, wherein the protruding feet or shoulders of the base fitting body are crescent-shaped and are configured to engage the seat track to prevent vertical movement of the seat striker fitting assembly in the engaged position.

35. The assembly of claim 33, wherein upright surfaces of the base fitting body extend generally perpendicular to the protruding feet or shoulders and are configured to engage the seat track to prevent lateral movement of the seat striker fitting assembly in the engaged position.

36. The assembly of claim 33, wherein the structural mass body comprises a threaded stud, a through connection bore, or a combination thereof.

37. The assembly of claim 33, wherein the pin conduit comprises a longitudinal pin conduit having terminal striker pin sockets.

38. The assembly of claim 33, wherein the base fitting body further comprises the striker body channel or opening in a lower portion of the base fitting body, and wherein the striker body channel or opening is connected to the attachment mechanism.

39. The assembly of claim 33, wherein the striker pin sockets are coaxially aligned and axially spaced longitudinally along the longitudinal pin conduit of the base fitting body.

40. The assembly of claim 39, wherein the striker pin sockets are coaxially aligned and axially spaced along the pin conduit of the structural mass fitting body.

41. The assembly of claim 33, wherein the striker assembly is configured to rotate about or move along the pin mechanism against the positive engagement or force provided by the mechanical biasing mechanism to a disengaged position.

42. The assembly of claim 41, wherein the striker assembly further comprises a rotational striker assembly, a movable striker assembly, or a combination thereof.

43. The assembly of claim 41, wherein the striker assembly further comprises a rotational striker assembly having a butterfly or torsion spring connected to striker body leaves to provide the positive engagement or force toward the engaged position.

44. The assembly of claim 43, wherein the striker body leaves further comprise rotation leaf apertures for receipt of the pin mechanism, and the striker body leaves are configured to rotate about a horizontal axis of the pin mechanism between the engaged position and the disengaged position.

45. The assembly of claim 43, wherein the striker body leaves further comprise low-profile striker body leaves, embossed striker body leaves, bridged striker body leaves, or a combination thereof.

46. The assembly of claim 45, wherein the striker body leaves further comprise an arcuate, crescent-shaped terminal edge.

47. The assembly of claim 46, wherein the low-profile striker body leaves further comprise a slot.

48. The assembly of claim 46, wherein the embossed striker body leaves further comprise an upright embossment having the arcuate, crescent-shaped terminal edge.

49. The assembly of claim 46, wherein the bridged striker body leaves further comprise an upright embossment having the arcuate, crescent-shaped terminal edge, wherein the embossment further comprises a bridged pin conduit.

50. The assembly of claim 49, wherein the striker assembly further comprises at least two sets of bridged striker body leaves connected with a bridged pin secured in the bridged pin conduits of adjacent bridged striker body leaves.

51. A seat track striker fitting assembly that is removably securable to a seat track, the assembly comprising:

a base fitting body comprising opposed, laterally protruding feet or shoulders, the base fitting body further comprising at least one pin conduit configured to removably secure a pin mechanism to a striker body channel or opening, the base fitting body further comprising at least one attachment mechanism; and a rotational striker assembly comprising a striker body engaged with the pin mechanism of the base fitting body, the rotational striker assembly comprising a mechanical biasing mechanism configured to provide positive engagement or force on the striker body toward an engaged position with the seat track, the rotational striker assembly further comprising a butterfly or torsion spring connected to striker body leaves to provide the positive engagement or force toward the engaged position.

52. The assembly of claim 51, wherein the protruding feet or shoulders of the base fitting body are crescent-shaped and are configured to engage the seat track to prevent vertical movement of the seat striker fitting assembly in the engaged position.

53. The assembly of claim 51, wherein upright surfaces of the base fitting body extend generally perpendicular to the protruding feet or shoulders and are configured to engage the seat track to prevent lateral movement of the seat striker fitting assembly in the engaged position.

54. The assembly of claim 51, wherein the attachment mechanism comprises a threaded mounting socket, a push button mounting socket, a through mounting bore, or a combination thereof configured to removably fasten or attach a part, assembly, or object to the seat track striker fitting assembly.

55. The assembly of claim 51, wherein the attachment mechanism comprises a structural mass body having one or more attachment features configured to removably fasten or attach a part, assembly, or object to the seat track striker fitting assembly, and wherein the attachment feature of the structural mass body comprises a threaded stud, a through connection bore, or a combination thereof.

56. The assembly of claim 51, wherein the pin conduit comprises a longitudinal pin conduit having terminal striker pin sockets.

57. The assembly of claim 51, wherein the base fitting body further comprises the striker body channel or opening in a lower portion of the base fitting body, and wherein the striker body channel or opening is connected to the attachment mechanism.

58. The assembly of claim 51, wherein the striker pin sockets are coaxially aligned and axially spaced longitudinally along the longitudinal pin conduit of the base fitting body.

59. The assembly of claim 58, wherein the striker pin sockets are coaxially aligned and axially spaced along the pin conduit of the structural mass fitting body.

60. The assembly of claim 51, wherein the rotational striker assembly is configured to rotate about the pin mechanism against the positive engagement or force provided by the mechanical biasing mechanism to a disengaged position.

61. The assembly of claim 60, wherein the striker body leaves further comprise rotation leaf apertures for receipt of the pin mechanism, and the striker body leaves are configured to rotate about a horizontal axis of the pin mechanism between the engaged position and the disengaged position.

62. The assembly of claim 60, wherein the striker body leaves further comprise low-profile striker body leaves, embossed striker body leaves, bridged striker body leaves, or a combination thereof.

63. The assembly of claim 62, wherein the striker body leaves further comprise an arcuate, crescent-shaped terminal edge.

64. The assembly of claim 62, wherein the low-profile striker body leaves further comprise a slot.

65. The assembly of claim 62, wherein the embossed striker body leaves further comprise an upright embossment having the arcuate, crescent-shaped terminal edge.

66. The assembly of claim 62, wherein the bridged striker body leaves further comprise an upright embossment having the arcuate, crescent-shaped terminal edge, wherein the embossment further comprises a bridged pin conduit.

67. The assembly of claim 66, wherein the striker assembly further comprises at least two sets of bridged striker body leaves connected with a bridged pin secured in the bridged pin conduits of adjacent bridged striker body leaves.

* * * * *